(12) United States Patent
Green et al.

(10) Patent No.: US 12,472,245 B2
(45) Date of Patent: Nov. 18, 2025

(54) COMPOSITIONS AND METHODS

(71) Applicant: CHAIN BIOTECHNOLOGY LIMITED, Oxford (GB)

(72) Inventors: Edward Green, Oxford (GB); Benjamin Michael Bradley, Oxford (GB); Shisong Jiang, Oxford (GB); Richard Mark Edwards, Oxford (GB)

(73) Assignee: CHAIN BIOTECHNOLOGY LIMITED, Oxford (GB)

( * ) Notice: Subject to any disclaimer, the term of this patent is extended or adjusted under 35 U.S.C. 154(b) by 0 days.

(21) Appl. No.: 19/075,180

(22) Filed: Mar. 10, 2025

(65) Prior Publication Data

US 2025/0213673 A1  Jul. 3, 2025

Related U.S. Application Data

(63) Continuation of application No. 18/267,410, filed as application No. PCT/GB2021/053264 on Dec. 13, 2021, now abandoned.

(30) Foreign Application Priority Data

Dec. 15, 2020  (GB) .................................... 2019767

(51) Int. Cl.
| | |
|---|---|
| C07K 14/005 | (2006.01) |
| A61K 9/00 | (2006.01) |
| A61K 39/02 | (2006.01) |
| A61K 39/12 | (2006.01) |
| C07K 14/28 | (2006.01) |
| C07K 14/74 | (2006.01) |
| C12N 7/00 | (2006.01) |
| A61K 39/00 | (2006.01) |

(52) U.S. Cl.
CPC ............ *A61K 39/12* (2013.01); *A61K 9/0053* (2013.01); *A61K 39/107* (2013.01); *C07K 14/005* (2013.01); *C07K 14/28* (2013.01); *C12N 7/00* (2013.01); *A61K 2039/522* (2013.01); *A61K 2039/523* (2013.01); *A61K 2039/542* (2013.01)

(58) Field of Classification Search
CPC ............ C07K 14/005; C07K 14/70539; C07K 2319/00; C07K 2319/70; A61P 35/00
See application file for complete search history.

(56) References Cited

U.S. PATENT DOCUMENTS

| | | | |
|---|---|---|---|
| 5,800,821 A | 9/1998 | Acheson et al. |
| 7,833,791 B2 | 11/2010 | Chang et al. |
| 7,955,600 B2 | 6/2011 | Hensel et al. |
| 8,673,311 B2 | 3/2014 | Cutting et al. |
| 2004/0009936 A1 | 1/2004 | Tang et al. |
| 2005/0232947 A1 | 10/2005 | Cutting |
| 2010/0291061 A1 | 11/2010 | Jiang |
| 2015/0343049 A1 | 12/2015 | Cutting |
| 2017/0340751 A1 | 11/2017 | Jiang et al. |
| 2018/0256697 A1 | 9/2018 | Sun et al. |
| 2019/0076511 A1 | 3/2019 | Rottiers et al. |
| 2023/0183295 A1 | 6/2023 | Gao et al. |
| 2024/0058433 A1 | 2/2024 | Green et al. |

FOREIGN PATENT DOCUMENTS

| | | |
|---|---|---|
| EP | 3235831 A1 | 10/2017 |
| WO | 01/21200 A1 | 3/2001 |
| WO | 03/70920 A1 | 8/2003 |
| WO | 2007/123850 A2 | 11/2007 |
| WO | 2007/125371 A2 | 11/2007 |
| WO | 2007/148091 A2 | 12/2007 |
| WO | 2010/084349 A1 | 7/2010 |
| WO | 2016/095812 A1 | 6/2016 |
| WO | 2017/066706 A1 | 4/2017 |
| WO | 2017/123675 A1 | 7/2017 |
| WO | 2017/187190 A1 | 11/2017 |
| WO | 2018/055388 A1 | 3/2018 |
| WO | 2019/034887 A1 | 2/2019 |
| WO | 2019/180441 A1 | 9/2019 |
| WO | 2021/207306 | 10/2021 |

OTHER PUBLICATIONS

Alou et al., Taxonogenomic description of four new *Clostridium* species isolated from human gut: '*Clostridium amazonitimonense*', '*Clostridium merdae*', '*Clostridium massilidielmoense*' and '*Clostridium nigeriense*', New Microb. New Infect., 21:128-139 (2018).

Alsaker et al., Transcriptional Program of Early Sporulation and Stationary-Phase Events in Clostridium acetobutylicum, J. Bacteriol., 187(20):7103-7118 (2005).

Atmadjaja et al., CRISPR-Cas, a highly effective tool for genome editing in Clostridium saccharoperbutylacetonicum N1-4(HMT), FEMS Microbiol Lett., 366(6):fnz059:1-10 (2019).

Bachem et al., Microbiota-Derived Short-Chain Fatty Acids Promote the Memory Potential of Antigen-Activated CD8 + T Cells, Immun., 51(2):285-297 (2019).

Bahey-El-Din et al., Lactococcus lactis-based vaccines: Current status and future perspectives, Hum. Vacc., 7(1):106-109 (2011).

Bakaletz et al., Developing Animal Models for Polymicrobial Diseases, Nat. Rev. Micro., 2:552-568 (2004).

Cai et al., Protective cellular immunity generated by cross-presenting recombinant overlapping peptide proteins, Oncotarget., 8(44):76516-76524 (2017).

(Continued)

*Primary Examiner* — Barry A Chestnut
(74) *Attorney, Agent, or Firm* — MARSHALL, GERSTEIN & BORUN LLP

(57) ABSTRACT

A bacterium of the class Clostridia comprising a heterologous nucleic acid molecule encoding at least one antigen, wherein the bacterium is capable of expressing the antigen in an intracellular compartment of the bacterium during anaerobic cell growth, and wherein at least one antigen is an infectious agent antigen or a tumour antigen.

20 Claims, 8 Drawing Sheets

Figure 1:
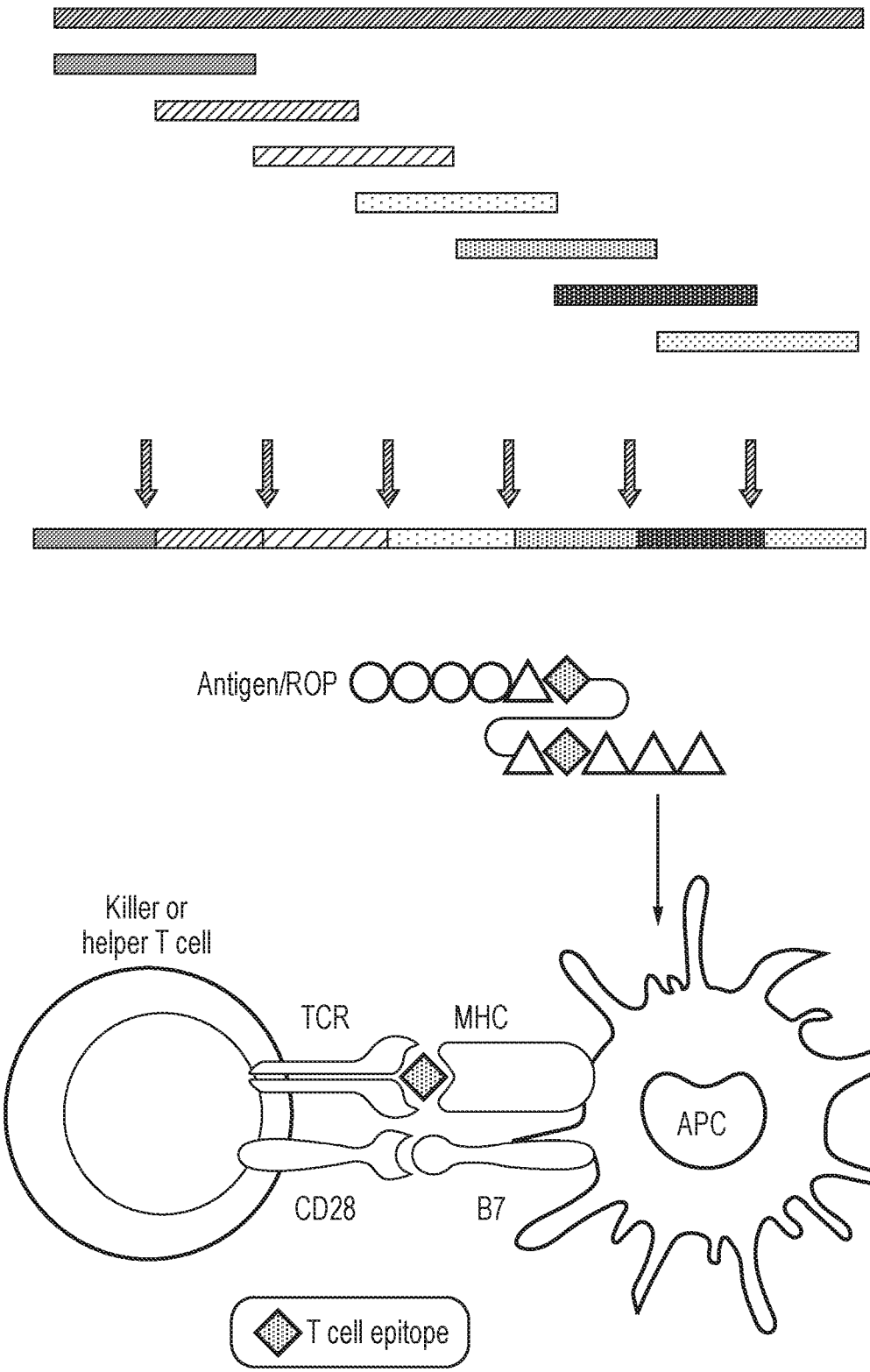

Specification includes a Sequence Listing.

(56) References Cited

OTHER PUBLICATIONS

Caly et al., Alternatives to Antibiotics to Prevent Necrotic Enteritis in Broiler Chickens: A Microbiologist's Perspective, Front. Micro., 6(1336):1-12 (2015).
Chen et al., Use of a Clostridium perfringens vector to express high levels of SIV p27 protein for the development of an oral SIV vaccine, Virol., 329(2):226-33 (2004).
Davis et al., Gene Cloning in Clostridia, Handb. Clostr., 37-52 (2005).
Degen et al., Variability of gastrointestinal transit in healthy women and men, Gut., 39(2):299-305 (1996).
Fast et al . . . Potential T-cell and B-cell Epitopes of 2019-nCOV, Prep., XXX(XX):1-9 (2020).
Finnen et al., Interactions between Papillomavirus L1 and L2 Capsid Proteins, J. Virol., 77(8):4818-4826 (2003).
GB Application No. 2019767.9, Search Report, mailed Jun. 8, 2021.
Hasan et al., A Phase 1 Trial Assessing the Safety and Tolerability of a Therapeutic DNA Vaccination Against HPV16 and HPV18 E6/E7 Oncogenes After Chemoradiation for Cervical Cancer, Int. J. Radiat. Oncol. Biol. Phys., 107(3):487-498 (2020).
Heap et al., A modular system for Clostridium shuttle plasmids, J. Microbiol. Methods., 78(1):79-85 (2009).
Hegazy et al., Circulating and Tissue-Resident CD4D T Cells With Reactivity to Intestinal Microbiota Are Abundant in Healthy Individuals and Function Is Altered During Inflammation, Gastroent., 153(5):1320-1337 (2017).
Helmus et al., Generation and Characterization of The Cellular Immune Response To A Clostridium Perfringens Anti-Siv Mucosal Vaccine, B.S. in Biochem. Mol. Biology/Biotech., 203 (2008).
Helmus et al., Induction of SIV p27-Specific Multifunctional T Cells in the Gut Following Prime-Boost Immunization with Clostridium perfringens and Adenovirus Vaccines Expressing SIV p27, Curr. HIV Res., 8(2):101-12 (2010).
Hollingsworth et al., Turning the corner on therapeutic cancer vaccines, NPJ Vaccin., 4(7):1-10 (2019).
International Application No. PCT/GB2021/053264, International Preliminary Report on Patentability, mailed Mar. 9, 2023.
International Application No. PCT/GB2021/053264, International Search Report and Written Opinion, mailed May 30, 2022.
International Application No. PCT/GB2021/053264, Written Opinion, mailed Dec. 20, 2022.
Ireson et al., The role of mouse tumour models in the discovery and development of anticancer drugs, British J. Canc., 121:101-108 (2019).
Jiang et al., Etx-Y71A as a non-toxic mutant of Clostridium perfringens epsilon toxin induces protective immunity in mice and sheep, Vacc., 38(42):6553-6561 (2020).
Kashyap et al., Complex Interactions Among Diet, Gastrointestinal Transit, and Gut Microbiota in Humanized Mice, Gastroent., 144(5):967-977 (2013).
Kuehne et al., The role of toxin A and toxin B in Clostridium difficile infection, Nat., 467(7316):711-713 (2010).
Lee et al., Determination of plasmid copy number and stability in Clostridium acetobutylicum ATCC 824, FEMS. Microb. Lett., 108(3):319-324 (1993).
Li et al., CRISPR-based genome editing and expression control systems in Clostridium acetobutylicum and Clostridium beijerinckii, Biotechnol. J., 11:961-972 (2016).
Li et al.. Epitope-based peptide vaccines predicted against novel coronavirus disease caused by SARS-CoV-2, Virus Res., 288:198082 (2020).
Longet et al., A Murine Genital-Challenge Model Is a Sensitive Measure of Protective Antibodies against Human Papillomavirus Infection, J. Virol., 85(24):13253-13259 (2011).
Lopetuso et al., Commensal Clostridia: leading players in the maintenance of gut homeostasis, Gut. Pathog., 5(23):1-8 (2013).
Louis et al., Formation of propionate and butyrate by the human colonic microbiota, Environ. Micro., 19(1):29-41 (2017).
Luccia et al., Combined prebiotic and microbial intervention improves oral cholera vaccination responses in a mouse model of childhood undernutrition, Cell Host. Microb., 27(6): 899-908.e5 (2020).
Lützner et al., Quantifying Cathepsin S Activity in Antigen Presenting Cells Using a Novel Specific Substrate, J. Biol. Chem., 283(52):36185-94 (2008).
Luu et al., Regulation of the effector function of CD8+ T cells by gut microbiota-derived metabolite butyrate, Scien. Report., 8(14430):1-10 ((2018).
Mcconnell et al., Measurements of rat and mouse gastrointestinal pH, fluid and lymphoid tissue, and implications for in-vivo experiments, J. Pharm. Pharmacol., 60(1):63-70 (2008).
Melville et al., Expression from the Clostridium perfringens cpe Promoter in C. perfringens and Bacillus subtilis, Inten. Immun., 62(12):5550-5558 (1994).
Minton et al., A roadmap for gene system development in Clostridium, Anaer., 41:104-112 (2016).
Mot et al., Progress and problems in vaccination against necrotic enteritis in broiler chickens, Avian Pathol., 43(4):290-300 (2014).
Myhrvold et al., A distributed cell division counter reveals growth dynamics in the gut microbiota, Nat. Comm., 6(10039):1-10 (2015).
Nomura et al., Association of Short-Chain Fatty Acids in the Gut Microbiome With Clinical Response to Treatment With Nivolumab or Pembrolizumab in Patients With Solid Cancer Tumors, JAMA. Netw. Open, 3(4):e202895, 1-12 (2020).
Padmanabhan et al., Gastrointestinal transit measurements in mice with 99mTc-DTPA-labeled activated charcoal using NanoSPECT-CT, EJNMMI. Res., 3(1):60 (2013).
Paoletti et al., Vaccines: From Concept to Clinic A Guide to the Development and Clinical Testing of Vaccines for Human Use, CRC Press, (1999).
Peters et al., T Cell Epitope Predictions, Annu. Reviews of Immun., 38:123-145 (2020).
Plotkin, Correlates of Vaccine-Induced Immunity, Clin. Infect. Dis., 47(3):401-409 (2008).
Pritchard et al., Fasting and postprandial vols. of the undisturbed colon: normal values and changes in diarrhea-predominant irritable bowel syndrome measured using serial MRI, Neurogast. Motil., 26(1):124-130 (2014).
Pyne et al., Harnessing heterologous and endogenous CRISPR-Cas machineries for efficient markerless genome editing in Clostridium, Scien. Report., 6(25666):1-15 (2016).
Ramirez et al., Current state and challenges in developing oral vaccines, Adv. Drug. Deliv. Rev., 114:116-131 (2017).
Takamizawa et al., High-level expression of clostridial sialidase using a ferredoxin gene promoter-based plasmid, Prot. Express. Purifica., 36:70-75 (2004).
Thompson et al., CLUSTAL W: improving the sensitivity of progressive multiple sequence alignment through sequence weighting, position-specific gap penalties and weight matrix choice, Nucl. Acid. Res., 22(22):4673-4680 (1994).
Thompson et al., Live attenuated vaccine-based control of necrotic enteritis of broiler chickens, Vet. Microbiol., 113(1-2):25-34 (2006).
Trompette et al., Dietary Fiber Confers Protection against Flu by Shaping Ly6c—Patrolling Monocyte Hematopoiesis and CD8+ T Cell Metabolism, Immun., 48(5):992-1005 (2018).
Tummala et al., Development and Characterization of a Gene Expression Reporter System for Clostridium acetobutylicum ATCC 824, Appl. Environ. Microbiol., 65(9):3793-3799 (1999).
Wagener et al., Colonic Transit Time—What Is Normal?, J. Pediat. Surg., 39(2):166-169 (2004).
Wang et al., Genome Editing in Clostridium saccharoperbutylacetonicum N1-4 with the CRISPR-Cas9 System, App. Environ. Microb., 83(10):e00233-17 (2017).
Wang et al., Markerless chromosomal gene deletion in Clostridium beijerinckii using CRISPR/Cas9 system, J, Biotech., 200:1-5 (2015).
Winzer et al., Differential Regulation of Two Thiolase Genes from Clostridium acetobutylicum DSM 792, J. Mol. Microbiol. Biotechnol., 2(4): 531-541 (2000).
Zhang et al., Comparing pooled peptides with intact protein for accessing cross-presentation pathways for protective CD8+ and CD4+ T cells, J. Biol. Chem., 284(14):9184-9191 (2009).

(56) References Cited

OTHER PUBLICATIONS

Zheng et al., Physiologic hypoxia and oxygen homeostasis in the healthy intestine. A Review in the Theme: Cellular Responses to Hypoxia, Am. J. Physiol. Cell Physiol., 309(6):C350-C360 (2015).

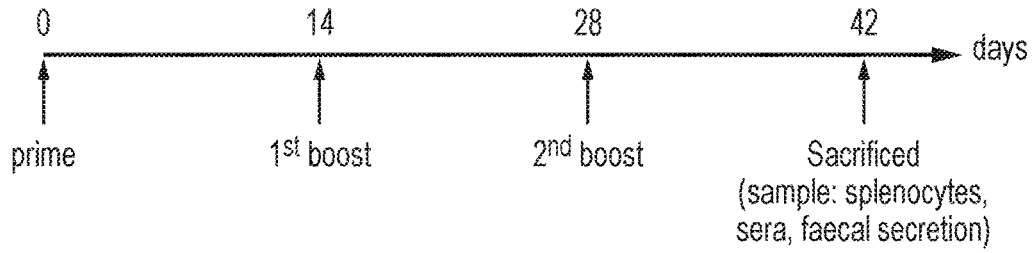

FIG. 8 p0957 CtxB genomic sequence (SEQ ID NO: 20):

`GCGGCCG`CGGGATACTGCAGAAGATATAATAGATTCAATGAAAATGTGGAGTAAATAAAAAA
*TCGGATAGAAATATCCGATTTTTTATTTAAAAAGACTTAAAAAAAGTGCTTGACTCTTGGAAT
TTTAAGAAAAAATATGGTATAATCATATTACGTAATAAAAATACATTTATATAGTAATACCAT
ATAAATGCCAATAATTGATAAAAAAATTAAATTCAATTAAATCACATGAGCGAGTAAGAATTC
AAGGAGGTGTGTTA*`CATATG`ACACCACAAAACATAACAGATTTATGTGCTGAGTATCATAATA
CACAAATATATACACTTAATGATAAAATATTTTCATATACAGAATCATTAGCTGGAAAAAGAG
AAATGGCAATAATAACATTTAAAAATGGAGCAATATTTCAAGTTGAAGTTCCTGGAAGTCAAC
ACATTGATTCACAAAAAAAAGCAATAGAAAGAATGAAAGATACATTAAGAATAGCATACTTAA
CAGAAGCAAAAGTTGAAAAATTATGTGTTTGGAATAATAAAACACCACATGCAATAGCAGCAA
TATCAATGGCAAAT*GATTATAAAGATGACGATGATAAATAA*`GCTAGC`

`NotI site`
*p0957 promoter sequence*
`NdeI site` with methionine nucleotide signal (ATG)
ctxB encoded gene
*C-terminal FLAG tag*
`NheI site`

Translated protein sequence (SEQ ID NO: 21):

MTPQNITDLCAEYHNTQIYTLNDKIFSYTESLAGKREMAIITFKNGAIFQVEVPGSQHIDSQK
KAIERMKDTLRIAYLTEAKVEKLCVWNNKTPHAIAAISMAN*DYKDDDDK*

*C-terminal FLAG tag*

FIG. 9A

```
             1         10        20        30        40        50        60
             |---------|---------|---------|---------|---------|---------|-
P01556       MIKLKFGVFFTVLLSSAYAHGTPQNITDLCAEYHNTQIYTLNDKIFSYTESLAGKREMAII
CHAIN_CtxB                       MTPQNITDLCAEYHNTQIYTLNDKIFSYTESLAGKREMAII
Consensus    ....................gTPQNITDLCAEYHNTQIYTLNDKIFSYTESLAGKREMAII 70        80        90        100       110       120
             ---------|---------|---------|---------|---------|---------|--
P01556       TFKNGAIFQVEVPGSQHIDSQKKAIERMKDTLRIAYLTEAKVEKLCVWNNKTPHAIAAISM
CHAIN_CtxB   TFKNGAIFQVEVPGSQHIDSQKKAIERMKDTLRIAYLTEAKVEKLCVWNNKTPHAIAAISM
Consensus    TFKNGAIFQVEVPGSQHIDSQKKAIERMKDTLRIAYLTEAKVEKLCVWNNKTPHAIAAISM 130 132
             ---------|-|
P01556       AN
CHAIN_CtxB   ANDYKDDDDK
Consensus    AN........
```

FIG. 9B

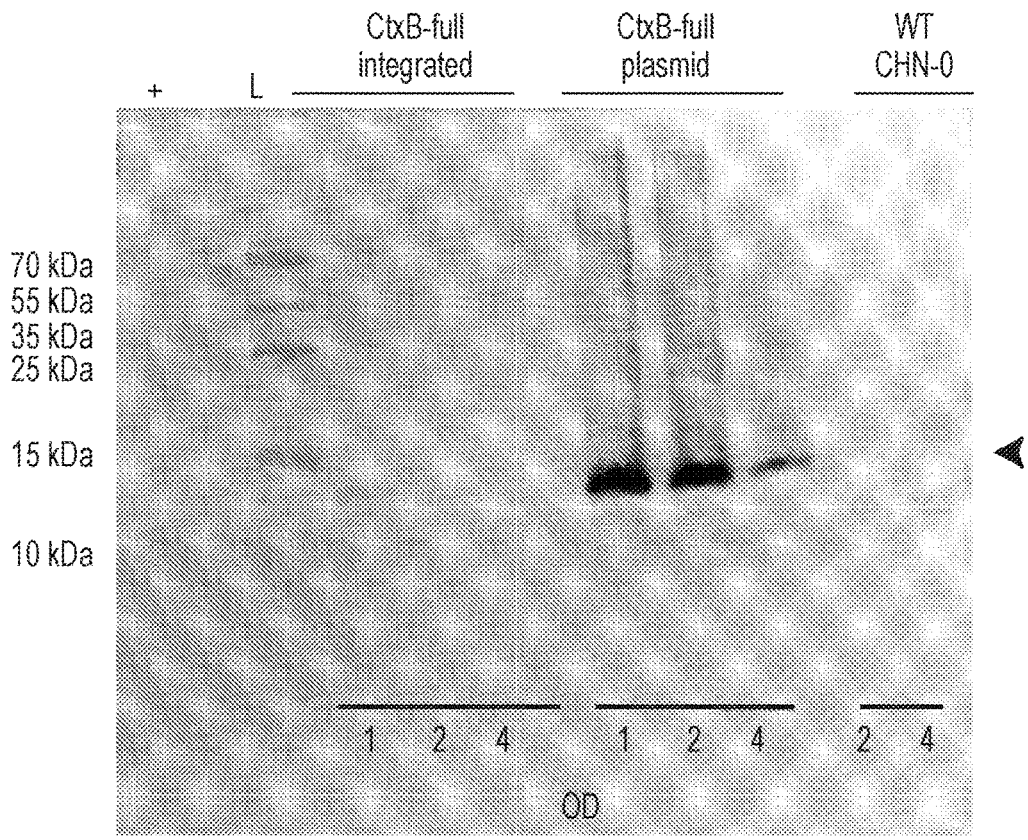

FIG. 10

COMPOSITIONS AND METHODS

FIELD OF INVENTION

The invention relates to bacterial vaccines, particularly live bacterial vaccines suitable for oral administration and for stimulating cellular immunity.

This application contains, as a separate part of disclosure, a Sequence Listing in computer-readable form (Filename: 59323A_SeqListing.xml; Size: 41,276 bytes; Created: Feb. 28, 2025) which is incorporated by reference herein in its entirety.

BACKGROUND

Vaccines play a leading role in disease prevention, particularly of infectious diseases, and show promise in therapy of existing infections and chronic diseases. Oral vaccines address some of the disadvantages of traditional injection-based formulations, providing improved safety and compliance and easier administration. Oral vaccines may stimulate humoral and cellular responses at both systemic and mucosal sites, but there are significant challenges in their development posed by the gastrointestinal (GI) tract, as reviewed in Vela Ramirez, J. E., Sharpe, L. A., & Peppas, N. A. (2017). Current state and challenges in developing oral vaccines. *Advanced drug delivery reviews*, 114, 116-131. For example, strategies are needed to avoid fragile antigens being degraded by proteolytic enzymes and the acidic environment of the stomach. Once an oral vaccine reaches the intestine, the presence of a mucus layer, the composition of the gastrointestinal fluid and the action of epithelial barriers limits the permeability of molecules to the lymphatic system. It is believed that antigens are sampled by specialised epithelial cells, "M cells", in the Peyer's patches of the gut-associated lymphoid tissue (GALT) of the small intestine and transcytosed and delivered to dendritic cells (DCs) that process and present antigenic fragments on their surface to activate naïve T-cells.

Typical strategies in oral vaccines under development have relied on high antigen doses and potent adjuvants in order to trigger an immune response (Ramirez et al, supra). Some strategies make use of Gram-negative bacterial lipopolysaccharide, *Salmonella* lipid A derivatives or cholera toxin that may elicit adjuvant effects, but there is a trade-off in terms of toxicity.

Bacterial vaccines offer promise, and live-attenuated vaccines for *Vibrio cholera* or *Salmonella typhi* vaccines have been licensed. Gram-positive bacteria such as *Lactococcus*, which avoid LPS and may be better tolerated, have been suggested as a potential vaccine platform (Bahey-El-Din, M and Gahan, C G M (2010) *Lactococcus lactis* based vaccines: 'Current status and future perspectives', Human Vaccines, 7:1, 106-109). An oral recombinant *Lactobacillus* vaccine is disclosed in WO 2001/021200 A1. Bacterial vaccines have to date been used to target the small intestine, where the mucosal immune system has been well studied. An attenuated *Clostridium perfringens* engineered to express high levels of antigen in inclusion bodies during sporulation has been proposed in Chen Y et al (2004) *Use of a Clostridium perfringens vector to express high levels of SIV p27 protein for the development of an oral SIV vaccine*, Virology 329:226-233, ISSN 0042-6822. The mechanism seems to rely on the mother cell lysing after sporulation to deliver high levels of antigen directly to the Peyer's patches located in the terminal ileum of the small intestine.

Oral vaccines licensed to date are typically intended for prevention of infection rather than as therapeutic vaccines. Antibodies produced by B cells are the predominant correlate of protection for current vaccines, but cell-mediated immune functions are critical in protection against intracellular infections, and in almost all diseases, $CD4^+$ cells are necessary to help B cell development (Stanley A. Plotkin (2008) Correlates of Vaccine-Induced Immunity, Clinical Infectious Diseases, Pages 47:401-409). For control of established infection, and tumour immunity, cellular immunity including $CD8^+$ cytolytic T-cells, is generally perceived as more important.

For many protein-based vaccines, the proteins are phagocytosed or endocytosed into endosomes and lysosomes by antigen presentation cells (APCs), whereby lysosomes degrade the protein into smaller peptides, some of which can (CD4 epitopes) bind to MHC class II molecules on lysosomal membranes and are presented to the cell surface to stimulate $CD4^+$ T-cells, which in turn are required for B cells to produce antibodies (T cell help). Therefore, protein antigens have been mainly used to stimulate the body to produce antibodies.

The main pathway for the presentation of antigenic peptides on MHC Class I molecules (required for stimulation of $CD8^+$ cytotoxic T cells) relies on antigen that is expressed within the APC, such as following viral infection. However, studies have found that APC can also internalise antigens and present them on MHC Class I molecules to stimulate cytotoxic T lymphocytes (CTL) by a process called antigen cross presentation, which is typically an inefficient process. The delivery of exogenous peptides or proteins to the MHC class I pathway has been partially successful through use of chemical adjuvants such as Freund's adjuvant, and mixtures of squalene and detergents (Hilgers et al. (1999) VACCINE 17:219-228). EP3235831 (Oxford Vacmedix UK Ltd) demonstrates that an artificial multi-epitope fusion protein known as a recombinant overlapping peptide (ROP) is capable of simultaneously stimulating $CD4^+$ and $CD8^+$ T-cell responses. ROPs are made up of overlapping peptides linked by the cathepsin cleavage site target sequence and are more efficient in priming protective immunity than the whole protein from which the peptides are derived. Subcutaneous immunisation with ROPs has been shown to have protective effects in a viral model and a tumour model (Zhang H et al (2009) J. Biol. Chem. 284:9184-9191; and Cai L et al (2017) Oncotarget 8:76516-76524).

There remains a need for effective bacterial vaccines that are suitable for oral administration, and for stimulating cellular immunity.

WO 2018/055388 (CHAIN Biotechnology Limited) discloses *Clostridium* engineered to express (R)-3-hydroxybutyrate (R-3-HB) as an anti-inflammatory agent, including in a simulated colon environment. WO 2019/180441 (CHAIN Biotechnology Limited) discloses in vivo and pharmacokinetic profiling of R-3-HB engineered *Clostridium butyricum*. The engineered strain could be isolated from colon samples of mice that had been dosed orally with bacterial spores.

The present inventors sought to exploit the ability of *Clostridium* to grow in anaerobic conditions to target the lower anaerobic regions of the GI tract, such as the large intestine, in order to develop a platform vaccine technology. Contrary to the anti-inflammatory effects of the R-3-HB engineered *Clostridium*, the present invention is based on the surprising discovery that *Clostridium* engineered for intracellular expression of antigen during anaerobic cell growth can stimulate antigen-specific immune responses.

The listing or discussion of a prior-published document in this specification should not be taken as an acknowledgement that the document is part of the state of the art or is common general knowledge.

DESCRIPTION OF THE INVENTION

A first aspect of the present invention is a bacterium of the class Clostridia comprising a heterologous nucleic acid molecule encoding at least one antigen, wherein the bacterium is capable of expressing the at least one antigen in an intracellular compartment of the bacterium during anaerobic cell growth, and wherein the at least one antigen is an infectious agent antigen or a tumour antigen.

The infectious agent antigen or tumour antigen is heterologous to the bacterium. By "capable of expressing" an antigen, we mean that the heterologous nucleic acid molecule, upon transcription and typically also translation in the bacterium, results in the expression of the antigen.

The expression of antigen by the bacterium occurs in an intracellular compartment of the bacterium during anaerobic cell growth. Bacteria of the class Clostridia are obligately anaerobic bacteria, the majority of which have the ability to form spores (i.e., are spore-forming bacteria). Such bacteria may be in the form of a spore or in a vegetative form; in the latter form, the bacteria are metabolically active and typically growing. By targeting expression of the antigen to metabolically active forms of the Clostridia, it is possible to use the Clostridia as a vehicle to target antigen to the anaerobic portions of the gut. By administering the bacteria orally as spores, the bacteria remain dormant and viable during transit through the gastrointestinal tract, until they reach the anaerobic portions where they germinate and multiply.

Antigens

By "antigen", we mean a molecule that binds specifically to an antibody or a T-cell receptor (TCR). Antigens that bind to antibodies are called B cell antigens. Suitable types of molecule include peptides, polypeptides, glycoproteins, polysaccharides, gangliosides, lipids, phospholipids, DNA, RNA, fragments thereof, portions thereof and combinations thereof. Peptide and polypeptide antigens, including glycoproteins, are preferred. TCRs bind only peptide fragments complexed with MHC molecules. The portions of an antigen that are recognised are termed "epitopes". Where a B cell epitope is a peptide or polypeptide, it typically comprises 3 or more amino acids, generally at least 5 and more usually at least 8 to 10 amino acids. The amino acids may be adjacent amino acid residues in the primary structure of the polypeptide or may become spatially juxtaposed in the folded protein. T cell epitopes are normally short primary sequences from antigens. They may bind to MHC Class I or MHC Class II molecules. Typically, MHC Class I-binding T-cell epitopes are 8 to 11 amino acids long. Class II molecules bind peptides that may be 10 to 30 residues long or longer, the optimal length being 12 to 16 residues. Peptides that bind to a particular allelic form of an MHC molecule contain amino acid residues that allow complementary interactions between the peptide and the allelic MHC molecule. The ability of a putative T-cell epitope to bind to an MHC molecule can be predicted and confirmed experimentally (Peters et al. (2020) T Cell Epitope Predictions, Annual Reviews of Immunology, Vol. 38:123-145).

According to the first aspect, the antigen expressed by the bacterium of the class Clostridia is an infectious agent antigen or a tumour antigen. By "infectious agent antigen", we mean that the antigen derives from an infectious agent that is capable of infecting a susceptible host, such as a human, typically resulting in a pathology. By "derives from", we include that the infectious agent antigen is encoded in the genome of an infectious agent, or is a variant of such an encoded antigen. By "tumour antigen", we mean that the antigen derives from an antigen that is expressed predominantly, such as almost exclusively or exclusively by tumour cells, or acts as a marker that is used in the art to distinguish a tumour cell from a healthy cell. By "derives from", we include that the tumour antigen is encoded in the genome of a cancer cell, or is a variant of such an encoded antigen. In some embodiments, the antigen may be an infectious agent antigen that is associated with a risk of cancer. An antigen may be a fragment or portion of a complete protein, which fragment includes an epitope. An "antigen segment" is a portion of an antigen, which antigen comprises an epitope.

A "variant" refers to a protein or peptide wherein at one or more positions there have been amino acid insertions, deletions, or substitutions, either conservative or non-conservative. By "conservative substitutions" is intended combinations such as Val, Ile, Leu, Ala, Met; Asp, Glu; Asn, Gln; Ser, Thr, Gly, Ala; Lys, Arg, His; and Phe, Tyr, Trp. Preferred conservative substitutions include Gly, Ala; Val, Ile, Leu; Asp, Glu; Asn, Gln; Ser, Thr; Lys, Arg; and Phe, Tyr. Typical variants of the antigen or portion thereof will have an amino acid sequence which is at least 80%, at least 90%, at least 95%, at least 99% or at least 99.5% identical to the corresponding native antigen or portion thereof.

The percent sequence identity between two polypeptides may be determined using suitable computer programs, for example the GAP program of the University of Wisconsin Genetic Computing Group and it will be appreciated that percent identity is calculated in relation to polypeptides whose sequence has been aligned optimally.

The alignment may alternatively be carried out using the Clustal W program (Thompson et al., (1994) *Nucleic Acids Res.*, 22 (22), 4673-80). The parameters used may be as follows:

Fast pairwise alignment parameters: K-tuple (word) size; 1, window size; 5, gap penalty; 3, number of top diagonals; 5. Scoring method: x percent.

Multiple alignment parameters: gap open penalty; 10, gap extension penalty; 0.05.

Scoring matrix: BLOSUM.

A "variant" may also refer to the nucleic acid molecule that encodes a variant antigen.

Suitable infectious agent antigens may include a viral antigen, a bacterial antigen (including a chlamydial antigen or a *mycoplasma* antigen), a parasite antigen, a protozoan antigen, a helminth antigen, a nematode antigen, a fungal antigen, a prion, or any combination thereof. Combinations of an infectious agent antigen and a tumour antigen may also be used. In some cases, the antigen selected provides cross-immunity (also referred to as cross-protection) in that a single antigen or multiple antigens combined may confer immunity or protection against related infectious agents. Cross-immunity may occur where an antigen is conserved (i.e. shared or homologous) in multiple strains or species of infectious agents. Accordingly, it may be desirable to use antigens (either single antigens or multiple combined antigens) that provide such cross-immunity.

Examples of viral antigens include human papilloma virus (HPV) antigens; coronavirus antigens, such as SARS-CoV-2 coronavirus antigens, such as SARS-CoV-2 spike protein (for example, the coronavirus antigen may be an antigen or multiple combined antigens that confer cross-immunity to 229E, NL63, OC43 and HKU1 coronavirus strains, each of which are relevant for SARS-CoV2); human immunodeficiency virus (HIV) antigens such as products of the gag, pol, and env genes, the Nef protein, reverse transcriptase, and other HIV components; hepatitis, e.g., hepatitis A, B, and C, hepatitis viral antigens such as the S, M, and L proteins of hepatitis, the pre-S antigen of hepatitis B virus; influenza viral antigens hemagglutinin and neuraminidase and other influenza viral antigens; measles viral antigens such as SAG-1 or p30; rubella viral antigens such as proteins E1 and E2 and other rubella virus components; rotaviral antigens such as VP7sc components and other rotaviral components (for example, VP4, found on the surface capsid of the virus, which is cleaved by intestinal proteases into VP8 and VP5); cytomegaloviral antigens such as envelope glycoprotein B and other cytomegaloviral proteins; respiratory syncytial viral antigens, such as the RSV fusion protein, the M2 protein; varicella zoster viral antigens such as gpI, gpII, and telomerase; antigens of flavivirus associated with Yellow fever; West Nile virus antigens; dengue virus antigens; Zika virus antigens; Japanese encephalitis virus antigens; African swine fever virus antigens; Porcine Reproductive and Respiratory Syndrome (PRRS) virus antigens; and foot-and-mouth disease virus (e.g. coxsackievirus A16) antigens. Antigens of viruses that cause chronic persistent infection may be preferred, such as human papillomavirus (HPV); hepatitis C; hepatitis B; human immunodeficiency virus (HIV); herpesviruses including herpes simplex virus 1, herpes simplex virus 2 and varicella zoster virus.

In some embodiments, the viral antigen is an HPV antigen. Persistent HPV infection can result in the development of warts or precancerous lesions, the latter of which increases the risk of cancer of the cervix, vulva, vagina, penis, anus, mouth or throat, depending on the site of infection. The HPV genotypes 16, 18, 31, 52, 53 and 58 are high-risk HPV genotypes, meaning that they are strains associated with a risk of cancer. Accordingly, in some embodiments the at least one antigen is an HPV antigen derived from a high-risk genotype, for example at least one antigen corresponding to an E1, E2, E4, E5, E6 and/or E7 protein, preferably an E1, E2, E4, E5, E6 and/or E7 protein that is conserved across one or more high-risk HPV genotypes. Suitable antigens are described in WO 2019/034887, which describes nucleic acids that encode polypeptides comprised of a plurality of peptide sequences that are conserved across one or more HPV genotypes (i.e. strains). Other suitable antigens include antigens derived from L1 and/or L2 capsid proteins, as described in Finnen et al. (2003) Interactions between Papillomavirus L1 and L2 Capsid Proteins, Journal of Virology, Pages 4818-4826. In an embodiment, the HPV antigen comprises the amino acid sequence of SEQ ID NO: 4, or amino acids 1 to 140 of SEQ ID NO: 4, such as wherein the HPV antigen is encoded by nucleotides 19 to 477 of the nucleic acid sequence of SEQ ID NO: 3.

In some embodiments, the viral antigen is a coronavirus antigen. Coronavirus infection can result in the development of pathologies such as severe acute respiratory syndrome (SARS) and coronavirus disease 2019 (COVID-19). In some embodiments, the selection of epitopes is based on a comparison with homologous SARS proteins and the top predicted B and T cell epitopes identified by Fast et al. (2020) Potential T-cell and B-cell Epitopes of 2019-nCoV, bioRxiv preprint, on the basis of likely presentation across MHC alleles. Additional suitable epitopes are described in Li et al. (2020) Epitope-based peptide vaccines predicted against novel coronavirus disease caused by SARS-CoV-2, Virus Research.

Examples of bacterial antigens include *clostridium* bacterial antigens such as *Clostridium difficile* (renamed *Clostridioides difficile*) toxin A and B; pertussis bacterial antigens such as pertussis toxin; diptheria bacterial antigens such as diptheria toxin or toxoid erythematosis, and other diptheria bacterial antigen components; tetanus bacterial antigens such as tetanus toxin or toxoid and other bacterial antigen components; streptococcal bacterial antigens such as M proteins and other streptococcal bacterial antigen components; gram-negative bacilli bacterial antigens, *Mycobacterium tuberculosis* bacterial antigens such as heat shock protein 65 (HSP65), the 30 kDa major secreted protein, antigen 85A and other mycobacterial antigen components; *Vibrio cholerae* bacterial antigens such as the Cholera toxin B-subunit (CtxB); *Helicobacter pylori* bacterial antigen components; pneumococcal bacterial antigens such as pneumolysin, pneumococcal bacterial antigen components; *Haemophilus influenzae* bacterial antigens including *Haemophilus influenzae* bacterial antigen components; anthrax bacterial antigens such as anthrax protective antigen and other anthrax bacterial antigen components; rickettsiae bacterial antigens such as rompA and other rickettsiae bacterial antigen component; or bovine tuberculosis antigens; or *Brucella* antigens. Also included with the bacterial antigens described herein are any other bacterial mycobacterial, mycoplasmal, rickettsial, or chlamydial antigens. Antigens of bacteria which cause chronic persistent infection may be preferred, such as those of *Mycobacterium tuberculosis*, *Borrelia* species such as *B. burgdorferi*, *Corynebacterium diphtheriae*, *Chlamydia*, *Vibrio cholerae*, *Salmonella enterica* serovar *Typhi*; mycoplasma.

In some embodiments, the bacterial antigen is a *Vibrio cholerae* antigen. *V. cholerae* is a diarrhoeagenic intestinal pathogenic bacterium and is the etiological agent of Cholera. Suitable *V. cholerae* antigens include peptides or proteins associated with or secreted by the *V. cholerae* bacterium. During *V. cholerae* infection, the bacterium secretes the cholera toxin, a heteropolymeric holotoxin consisting one copy of the A subunit, CtxA; and five copies of the B subunit, CtxB. The CtxA subunit catalyzes the ADP-ribosylation of Gs alpha, a GTP-binding regulatory protein, to activate the adenylate cyclase. This leads to an overproduction of CAMP and eventually to a hypersecretion of chloride and bicarbonate followed by water, resulting in the characteristic cholera stool. The CtxB subunit forms a pentameric ring that The B subunit pentameric ring directs the A subunit to its target by binding to the GM1 gangliosides present on the surface of the intestinal epithelial cells. It can bind five GM1 gangliosides. It has no toxic activity by itself. Accordingly, in an embodiment, the *V. cholerae* antigen is CtxB. In some embodiments, the *V. cholerae* antigen comprises an amino acid sequence selected from the amino acid sequences encoded by SEQ ID NO: 21, or amino acids 1 to 104 of SEQ ID NO: 21, SEQ ID NO: 24, and/or SEQ ID NO: 25; or is encoded by nucleotides 270 to 581 of SEQ ID NO: 20.

In some embodiments, the infectious agent infects a host via the mucosal sites (i.e. is a mucosal infectious agent). Mucosal infections may involve the following pathogens: *Vibrio cholerae*, SARS-CoV-2, influenza type A and B virus, poliovirus, rotavirus, *Salmonella typhimurium*, adenovirus, respiratory syncytial virus, *Streptococcus pneumoniae*, *Mycobacterium tuberculosis*, *Helicobacter pylori*, Enterotoxigenic *Escherichia coli* (ETEC), *Shigella*, *Clostridium*

(*difficile/perfringens*), Syphilis, rabies virus, *Campylobacter jejun*, Gonorrhoea, Herpes simplex virus 2, Human papillomavirus (HPV), Hepatitis B/C, HIV, bovine parainfluenza virus 3, bovine respiratory syncytial virus, *Bordetella bronchiseptica*, canine parainfluenza virus, and Newcastle disease virus. The infectious disease associated with the infectious agent may be categorised based on the location. For example, the infectious agent may be SARS-CoV-2, seasonal influenza, RSV-ALRI, *Streptococcus pneumoniae* or *Mycobacterium tuberculosis*, which are associated with the respiratory tract; rotavirus, *Helicobacter pylori*, enterotoxigenic *Escherichia coli* (ETEC), *Salmonella, Shigella* or *Clostridium* (*difficile* or *perfringens*), which are associated with the GI tract; or syphilis, gonorrhoea, herpes simplex virus 2, HPV, hepatitis B, hepatitis C or HIV, which are associated with the urogenital tract.

Fungal antigens which can be used include but are not limited to *Candida* fungal antigen components; *histoplasma* fungal antigens, coccidiodes fungal antigens such as spherule antigens and other coccidiodes antigens; cryptococcal fungal antigens and other fungal antigens.

Examples of protozoal and other parasitic antigens include but are not limited to antigens from *Plasmodium* species which cause malaria, such as *P. falciparum*; *toxoplasma* antigens; *Schistosoma* antigens; *Leishmania major* and other leishmaniae antigens; and *Trypanosoma* antigens.

Cancer antigens or tumour antigens may be used, which may be categorised as tumour-associated antigens (e.g. overexpressed proteins, differentiation antigens or cancer/testis antigens), or as tumour-specific antigens (e.g. oncoviral antigens, shared neoantigens or private neoantigens). For example, cancer/testis antigens (also referred to as cancer/germline antigens) are normally expressed only in immune privileged germline cells (e.g. MAGE-A1, MAGE-A3, and NY-ESO-1); differentiation antigens refers to cell lineage differentiation antigens that are not normally expressed in adult tissue (e.g. tyrosinase, gp100, MART-1, prostate specific antigen (PSA)); and overexpressed antigens simply refer to antigens that are expressed in cancer cells above healthy or normal levels (e.g. hTERT, HER2, mesothelin, and MUC-1) (Hollingsworth & Jansen (2019), npj Vaccines, 4 (7)).

Accordingly, cancer antigens or tumour antigens may include, but are not limited to, K-Ras, survivin, dystroglycan, KS [¼] pan-carcinoma antigen, ovarian carcinoma antigen (CA125), prostatic acid phosphate, PSA, melanoma-associated antigen p97, melanoma antigen gp75, high molecular weight melanoma antigen (HMW-MAA), prostate specific membrane antigen, carcinoembryonic antigen (CEA), polymorphic epithelial mucin antigen, human milk fat globule antigen, colorectal tumour-associated antigens such as: CEA, TAG-72, CO17-1A; GICA 19-9, CTA-1 and LEA, Burkitt's lymphoma antigen-38.13, CD19, human B-lymphoma antigen-CD20, CD33, melanoma specific antigens such as ganglioside GD2, ganglioside GD3, ganglioside GM2, ganglioside GM3, tumour-specific transplantation type of cell-surface antigen (TSTA) such as virally-induced tumour antigens including T-antigen DNA tumour viruses and Envelope antigens of RNA tumour viruses, oncofetal antigen-alpha-fetoprotein such as CEA of colon, bladder tumour oncofetal antigen, differentiation antigens such as human lung carcinoma antigen L6, L20, antigens of fibrosarcoma, human leukemia T-cell antigen-Gp37, neoglycoprotein, sphingolipids, breast cancer antigens such as EGFR, EGFRvIII, FABP7, doublecortin, brevican, HER2 antigen, polymorphic epithelial mucin (PEM), malignant human lymphocyte antigen-APO-1, differentiation antigen such as I antigen found in fetal erythrocytes, primary endoderm, I antigen found in adult erythrocytes, preimplantation embryos, I (Ma) found in gastric adenocarcinomas, M18, M39 found in breast epithelium, SSEA-1 found in myeloid cells, VEP8, VEP9, Myl, VIM-D5, D156-22 found in colorectal cancer, TRA-1-85 (blood group H), C14 found in colonic adenocarcinoma, F3 found in lung adenocarcinoma, AH6 found in gastric cancer, Y hapten, Ley found in embryonal carcinoma cells, TL5 (blood group A), EGF receptor found in A431 cells, E1 series (blood group B) found in pancreatic cancer, FC10.2 found in embryonal carcinoma cells, gastric adenocarcinoma antigen, CO-514 found in Adenocarcinoma, NS-10 found in adenocarcinomas, CO-43, G49 found in EGF receptor of A431 cells, MH2 found in colonic adenocarcinoma, 19.9 found in colon cancer, gastric cancer mucins, T5A7 found in myeloid cells, R24 found in melanoma, 4.2, GD3, D1.1, OFA-1, GM2, OFA-2, GD2, and M1:22:25:8 found in embryonal carcinoma cells, SSEA-3 and SSEA-4 found in 4 to 8-cell stage embryos, a T-cell receptor derived peptide from a Cutaneous T-cell Lymphoma, fibroblast activation protein alpha (FAP) found in carcinoma, and variants thereof.

In some embodiments, the cancer antigen or tumour antigen is a multi-antigen fusion polypeptide or recombinant overlapping peptide (ROP) for K-Ras, PSA or survivin.

In some embodiments, the at least one antigen comprises one or more T cell antigen segments and/or one or more B cell antigen segments. An antigen segment is a portion of an antigen, which antigen comprises an epitope. Typically, an antigen segment comprises an epitope. T cell antigen segments may be CD4$^+$ T cell antigen segments or CD8$^+$ T cell antigen segments. A CD4$^+$ T cell antigen segment is an antigen or portion thereof comprising an epitope which is capable of being presented to a CD4$^+$ T cell in the context of MHC II. A CD8$^+$ T cell antigen segment is an antigen or portion thereof comprising an epitope which is capable of being presented to a CD8$^+$ T cell in the context of MHC I. Different antigen segments can be provided in different antigens or the same antigen. Multiple antigens or portions/fragments thereof may be used. Suitably, an antigen segment is in the form of a fragment of an antigen, such as a fragment comprising or consisting of a B or T cell epitope. This is convenient where a natural antigen is particularly large. Where a polypeptide epitope is provided in the context of a larger molecule, it may be provided contiguous with cleavage sites to facilitate cleavage of the epitope from the larger molecule in an antigen presenting cell (APC). This is particularly useful in the context of CD8$^+$ T cell epitopes, to facilitate exit of the epitope from endolysosomal compartments of the APC and entry into the cytosol for loading on MHC I. Alternatively, CD8$^+$ T cell epitopes may be provided as antigen fragments of less than about 70 amino acids, such as less than 60, less than 50, less than 40.

Suitably, the antigen is a multi-antigen fusion polypeptide comprising two or more antigen segments, such as three or more, five or more or 10 or more antigen segments, optionally with an upper limit of ≤200, preferably ≤100, more preferably ≤50 antigen segments. By "multi-antigen fusion polypeptide", we mean a polypeptide comprising antigen segments such as epitopes which are linked together, either directly or separated by appropriate linking sequences, to form an artificial polypeptide; this may be referred to as a polyepitope, artificial polyepitope, or mosaic polyepitope. Intervening sequences that occur between antigen segments in an antigen may thereby be avoided in a multi-antigen fusion polypeptide. Each antigen segment may be from the same or different antigen. Suitable linking sequences may be included to facilitate cleavage of antigen segments or epitopes, particularly CD8+ T cell antigen segments or epitopes, from the multi-antigen fusion polypeptide, as described in EP3235831. Suitably, the multi-antigen fusion polypeptide comprises at least one CD4+ T cell antigen segment and at least one CD8+ T cell antigen segment.

The antigen segments in a multi-antigen fusion polypeptide may suitably be derived from polypeptide sequences that partially overlap in the antigen from which they are derived. Where two antigen segments partially overlap, the first will have an N-terminal sequence that is not shared by the second, and the second will have a C-terminal sequence that is not shared by the first, and the two antigen segments will share a common sequence. For example, one antigen may be split into overlapping peptides that altogether contain the entire sequence of said antigen. In cases where there are multiple antigens, each may be present as overlapping peptides.

The term "overlapping peptides" encompasses recombinant overlapping peptides (ROPs), such as those described in EP3235831. By "overlapping peptides" and "ROP", we mean that the antigen is a multi-antigen fusion polypeptide as defined above (also referred to herein as multi-antigen fusion protein) comprising two or more antigen segment sequences, i.e. peptide sequences, which partially overlap. Suitably, the antigen segments in a multi-antigen fusion protein are partially overlapping, and in combination encompass ≥40%, ≥50, ≥60%, ≥70%, ≥80%, ≥90%, more preferably 100% of the amino acid sequence of the antigen from which they are derived. In other words, a first polypeptide may partially overlap with a second polypeptide, and the second polypeptide may partially overlap with the third polypeptide, etc.

In some embodiments, the multi-antigen fusion protein comprising overlapping peptides may comprise ≥3, preferably ≥5, more preferably ≥10 antigen segments; optionally with an upper limit of ≤200, preferably ≤100, more preferably ≤50 antigen segments. For example, a ROP may comprise 10 antigen segments, wherein all segments combined comprise 100% of the amino acid sequence for the whole antigen. It will be understood that every antigen segment in a multi-antigen fusion protein necessarily contains an epitope.

In some embodiments, each antigen segment comprises at least one (preferably at least 2) CD8+ epitope; at least one (preferably at least 2) CD4+ epitope; and/or at least one (such as at least 2) B cell epitope. In some embodiments, each antigen segment comprises at least one (preferably at least 2) amino acid sequence simultaneously serving as a CD8+ epitope and a CD4+ epitope.

In some embodiments, each antigen segment comprises 8-50 amino acids, preferably 10-40 amino acids, more preferably 15-35 amino acids in length. In some embodiments, each antigen segment may comprise sequences of cleavage sites located between antigen segments. For example, the sequence of a cleavage site may comprise a cleavage site of cathepsin. In some embodiments, the cleavage site is selected from the group consisting of a cleavage site of cathepsin S (as described further in Lutzner and Kalbacher, 2008, J. Biol. Chem., 283 (52): 36185-36194) (e.g., Leu-Arg-Met-Lys (SEQ ID NO: 26) or a similar cleavage site), a cleavage site of cathepsin B (e.g., Met-Lys-Arg-Leu (SEQ ID NO: 27) or a similar cleavage site), a cleavage site of cathepsin K (e.g., His-Pro-Gly-Gly (SEQ ID NO: 28) or a similar restriction site), or combinations thereof. In some embodiments, the cleavage site of cathepsin S is selected from a group consisting of X-Val/Met-X↓Val/Leu-X-Hydrophobic amino acid, Arg-Cys-Gly ↓, -Leu, Thr-Val-Gly ↓, -Leu, Thr-Val-Gln ↓, -Leu, X-Asn-Leu-Arg ↓ (SEQ ID NO: 29), X-Pro-Leu-Arg ↓ (SEQ ID NO: 30), X-Ile-Val-Gln ↓ (SEQ ID NO: 31) and X-Arg-Met-Lys ↓ (SEQ ID NO: 32); wherein each X is independently any natural amino acid, and ↓ represents cleavage position. In some embodiments, each antigen segment is directly connected in the artificial multi-antigen fusion protein via said sequence of cleavage site. In some embodiments, the sequence of cleavage site used to connect each antigen segment is the same or different. In some embodiments, the sequence of cleavage site is not contained in each antigen segment; or the sequence of cleavage site is contained in the antigen segment, while at least one cleavage product (or some or all of the cleavage products) formed after the antigen segment is digested is still a CD8+ epitope or CD4+ epitope.

In some embodiments, the multi-antigen fusion protein, optionally comprising overlapping peptides, further comprises a sequence of one or more optional elements selected from a group consisting of:
(a) a label sequence (e.g., FLAG for detection);
(b) a membrane-penetrating sequence (e.g., cell-penetrating peptide (CPP))
(c) a cathepsin cleavage site (e.g., LRMK (SEQ ID NO: 33)); and/or
(d) a cell necrosis inductive factor sequence.

In some embodiments, the artificial multi-antigen fusion protein is of 100-2000 amino acids, preferably 150-1500 amino acids, more preferably 200-1000 amino acids or 300-800 amino acids in length.

In some embodiments, the fusion protein is shown in the structure of formula I:

$$Y - (A - C)n - Z \quad \text{(I)}$$

Wherein,
A is an antigen segment;
C is a sequence of cleavage site of cathepsin;
n is a positive integer≥3;
Y is absent or is a sequence represented by "Y0-B", wherein Y0 is an adjuvant element sequence, a cell necrosis-inductive element sequence, or a combination thereof, and B is absent or a sequence of cleavage site;
Z is absent, or an adjuvant element sequence, a cell necrosis-inductive element sequence, or a combination thereof;
provided that when Z is absent, C in the last "A-C" can be absent.

In some embodiments, the cleavage site sequence is different from C (i.e., B≠C). In some embodiments, the cleavage site sequence is identical to C (i.e., B=C). In some embodiments, n is any integer from 5 to 100, preferably from 6 to 50, more preferably from 7 to 30.

Bacteria and Methods of Preparation

The bacterium of the first aspect of the invention is of the class Clostridia. Clostridia includes the orders Clostridiales, Halanaerobiales and Thermoanaerobacteriales. The order Clostridiales includes the family Clostridiaceae, which includes the genus *Clostridium*. *Clostridium* is one of the largest bacterial genera. The genus is defined by rod-shaped, Gram-positive bacteria that are obligate anaerobes and capable of producing spores.

Preferably the Clostridial bacterium or *Clostridium* species is capable of forming spores.

Certain *Clostridium* species are known to be responsible for human diseases due to the formation of toxins. These include *C. difficile, C. botulinum, C. novyi* and *C. perfringens*.

Preferably, the species is not a pathogenic *Clostridium* species. It may or may not be an attenuated strain from such a pathogenic species.

Several *Clostridium* species are found in the human lower gastrointestinal tract. The predominant Clostridia detected in lower GI tract include *Clostridium* cluster XIVa (also known as the *Clostridium Coccoides* group), and *Clostridium* cluster IV (also known as the *Clostridium leptum* group), Lopetuso et al. Gut Pathogens 2013, 5:23. The *Clostridium* cluster XIVa includes species belonging to the *Clostridium, Eubacterium, Ruminococcus, Coprococcus, Dorea*, Lachnospira, *Roseburia* and *Butyrivibrio* genera. *Clostridium* cluster IV is composed by the *Clostridium, Eubacterium, Ruminococcus* and *Anaerofilum* genera.

The *Clostridium* cluster I includes species present in the gut microbiota, while others are predominantly found in soil and other such environmental niches and represent useful industrial chassis for the production of solvents and acids. Cluster I includes: *C. aceticum, C. acetobutylicum, C. aerotolerans, C. autoethanogenum, C. baratii, C. beijerinckii, C. bifermentans, C. botulinum, C. butyricum, C. cadaveris, C. cellulolyticum, C. cellulovorans, C. chauvoei, C. clostridioforme, C. colicanis, C. difficile* (now renamed Clostridioides *difficile*), *C. drakei, C. estertheticum, C. fallax, C. feseri, C. formicaceticum, C. glycolicum. C. histolyticum, C. innocuum, C. kluyveri, C. ljungdahlii, C. lavalense, C. mayombei. C. methoxybenzovorans, C. noyyi, C. oedematiens, C. paraputrificum, C. pasteurianum, C. perfringens, C. phytofermentans, C. piliforme, C. ragsdalei, C. ramosum, C. roseum, C. saccharoperbutylacetonicum, C. scatologenes, C. septicum, C. sordellii, C. sporogenes, C. sticklandii, C. tertium, C. tetani, C. thermocellum, C. thermosaccharolyticum, C. tyrobutyricum, C. paprosolvens, C. saccharobutylicum, C. carboxidovorans, C. scindens,* and *C. autoethanogenum*. A minority of *Clostridium* cluster I species found in the human gut are associated with disease whilst the majority are generally considered to contribute to health and wellbeing. Preferably the bacteria selected from Cluster I are species associated with health benefits. These species include *C. sporogenes, C. scindens* and *C. butyricum*.

Preferably the bacterium is from cluster I, IV and/or XIVa of Clostridia.

Preferably the bacterium is detectable in the lower gastrointestinal tract, for example of a human, but not considered to permanently colonise or form part of the resident microbiota in the lower GI tract, for example of a human, or is an attenuated strain from such a resident species.

Butyrate production is widely distributed among anaerobic bacteria belonging to the Clostridial sub-phylum and in particular, to the Clostridial clusters XIVa and IV. Butyrate-producing species are found within two predominant families of commensal human colonic Clostridia, Ruminococcaceae and Lachnospiraceae. Within the Lachnospiraceae are included: *Eubacterium rectale, Roseburia inulinivorans, Roseburia intestinalis, Dorea longicatena, Eubacterium hallii, Anaerostipes hadrus, Ruminococcus torques, Coprococcus eutactus, Blautia obeum, Dorea formicigenerans, Coprococcus catus*, Within the Ruminococcaceae are included: *Faecalibacterium prausnitzii, Subdoligranulum variabile, Ruminococcus bromii, Eubacterium siraeum*.

Preferably, the bacterial species produces butyric acid. Butyrate-producing species, not considered to permanently colonise in the human lower GI tract, include *Clostridium butyricum*.

Preferably, the species is amenable to genetic engineering techniques such as transformation by electroporation or conjugation, and is typically a non-pathogenic strain. Known transformable strains include industrial solvent strains including *C. acetobutylicum, C. beijerinckii, C. saccharoperbutylacetonicum* and *C. saccharolyticum* and pathogenic species including *C. difficile*.

Preferably the species is *C. butyricum*. Suitable strains include the 'Rowett' strain, also referred to as (DSM10702/ATCC19398/NCTC 7423).

In some embodiments, the Clostridial bacterium is capable of producing short-chain fatty acids (SCFAs), such as butyrate. SCFAs include lactate, acetate and butyrate and are believed to enhance T cell responses. Butyrate can stimulate $CD8^+$ T cells and increase their effector functionality (Luu et al, 2018, Scientific Reports, 8:14430, and Trompette et al, 2018, Immunity, 48 (5): 992-1005), and high concentration of faecal butyrate has been associated with longer progression-free survival following treatment with Nivolumab or Pembrolizumab in patents with solid cancer tumours (Nomura et al, 2020, Oncology, 3 (4)). Furthermore, butyrate enhanced memory potential of activated $CD8^+$ T cells, and short-chain fatty acids (SCFAs) were required for optimal recall responses upon antigen re-encounter (Bachem et al, 2019, Immunity, 51 (2): 285-297). Therefore, there is a role for the microbiota, including *Clostridium*, in promoting $CD8^+$ T cell long-term survival as memory cells. Production of SCFAs can be determined by metabolism of carbohydrate substrates, such as glucose, to SCFAs such as butyrate, i.e. through anaerobic metabolism, typically during vegetative cell growth.

The bacterium according to the first aspect comprises a heterologous nucleic acid molecule encoding an antigen as described herein. In other words, it is an engineered bacterium. By "heterologous nucleic acid molecule", we mean that the nucleic acid molecule comprises one or more non-native sequences such as in the open reading frame (ORF) encoding an antigen, although it is alternatively envisaged that a native antigen coding-sequence could be provided under the control of non-native control sequences, such as to facilitate an increased level of gene expression of a native antigen during anaerobic cell growth. The heterologous nucleic acid molecule comprises a gene, i.e. an ORF operatively linked to a promoter, which drives transcription of the gene. Other control sequences may also be present, as known in the art (Minton et al. (2016) A roadmap for gene system development in *Clostridium*, Anaerobe, 41:104-112). The heterologous nucleic acid molecule may comprise a non-native gene. The term "non-native gene" refers to a gene that is not in its natural environment and includes a gene from one species of a microorganism that is introduced into another species of the same genus. As used herein, the term "cassette" includes any heterologous nucleic acid molecule as described herein, optionally where the heterologous nucleic acid molecule comprises one or more non-native sequences including but not limited to an ORF encoding an antigen; an ORF operatively linked to a promoter; other control sequences; a non-native gene; or any combination thereof. The heterologous nucleic acid molecule may be codon optimised for Clostridia.

The promoter is selected to enable expression of the antigen during anaerobic cell growth, such as following spore germination in anoxic conditions and/or during anaerobic vegetative cell metabolism. By "anaerobic cell growth", we mean that the Clostridial bacterium is in the form of a cell, rather than a spore, and is capable of undergoing vegetative growth i.e. cell division. Clostridial bacteria are only capable of growing under anaerobic conditions. The growth may be recognised by increase in colony forming units. Anaerobic vegetative cell metabolism may be assessed by production of SCFAs, such as butyrate, acetate, lactate or combinations thereof from an available carbohydrate source. For example, a fermentable substrate, such as a carbohydrate substrate like glucose, can be supplied to the bacteria, and the production of SCFAs, such as butyrate, acetate, lactate or combinations thereof, can be measured, indicative of metabolism. The expressions "anaerobic cell growth" and "anaerobic vegetative cell metabolism" may be used interchangeably. Thus, the promoter is selected to be active in metabolically active or growing cells.

Suitable promoters are active during cell growth and may be constitutive promoters. Promoters of genes that are essential to primary metabolism may be suitable constitutive promoters. The expression level of the antigen can be optimised by controlling gene expression using a promoter having a selected strength, such as a strong promoter. Suitably, a native Clostridia promoter is used. Suitable promoters include the fdx gene promoter of *C. perfringens* (Takamizawa et al (2004) *Protein Expression Purification* 36:70-75); the ptb, and the thl promoters of *C. acetobutylicum* (Tummala et al (1999) *App. Environ. Microbiol.* 65:3793-3799) and the cpe promoter of *C. perfringens* (Melville, Labbe and Sonenshein (1994) *Infection and Immunity* 62:5550-5558) and the thiolase promoter from *C. acetobutylicum* (Winzer et al (2000) *J. Mol. Microbiol. Biotechnol.* 2:531-541). Other suitable promoters may be *C. acetobutylicum* promoters hbd, crt, etfA, etfB amd bcd (Alsaker and Papoutsakis (2005) J Bacteriol 187:7103-7118), and the p0957 promoter; and the fdx promoter from *C. sporogeneses* (NCIMB 10696), which can be obtained from the pMTL80000 modular shuttle plasmid (Heap et al. (2009) A modular system for *Clostridium* shuttle plasmids, Journal of Microbiological Methods, 78:79-85). Preferably, the promoter of the selectable marker gene is the promoter of the th/gene of *C. acetobutylicum*, fdx gene promoter of *C. perfringens*, or fdx gene promoter of *C. sporogeneses*.

The heterologous nucleic acid molecule can be introduced into Clostridia using methods known in the art. Typically, the heterologous nucleic acid molecule is integrated into the genome as a single copy or is present on a low copy plasmid. Alternatively, it may be present on a high copy plasmid. A high copy plasmid may be present at a copy number of about 8 to 14, or greater, for example as described in SY, Mermelstein L D, Papoutsakis E T. Determination of plasmid copy number and stability in *Clostridium acetobutylicum* ATCC 824. FEMS Microbiol Lett. 1993 Apr. 15; 108 (3): 319-23.

Suitable plasmids include those that are stably maintained by the Clostridia. Suitably plasmids contain a suitable origin of replication and any necessary replication genes to allow for replication in the Clostridia. Plasmid transformation is typically achieved in Clostridia by conjugation or transformation. Methods of transformation and conjugation in Clostridia are provided in Davis, I, Carter, G, Young, M and Minton, NP (2005) "Gene Cloning in Clostridia", In: Handbook on Clostridia (Durre P, ed) pages 37-52, CRC Press, Boca Raton, USA.

The heterologous nucleic acid molecule may be integrated into the genome, typically the chromosome of Clostridia, using gene integration technology, such as by Allele Coupled Exchange (ACE) as described in WO 2010/084349 and Minton et al (2016) Anaerobe 41:104-112; or CRISPR gene editing (Atmadjaja et al. (2019) CRISPR-Cas, a highly effective tool for genome editing in *Clostridium saccharoperbutylacetonicum* N1-4 (HMT), FEMS Microbiol. Lett. 366 (6)). It is believed that Allele Coupled Exchange can be used to engineer any clostridial species, and is reliant on the initial creation of a pyrE deletion mutant that is auxotrophic for uracil and resistant to fluoroorotic acid (FOA). This enables the subsequent insertion of a DNA fragment by allelic exchange using a heterologous pyrE allele as a counter-/negative-selection marker in the presence of FOA. Following modification of the insertion site, the strain created may be rapidly returned to uracil prototrophy using ACE, allowing mutant phenotypes to be characterised in a PyrE proficient background. Crucially, wild-type copies of the inactivated gene may be introduced into the genome using ACE concomitant with correction of the pyrE allele. The initial creation of the pyrE deletion may be performed by a special form of ACE, as described in Minton et al, supra, or by means of retargeting mobile group II introns as described in WO 2007/148091. CRISPR gene editing also has wide application in Clostridia for integration of large DNA fragments and has been successfully applied in a number of clostridial strains, including *C. acetobutylicum* (Li et al. (2016) CRISPR-based genome editing and expression control systems in *Clostridium acetobutylicum* and *Clostridium beijerinckii*. Biotechnol J. 11:961-72), *C. beijerinckii* (Li et al. (2016) and Wang et al. (2015) Markerless chromosomal gene deletion in *Clostridium beijerinckii* using CRISPR/Cas9 system. J Biotechnol. 200:1-5), *C. pasteurianum* (Pyne et al. (2016) Harnessing heterologous and endogenous CRISPR-Cas machineries for efficient markerless genome editing in *Clostridium*. Sci Rep. 6:25666) and *C. saccharoperbutylacetonicum* (Wang et al. (2017) Genome editing in *Clostridium saccharoperbutylacetonicum* N1-4 using CRISPR-Cas9 system. Appl Environ Microbiol. 83: e00233-17).

Where the heterologous nucleic acid molecule is integrated into the genome as a single copy or is present on a low copy plasmid, the amount of antigen expressed will typically be lower than if the heterologous nucleic acid molecule is present on a high copy number plasmid. The inventors have found that an antigen-specific immune response can be effectively stimulated even when the heterologous nucleic acid molecule is integrated into the genome as a single copy. The amount of antigen expressed per cell weight of clostridial cells undergoing anaerobic cell growth may typically be in the range of up to 50, 100, 150, 200, 250, 300, 350, 400, 500, 600, 700, 800, 900 ng/mg, 1 μg/mg, 1.5, 2.0, 2.5, 3.0, 4.0, 5.0, 10 or 20 μg/mg dry cell weight (but greater than 0 ng/mg dry cell weight, typically greater than 10 ng/mg, 20 ng/mg or 40 ng/mg). Any range between any two of these values is envisaged. For example, the amount of antigen expressed per cell weight of clostridial cells undergoing anaerobic cell growth may be from 10 to 400 ng/mg dry cell weight; 20 to 200 ng/mg dry cell weight; 40 to 100 ng/mg dry cell weight; 100 ng to 5 μg/mg dry cell weight; 200 ng to 2.5 μg/mg dry cell weight; 400-1500 ng/mg dry cell weight; or about 800 ng/mg dry cell weight; or it may be between 1 and 5 μg/mg dry cell weight, or 2 and 4 μg/mg dry cell weight, such as about 3 μg/mg dry cell weight; or any other combination. The amount can be determined by culturing clostridial cells, extracting antigen typically comprising a detection tag such as FLAG, and quantifying the antigen by detection means such as ELISA or western blotting. Protein standards, such as FLAG-tag standards available from Sigma, may be used in such assays to construct a standard curve. In the Example 1, the FLAG-ROPs were barely detectable, corresponding to <25 ng in a specific volume of cells cultured to OD1.0. Estimating the dry weight of the bacteria in that amount of culture equates to <80 ng/mg dry cell weight, assuming the cell density in OD1.0 is 0.3 g/L. The amount of antigen produced may be varied depending on the strength of the promoter, the number of copies of the heterologous nucleic acid molecule per cell etc.

In any of the embodiments, the bacterial cell may comprise a further heterologous nucleic acid molecule encoding an immunostimulatory agent or adjuvant, which is capable of being co-expressed with the antigen. Typical immunostimulatory agents may be polypeptides, such as cytokines, such as IL-12, IL-18 or GM-CSF, IFN-γ, IL-2, IL-15. For example, HPV16 and HPV18 E6/E7 antigens have been combined with IL-12 in clinical trials (Hasan et al. (2020) A Phase 1 Trial Assessing the Safety and Tolerability of a Therapeutic DNA Vaccination Against HPV16 and HPV18 E6/E7 Oncogenes After Chemoradiation for Cervical Cancer, Int J Radiat Oncol Biol Phys. 107 (3): 487-498). Thus, a suitable immunostimulatory agent to include with any HPV antigen is IL-12.

A corresponding aspect of the invention provides a method for preparing a bacterium according to the first aspect comprising introducing at least one heterologous nucleic acid molecule into the bacterium.

Pharmaceutical Compositions and Methods of Preparation

A second aspect of the invention is a pharmaceutical composition comprising a bacterium according to the first aspect.

A corresponding aspect of the invention provides a method for preparing a pharmaceutical composition according to the second aspect comprising formulating the bacteria with one or more pharmaceutically acceptable diluents or excipients.

While it is possible for the bacterium to be administered alone, it is preferable for it to be present in a pharmaceutical composition. The present invention includes pharmaceutical compositions comprising at least one pharmaceutically acceptable carrier, excipient or further component such as therapeutic and/or prophylactic ingredient (such as adjuvant). A "pharmaceutically acceptable carrier" as referred to herein, is any known compound or combination of known compounds that are known to those skilled in the art to be useful in formulating pharmaceutical compositions. The carrier may include one or more excipients or diluents.

The Clostridia can be prepared by fermentation carried out under suitable conditions for growth of the bacteria. After fermentation, the bacteria can be purified using centrifugation and prepared to preserve activity. The bacteria in the composition are provided as viable organisms. The composition can comprise bacterial spores and/or vegetative cells. The bacteria can be dried to preserve the activity of the bacteria. Suitable drying methods include freeze drying, spray-drying, heat drying, and combinations thereof. The obtained powder can then be mixed with one or more pharmaceutically acceptable excipients as described herein.

The spores and/or vegetative bacteria may be formulated with the usual excipients and components for oral administration, as described herein. In particular, fatty and/or aqueous components, humectants, thickeners, preservatives, texturing agents, flavour enhancers and/or coating agents, antioxidants, preservatives and/or dyes that are customary in the pharmaceutical and food supplement industry. Suitable pharmaceutically acceptable carriers include microcrystalline cellulose, cellobiose, mannitol, glucose, sucrose, lactose, polyvinylpyrrolidone, magnesium silicate, magnesium stearate and starch, or a combination thereof. The bacteria can then be formed into a suitable orally ingestible forms, as described herein. Suitable orally ingestible forms of probiotic bacteria can be prepared by methods well known in the pharmaceutical industry. Suitable pharmaceutical carriers, excipients and formulations are described in Remington: The Science and Practice of Pharmacy 22nd Edition, The Pharmaceutical Press, London, Philadelphia, 2013.

Pharmaceutical compositions of the invention can be placed into dosage forms, such as in the form of unit dosages. Pharmaceutical compositions include those suitable for oral or rectal administration. The compositions of the invention may be administered once, or they may be administered sequentially as part of a treatment regimen. Preferably, administration is oral using a convenient dosage regimen.

Suitable oral dosage forms include tablet, capsule, powder (e.g. a powder in sachet) and liquid. Where the bacterium is for administering orally, it is suitably provided in the form of a spore; or in the form of a vegetative cell in a delayed release pharmaceutical composition.

Pharmaceutical compositions of the invention can also be formulated for rectal administration including suppositories and enema formulations. In the case of suppositories, a low melting wax, such as a mixture of fatty acid glycerides or cocoa butter is first melted and the active component is dispersed homogeneously, for example, by stirring. The molten homogeneous mixture is then poured into convenient sized moulds, allowed to cool, and to solidify. Enema formulations can be semi-solid including gels or ointments or in liquid form including suspensions, aqueous solutions or foams, which are known to those skilled in the art.

The pharmaceutical compositions of the invention are administered such that an effective amount of bacterium is delivered to an anaerobic section of the gut. By "effective amount of bacterium" we include the meaning that the bacterium results in the delivery of an amount of antigen effective to induce a suitable immune response to said antigen; or to prevent, ameliorate or treat a disease. For example, for a viral infection where a CTL response may be suitable, the antigen will be in an amount effective to induce a $CD8^+$ CTL response against that antigen.

Suitably the bacteria may be present in the pharmaceutical composition in an amount equivalent to between $1 \times 10^5$ to $1 \times 10^{11}$ colony forming units/g (CFU/g) of dry composition. Suitably, the bacteria may be present in an amount of $1 \times 10^6$ to $1 \times 10^{10}$ CFU per unit dosage form, preferably from about $1 \times 10^7$ to $1 \times 10^9$ CFU per unit dosage form, such as about $1 \times 10^8$ CFU per unit dosage form.

Pharmaceutical compositions may include adjuvants or immunostimulatory molecules, particularly pharmaceutical compositions that are formulated for delayed release. However, it is envisaged that an adjuvant may not be necessary, or may be necessary only in a quantity that is lower than would be required if the antigen were provided in a conventional polypeptide antigen vaccine formulation, or that a less toxic adjuvant only may be required. Thus, pharmaceutical compositions which lack an adjuvant are envisaged, as are those which contain only an adjuvant which is appropriate for human use, such as alum.

Adjuvants are any substance whose admixture into the pharmaceutical composition increases or otherwise modifies the immune response to an antigen. Adjuvants can include but are not limited to $AlK(SO_4)_2$, $AlNa(SO_4)_2$, $AlNH(SO_4)_4$, silica, alum, $Al(OH)_3$, $Ca3(PO_4)_2$, kaolin, carbon, aluminium hydroxide, muramyl dipeptides, N-acetyl-muramyl-L-threonyl-D-isoglutamine (thr-DMP), N-acetyl-nor-nuramyl-L-alanyl-D-isoglutamine (CGP 11687, also referred to as nor-MDP), N-acetylmuramyl-L-alanyl-D-isoglutaminyl-L-alanine-2-(1'2'-dipalmitoyl-s-n-glycero-3-hydroxphosphoryloxy)-ethylamine (CGP 19835A, also referred to as MTP-PE), RIBI (MPL+TDM+CWS) in a 2% squalene/Tween-80® emulsion, lipopolysaccharides and its various derivatives, including lipid A, Freund's Complete Adjuvant (FCA), Freund's Incomplete Adjuvants, Merck Adjuvant 65, polynucleotides (for example, poly IC and poly AU acids), wax D from *Mycobacterium tuberculosis*, substances found in *Corynebacterium parvum, Bordetella pertussis*, and members of the genus *Brucella*, liposomes or other lipid emulsions, Titermax, ISCOMS, Quil A, ALUN (see U.S. Pat. Nos. 58,767 and 5,554,372), Lipid A derivatives, choleratoxin derivatives, HSP derivatives, LPS derivatives, synthetic peptide matrixes or GMDP, Interleukin 1, Interleukin 2, Montanide ISA-51 and QS-21.

Additional adjuvants or compounds that may be used to modify or stimulate the immune response include ligands for Toll-like receptors (TLRs). In mammals, TLRs are a family of receptors expressed on DCs that recognize and respond to molecular patterns associated with microbial pathogens. Several TLR ligands have been intensively investigated as vaccine adjuvants. Bacterial lipopolysaccharide (LPS) is the TLR4 ligand and its detoxified variant mono-phosphoryl lipid A (MPL) is an approved adjuvant for use in humans. TLR5 is expressed on monocytes and DCs and responds to flagellin whereas TLR9 recognizes bacterial DNA containing CpG motifs. Oligonucleotides (OLGs) containing CpG motifs are potent ligands for, and agonists of, TLR9 and have been intensively investigated for their adjuvant properties.

Other agents that stimulate the immune response (immunostimulatory agents) can included, such as cytokines that are useful as a result of their lymphocyte regulatory properties. Suitable cytokines may include interleukin-12 (IL-12), GM-CSF or IL-18.

Pharmaceutical compositions of the invention can be formulated as capsules comprising viable cells, such as vegetative cells or spores, wherein the capsules comprise a delayed-release layer or coating that allows for the release of the viable cells, typically vegetative cells in an anaerobic section of the lower GI tract following oral administration. By "delayed-release" or "delayed release", we mean that release of the bacterium is delayed for a certain period of time after administration or application of the dosage (the delay is also known as the lag time). This modification is achieved by special formulation design and/or manufacturing methods. The subsequent release can be similar to that of an immediate release dosage form.

Excipients and formulations for delayed release are well known in the art and specific technologies are commercially available.

Various strategies have been proposed for targeting orally administered drugs to the colon, including: coating with pH-sensitive polymers; formulation of timed released systems; exploitation of carriers that are degraded specifically by colonic bacteria; bio-adhesive systems; and osmotic controlled drug delivery systems. Microbially degradable polymers, especially azo-crosslinked polymers, have been investigated for use as coatings for drugs targeted to the colon.

Certain plant polysaccharides such as amylose, inulin, pectin, and guar gum remain unaffected in the presence of gastrointestinal enzymes and have been explored as coatings for drugs for the formulation of colon-targeted drug delivery systems. Additionally, combinations of plant polysaccharides with crustacean extract, including chitosan or derivatives thereof, are proving of interest for the development of colonic delivery systems.

Examples of excipients for delayed-release formulations include hydrogels that are able to swell rapidly in water and retain large volumes of water in their swollen structures. Different hydrogels can afford different drug release patterns and the use of hydrogels to facilitate colonic delivery has been investigated. For example, hydrogels have been prepared using a high-viscosity acrylic resin gel, Eudispert hv, which has excellent staying properties in the lower part of the rectum over a long period. Eudragit® polymers (Evonik Industries) offer different forms of coating including gastro resistance, pH-controlled drug release, colon delivery, protection of and protection from actives.

Pharmaceutical compositions may be prepared by coating bacteria and one or more pharmaceutically acceptable carrier, excipient and/or diluent with a delayed-release layer or coating using techniques in the art. For example, coatings may be formed by compression using any of the known press coaters. Alternatively, the pharmaceutical compositions may be prepared by granulation and agglomeration techniques, or built up using spray drying techniques, followed by drying.

Coating thickness can be controlled precisely by employing any of the aforementioned techniques. The skilled person can select the coating thickness as a means to obtain a desired lag time, and/or the desired rate at which bacterium is released after the lag time.

pH-dependent systems exploit the generally accepted view that pH of the human GI tract increases progressively from the stomach (where pH can be between about 1 and 2, which increases to pH 4 during digestion), through the small intestine (where pH can be between about 6 and 7) at the site of digestion, increasing in the distal ileum. Coating tablets, capsules or pellets with pH-sensitive polymers provides delayed release and protects the active drug from gastric fluid.

The pharmaceutical compositions of the invention can be formulated to deliver a bacterium according to the first aspect to the GI tract at a particular pH. Commercially available excipients include Eudragit® polymers that can be used to deliver the bacteria at specific locations in the GI tract. For example, the pH in the duodenum can be above about 5.5. Eudragit® L 100-55 (Powder), Eudragit® L 30 D-55 (Aqueous dispersion), and/or Acryl-EZE® (Powder) can be used, for example as a ready-to-use enteric coating based on Eudragit® L 100-55. The pH in the jejunum can be from about 6 to about 7 and Eudragit® L 100 (Powder) and/or Eudragit® L 12.5 (Organic solution) can be used. Delivery to the colon can be achieved at a pH above about 7.0 and Eudragit® S 100 (Powder), Eudragit® S 12.5 (Organic solution), and/or Eudragit® FS 30 D (Aqueous dispersion) can be used. PlasACRYL™ T20 glidant and plasticizer premix, specifically designed for Eudragit® FS 30 D formulations can also be used.

Suitably, pharmaceutical compositions of the invention are formulated to deliver the bacterium according to the first aspect to the GI tract, preferably by oral administration.

The human GI tract consists of digestive structures stretching from the mouth to the anus, including the oesophagus, stomach, and intestines. The GI tract does not include the accessory glandular organs such as the liver, biliary tract or pancreas. The intestines include the small intestine and large intestine. The small intestine includes the duodenum, jejunum and ileum. The large intestine includes the cecum, colon, rectum and anus. The upper GI tract includes the buccal cavity, pharynx, oesophagus, stomach, and duodenum. The lower GI tract includes the small intestine (below the duodenum) and the large intestine. Preferably, the pharmaceutical compositions of the invention deliver the bacterium according to the first aspect to the lumen or mucosal surface of the GI tract, more preferably the lumen or mucosal surface of the large intestine, and more preferably the lumen or mucosal surface of the colon. Preferably, the pharmaceutical compositions of the invention deliver bacterium according to the first aspect to anaerobic sections of the lower GI tract, preferably the colon and/or terminal small intestine (ileum, also referred to as the "terminal ileum").

A steep oxygen gradient exists within the human intestinal tract, as reviewed in Zheng, Kelly and Colgan, American Journal of Physiology-Cell Physiology 2015 309:6, C350-C360. Breathable air at sea level has a $P_{O_2}$ of ~145 mmHg (~21% $O_2$). Measurements of the healthy lung alveolus have revealed a $P_{O_2}$ of 100-110 mmHg. By stark contrast, the most luminal aspect of the healthy colon exists at a $P_{O_2}$ below 10 mmHg (1.4% $O_2$). Such differences reflect a combination of oxygen sources, local metabolism, and the anatomy of blood flow. The $P_{O_2}$ drops precipitously along the radial axis from the intestinal submucosa to the lumen, which is home to trillions of anaerobic microbes.

Where the bacterium is delivered orally as a spore, it will transit through the GI tract until it reaches the anaerobic portions, where it will germinate and grow. Anaerobic sections of the lower GI tract include the terminal ileum and colon. The colon may have a lower $P_{O2}$ than the terminal ileum, in view of Zheng, supra, and bacterial growth may therefore be more efficient in the colon. $P_{O2}$ required to trigger spore germination and anaerobic metabolism or growth may be in the range of 0 to 2%.

The human colon volume (sum of ascending/descending and transverse) is around 600 ml (Pritchard, S. E. et al. (2-14) Neurogastroenterol. Motil. 26, 124-130) whereas the entire intestine of a mouse is around 1 ml in volume (McConnell, E. L., Basit, A. W. & Murdan, S. (2008) J. Pharm. Pharmacol. 60, 63-70). The approximate total GI transit time is around 5-6 hours in a mouse (Padmanabhan, P., et al. (2013) EJNMMI Res. 3, 60 and Kashyap, P. C. et al. (2013) Gastroenterology 144, 967-977) and the colon transit times have been estimated to be between 23 and 40 hours in humans (Degen, L. P. & Phillips, S. F. (1996) Gut 39, 299-305 and Wagener, S., et al (2004) J. Pediatr. Surg. 39, 166-169-169). Since transit time in the human gut is five times longer than in mouse, fewer spores are needed (e.g. by a factor of five) to achieve the same concentration of antigen if the colon volumes were the same.

Further, because the bacteria are resident in the human colon approximately five time longer than the mouse colon, there will be a longer duration for cell division (by a factor of five), therefore resulting in more cell numbers and in an increase in production of antigen. The lab fermentation based doubling time of the bacterial strain CHN1 is similar to that for E. coli and E. coli have a gut doubling time of about 3 hours (Myhrvold, C., et al (2015) Nat. Commun. 6, 10039). CHN1 may undergo 10 doublings of cells during gut transit, equating to a three order of magnitude increase in cell numbers. In the mouse there is only sufficient time for around two doublings of cells equating to less than a 10-fold increase in cell numbers. Approximately 100 times more cells will grow from each spore delivered to the human gut relative to the mouse gut. When accounting for gut volume differences, colon transit times and cell division within the gut, approximately the same dose delivered to a mouse and a human will result in approximately the same content of antigen within the gut lumen.

Although the above specifies the difference between the human gut and murine gut, this can be readily adapted to other hosts based on what is known in the art (e.g. to adapt the delivery of the bacterium to the intended host, for example to other mammals or birds.

A pharmaceutical composition taken on an empty stomach is likely to arrive in the ascending colon about 5 hours after dosing, with the actual arrival dependent largely on the rate of gastric emptying. Drug delivery within the colon is greatly influenced by the rate of transit through this region. In healthy men, capsules pass through the colon in 20-30 hours on average. Solutions and particles usually spread extensively within the proximal colon and often disperse throughout the entire large intestine.

The pharmaceutical compositions of the invention can be formulated for time-controlled delivery to the GI tract, i.e. to deliver the bacterium according to the first aspect and, therefore, the antigen after a certain time (lag time) following administration.

Commercially available excipients for time-controlled delivery include Eudragit® RL 30 D (Aqueous dispersion) and Eudragit® RL 12.5 (Organic solution). These excipients are insoluble, high permeability, pH-independent swelling excipients that can provide customized release profiles by combining with Eudragit® RS at different ratios. Eudragit® RS 30 D (Aqueous dispersion) and Eudragit® RS 12.5 (Organic solution) are insoluble, low permeability, pH-independent swelling excipients that can provide customised release profiles by combining with Eudragit® RL at different ratios. Eudragit® NE 30 D (Aqueous dispersion), Eudragit® NE 40 D (Aqueous dispersion), and Eudragit® NM 30 D (Aqueous dispersion) are insoluble, low permeability, pH-independent swelling excipients that can be matrix formers.

Preferably, the pharmaceutical compositions can be formulated to deliver the bacterium according to the first aspect to the GI tract about 4 hours after administration (i.e. after oral administration). Preferably, the pharmaceutical compositions can be formulated to deliver the bacterium according to the first aspect between about 4 and 48 hours after administration, preferably between about 5 and 40 hours after administration, such as about 5, 10, 15, 20 or 24 hours after administration; preferably between about 5 and 10, 5 and 15, 5 and 20, or between about 10 and 24, 15 and 24 or 20 and 24 hours after administration.

Suitably, the pharmaceutical compositions are for administration between meals or with food.

Growth of the bacterium according to the first aspect of the invention upon arrival in the anaerobic portion of the gut can be verified by culture, including stool culture. In experimental models, bacteria may be cultured from portions of the GI tract obtained from the experimental animal. Growth of the bacterium according to the first aspect of the invention upon arrival in the anaerobic portion of the gut can also be verified by immunohistological approaches known to the skilled person, for example by using antibodies that recognise the bacteria.

The genetically engineered anaerobic bacteria that produce antigen can also be incorporated as part of a food product, i.e. in yoghurt, milk or soy milk, or as a food supplement. Such food products and food supplements can be prepared by methods well known in the food and supplement industry.

The compositions can be incorporated into animal feed products as a feed additive.

The growth and degree of colonisation in the gut of the genetically engineered bacteria can be controlled by the species and strain choice and/or by providing specific substrates that the bacteria thrive on as a prebiotic, either within the same dose that contains the probiotic or as a separately ingested composition.

Accordingly, the composition may also further comprise or be for administering with a prebiotic to enhance the growth of the administered probiotic. The prebiotic may be administered sequentially, simultaneously or separately with a bacterium as described herein. The prebiotic and bacterium can be formulated together into the same composition for simultaneous administration. Alternatively, the bacteria and prebiotic can be formulated separately for simultaneous or sequential administration.

Prebiotics are substances that promote the growth of probiotics in the intestines. They are food substances that are fermented in the intestine by the bacteria. The addition of a prebiotic provides a medium that can promote the growth of the probiotic strains in the intestines. One or more monosaccharides, oligosaccharides, polysaccharides, or other prebiotics that enhances the growth of the bacteria may be used.

Preferably, the prebiotic may be selected from the group comprising of oligosaccharides, optionally containing fructose, galactose, mannose; dietary fibres, in particular soluble fibres, soy fibres; inulin; or combinations thereof. Preferred prebiotics are fructo-oligosaccharides (FOS), galacto-oligosaccharides (GOS), isomalto-oligosaccharides, xylo-oligosaccharides, oligosaccharides of soy, glycosylsucrose (GS), lactosucrose (LS), lactulose (LA), palatinose-oligosaccharides (PAO), malto-oligosaccharides, pectins, hydrolysates thereof or combinations thereof.

Medical Uses

A third aspect of the invention provides the bacterium of the first aspect or the pharmaceutical composition of the second aspect for use in medicine.

A fourth aspect of the invention provides a bacterium of the class Clostridia for use in generating an antigen-specific response in a subject, wherein the bacterium comprises a heterologous nucleic acid molecule encoding an antigen, and wherein the bacterium is capable of expressing the antigen in an intracellular compartment of the bacterium during anaerobic cell growth.

A corresponding aspect provides a method of generating an antigen-specific immune response in a subject, comprising administering a bacterium of the class Clostridia, wherein the bacterium comprises a heterologous nucleic acid molecule encoding an antigen, and wherein the bacterium is capable of expressing the antigen in an intracellular compartment of the bacterium during anaerobic cell growth.

A fifth aspect of the invention provides a bacterium of the class Clostridia for use in the therapeutic or preventive treatment of a disease in a subject, wherein the bacterium comprises a heterologous nucleic acid molecule encoding an antigen, wherein the bacterium is capable of expressing the antigen in an intracellular compartment of the bacterium during anaerobic cell growth, wherein the antigen is an infectious agent antigen and the disease is the disease caused by the infectious agent, or the antigen is a tumour antigen and the disease is cancer.

A corresponding aspect provides a method of preventing, ameliorating or treating a disease in a subject, comprising administering a bacterium of the class Clostridia, wherein the bacterium comprises a heterologous nucleic acid molecule encoding an antigen, wherein the bacterium is capable of expressing the antigen in an intracellular compartment of the bacterium during anaerobic cell growth, wherein the antigen is an infectious agent antigen and the disease is the disease caused by the infectious agent, or the antigen is a tumour antigen and the disease is cancer.

Typically, in any of these aspects of the invention, the subject is a mammal or bird, typically a mammal, preferably a human. Suitable mammals for veterinary vaccination include agricultural animals, such as ungulates, including cows, sheep or goats; or horses; or domestic animals such as cats or dogs. Suitable birds include chickens or turkeys. Typically, where the antigen is an infectious agent antigen, the subject is of a species which is susceptible to a disease caused by the infectious agent. Typically, where the antigen is a tumour antigen, the subject is of a species for which the tumour antigen is characteristic of a tumour.

These uses involve vaccination. Appropriate doses for vaccination, and schedules of administration (e.g. primary and one or more booster doses) are described in Vaccines: From concept to clinic, Paoletti and McInnes, eds, CRC Press, 1999. For example, vaccination may be effective after a single dose, or one to three inoculations may be provided about 3 weeks to six months apart. In some embodiments, the vaccination may be provided in a vaccination regimen with a different vaccine, such as a prime-boost regimen in which the vaccine of the invention is either the prime or booster vaccine, and the other of those is a different vaccine. There may be more than one booster. Typically, such regimens will be directed at the same infectious agent or the same cancer.

Medical Uses in Generating an Antigen-Specific Immune Response

In this fourth aspect, the antigen may be any antigen as defined herein, not limited to tumour antigen or infectious agent antigen. For example, the antigen may include an artificial sequence (i.e., artificially designed sequence, which is not present in nature).

By "antigen-specific immune response" we include any cellular or humoral immune response that is antigen-specific, i.e. T cell responses such as $CD4^+$, $CD8^+$ T-cell responses, or B cell (antibody) responses.

In a typical immune response, antigen is delivered to antigen presenting cells (APCs), especially dendritic cells (DC), which then stimulate and elicit antigen specific cytotoxic $CD8^+$ (CTL) and/or helper $CD4^+$ T lymphocytes. Also known as professional APCs, DCs sample antigens in the microenvironment and process them intracellularly (for example, following the antigen being phagocytosed). Upon DC activation (e.g. due to an inflammatory signal), they migrate to the lymph nodes whereby they can activate the adaptive immune response. Without wishing to be bound by theory, bacteria of the class Clostridia may be internalised by APCs, particularly DCs in the intestine, such as mucosal DCs. For example, a DC that has taken up (e.g. phagocytosed) an antigen by virtue of having internalised a bacterium of the class Clostridia may become activated, and may migrate to the lymph node and activate T-cells that have specificity to said antigen, and thence B cells. The APC may be exposed to a further activating signal in addition to the bacterium of the class Clostridia, such as provided by an adjuvant, lipopolysaccharide (LPS), or inflammatory cytokine.

T cells express a T-cell receptor that recognises antigenic peptides that are presented by major histocompatibility complex (MHC), referred to as human leukocyte antigen (HLA) in humans. Helper $CD4^+$ T-cells can effectively stimulate and amplify cytotoxic $CD8^+$ T-cells and help B cells to produce antibodies. A CD4+ response can be categorised by the type of CD4+ T-cell that is induced/activated. For example, a CD4+ response may be that of a T helper (Th) 1, Th2, and/or Th17. Th1, Th2 and Th17 cells can be categorised by markers (e.g. cell surface markers), cytokine secretion and/or functional assays that are known to the skilled person. The type of CD4+ response (or combination thereof) achieved may depend on the antigen being used and/or adjuvants or other immunomodulatory molecules, which may be selected depending on the desired outcome. For example, Th2 responses are more suitable than Th1 responses for protecting against helminth infection. Th1 responses, which are often associated with IFN-γ production, are more suitable than Th2 responses for protecting against intracellular parasites. Th1 cells stimulate CD8+ killer T cells, Th2 cells stimulate B cells; and Th17 cells facilitate inflammation.

CD8+ T-cells can specifically recognise and induce apoptosis of target cells containing target antigens. Activation of specific CD8+ T-cells depends on the antigen being efficiently presented to MHC class I molecule (HLA-I antigen in humans). CD8+ cytotoxic T lymphocytes (CTLs) are the main cell type targeted by prophylactic and therapeutic cellular immune vaccines because they can directly recognise and destroy tumour cells or cells infected by intracellular infectious agents, such as viruses. Therefore, for the purposes of targeting tumour antigens and antigens of intracellular infectious agents such as viruses, it can be advantageous to mount a CD8+ response as these cells are capable of directly recognising these antigens presented on MHC class I molecules on the cell surface. CTLs are also associated with anti-tumour responses.

A combination of CD4+ and CD8+ responses may be beneficial, as subsets of CD4+ cells may support and/or enhance the activity of CD8+ cells by releasing cytokines into the local microenvironment. Accordingly, in some embodiments, a combination of T-cell responses is induced by the antigen.

The efficiency of single peptide antigens to stimulate an immune response may differ between subjects and populations based on their expression profiles for MHC (or in the case of humans, HLA). MHC/HLA haplotypes differ between subjects, with each haplotype of MHC/HLA being capable of binding and thereby presenting particular types of peptide fragments. For example, for the same antigen, the peptide fragments presented by the MHC/HLA of a first subject may differ in sequence to those presented by the MHC/HLA of a second subject. These MHC/HLA subtypes may differ in their ability to induce an immune response, resulting in differences within populations for responsiveness to a particular antigen. This is a major drawback of single peptide-based vaccines, as not all subjects will be capable of processing and presenting the peptide adequately to induce the required immune response. This limitation of single-peptide vaccines can be overcome by using multi-antigen fusion proteins, such as polyepitopes and/or polypeptides comprising overlapping peptides as described above, including the ROPs described herein and in EP 3 235 831 A1. ROPs have been shown to be capable of simultaneously inducing CD4+ and CD8+ T-cell responses and comprise multiple peptide segments that vastly increases the likelihood of there being a segment that suits a particular subject. This overcomes the MHC/HLA restriction of a population.

A B cell response is characterised by antibodies (i.e. "immunoglobulins" or "Ig") that target specific antigens. B cells are able to internalise components, such as polypeptides, and present fragments of polypeptide molecules on the cell surface in complex with MHC class I or II molecules. B cells may also express on their cell surface antigen specific B cell receptors (BCR). Unlike T-cells and the TCR, which rely upon antigen being presented by MHC, the BCR can recognise antigenic epitopes without them being presented by MHC (i.e. BCR can also recognise soluble antigen). Antigen activates B cells bearing appropriate surface immunoglobulin directly to produce IgM. In some instances, B cells rely upon T-cells for activation by presenting antigen loaded to MHC class II. CD4+ T cells, having responded to processed Ag, may induce immunoglobulin class-switching from IgM to IgG. However, some antigens are able to activate B cells in a T-cell independent manner. Therefore, in some embodiments, the induction of a B cell response may be in conjunction with the induction of a T-cell response (CD4+ and/or CD8+).

Suitable antibody responses may include different isotypes, such as IgA and/or IgG isotypes. The type of antibody response achieved may depend on the antigen being used and/or adjuvants or other immunomodulatory molecules, which may be selected depending on the desired outcome.

IgA, also referred to as sIgA in its secretory form is an antibody that plays a crucial role in the immune function of mucous membranes. The amount of IgA produced in association with mucosal membranes is greater than all other types of antibody combined. In absolute terms, between three and five grams are secreted into the intestinal lumen each day. This represents up to 15% of total immunoglobulins produced throughout the body. IgA has two subclasses (IgA1 and IgA2) and can be produced as a monomeric as well as a dimeric form. The IgA dimeric form is the most prevalent and is also called secretory IgA (sIgA). sIgA is the main immunoglobulin found in mucous secretions, including tears, saliva, sweat, colostrum and secretions from the genitourinary tract, gastrointestinal tract, prostate and respiratory epithelium. It is also found in small amounts in blood. The secretory component of sIgA protects the immunoglobulin from being degraded by proteolytic enzymes; thus, sIgA can survive in the harsh gastrointestinal tract environment and provide protection against microbes that multiply in body secretions. sIgA can also inhibit inflammatory effects of other immunoglobulins. IgA is a poor activator of the complement system and opsonizes only weakly.

There are several subtypes of IgG. In humans, IgG1 and IgG3 are associated with T helper 1-type responses, complement fixation, phagocytosis by high affinity FcRs and are indicative of protective immunity, whereas IgG2 and IgG4 responses tend to be less effective.

In some embodiments, the antigen-specific immune response induced by the antigen is a B-cell response. In some embodiments, the antigen-specific immune response includes the generation of antigen-specific antibodies, i.e., the antigen induces the production of antigen-specific antibodies that are specific for (i.e., bind to) said antigen. In some embodiments, the antigen-specific antibody belongs to an antibody serotype selected from the group comprising or consisting of: IgA, IgM, IgG, or any combination thereof. In some embodiments, the antigen-specific antibody is a secreted antibody, for example secretory IgA (sIgA), secretory IgM, or secretory IgG. Accordingly, in some embodiments, the antigen induces the production of antigen-specific IgA, antigen-specific IgM, antigen-specific IgG, or any combination thereof. In some embodiments, the *Vibrio cholerae* antigen as described herein induces a *Vibrio cholerae* antigen-specific immune response, for example a *Vibrio cholerae* antigen-specific B-cell immune response or the production of *Vibrio cholerae* antigen-specific antibodies. The *Vibrio cholerae* antigen-specific antibody may be IgA, IgM, or IgG. In some embodiments, the *Vibrio cholerae* antigen-specific antibody is IgA, optionally secretory IgA (sIgA). In some embodiments, the *Vibrio cholerae* antigen is CtxB. In some embodiments, CtxB induces a CtxB-specific response, for example a CtxB-specific B cell response or the production of CtxB-specific antibodies. The CtxB-specific antibody may be IgA, IgM, or IgG. In some embodiments, the CtxB-specific antibody is IgA, optionally secretory IgA (sIgA).

A bacterium comprising antigen, as described herein, can be tested for capability for inducing an antigen-specific immune response, such as following oral immunisation in a mouse model. The bacterial spores (e.g. *C. butyricum*) comprising an antigen of interest (e.g. HPV, OVA, or a *V. cholerae* antigen such as CtxB) or a ROP corresponding to an antigen (e.g. ROP-HPV or ROP-OVA) can be administered to a group of mice by oral gavage. A negative control of spores from the same bacterium but without antigen (or ROP-antigen) may be administered to a separate group of mice. A comparison of the bacterium with antigen and such a negative control will attribute any differences as being antigen specific. A suitable positive control for this experiment includes the parenteral administration by subcutaneous injection of the antigen (e.g. ROP-HPV or ROP-OVA, or a *V. cholerae* antigen such as CtxB), which will be taken up by DCs resulting in activation of an immune response to said antigen. Therefore, a comparison with this positive control will give an indication as to whether the immune response induced by the bacterium comprising antigen is equivalent to the administration of the antigen itself.

Accordingly, this type of system can be used to identify antigen specific responses and is not limited to a specific type of antigen. Indeed, the negative control would remain the same (bacterium not comprising the antigen), the positive control would be changed to parenteral administration by subcutaneous injection of the antigen of interest (e.g. any of the infectious agent antigens or tumour antigens described herein), and the test condition would merely require bacterium to be prepared that comprise the antigen of interest (or a ROP of said antigen).

Furthermore, the bacterium is acting as a delivery vehicle for the antigen of interest, and so is not limited to the exemplified *C. butyricum*. The *C. butyricum* that has been exemplified acts to deliver the antigen to an anaerobic portion of the GI tract from where the antigen can mediate an immune response. Therefore, other bacteria of the class Clostridia that are similarly known to be capable of reaching an anaerobic portion of the GI tract are equally suitable delivery vehicles. In this case, the negative control would change to the bacterium of the class Clostridia of interest (such as those described herein), the positive control remains the parenteral administration by subcutaneous injection of the antigen of interest, and the test condition merely requires the selected bacterium to be genetically engineered in the same way as described herein for *C. butyricum* to express the antigen of interest.

The administration of the bacterium comprising antigen, the negative control and the positive control may be done as an immunisation regimen. For example, mice may be immunised 3 times at fortnightly intervals. Following the immunisation regimen, for example after 42 days of the regimen, the mice are sacrificed. This regimen was performed in order to assess whether spores of the engineered bacterium comprising the antigen are capable of delivering it in a way that induces an immune response.

An immune response can be detected in a number of ways known to the skilled person. For example, splenocytes from homogenised spleens and peripheral blood mononuclear cells (PBMCs) from blood samples can collected and mononuclear cell isolates obtained using standard methods. These mononuclear cell isolates can then be subjected to various sorting protocols to isolate cell populations of interest, for example by using magnetic associated cell sorting (MACS) or Ficoll-Hypaque gradient (density) separation to obtain lymphocytes. For example, T cells ($CD4^+$ and $CD8^+$) may be enriched from the mononuclear cell isolates based on a T cell specific marker (e.g. CD8a for $CD8^+$ T cells). Alternatively, or additionally, other cell populations may be isolated, such as B cells.

Upon obtaining an enriched population of a cell type of interest, the cell type can be tested for the secretion of cytokines associated with activation of an immune response (e.g. IFN-γ and/or TNFα) or for the expression of markers (e.g. cell surface markers and/or intracellular markers) indicative of an activated cellular phenotype. Cytokines, such as IFN-γ and/or TNFα, can be tested by ELISPOT by culturing T cells in plates in the presence of anti-IFN-γ or anti-TNFα antibodies, respectively, and re-stimulating the cells with either wildtype antigen protein (e.g. HPV protein or a *V. cholerae* antigen such as CtxB), an ROP of the antigen (e.g. ROP-HPV or ROP-OVA) or with vegetative bacterial cells that comprise the antigen. If T cells are present that have specificity for the antigen of interest (e.g. HPV specific T cells), then re-stimulation with that antigen will induce the T cells to secrete IFN-γ and/or TNFα. The use of vegetative bacterial cells that do not comprise antigen is a negative control, which can be compared with the test condition to identify to what extent the IFN-γ and/or TNFα secretion is antigen specific. IFN-γ and/or TNFα standards (i.e. aliquots of these cytokines at varying concentrations) can be used as a positive control and to establish a dose response curve. For ELISPOT, spot forming units (SPU) can be assessed, wherein an SPU for a test condition (e.g. a vaccinated group) that is at least two standard deviations higher than the average of a control group would indicate a positive result for the test condition.

Alternatively, or additionally, an immune response can be tested by intracellular cytokine staining, such as that described in Zhang et al., 2009. In brief, splenocytes obtained from the mice subjected to the above-described immunisation regimen can be cultured with the antigen (e.g. ROP-antigen) and same negative and positive controls as the ELISPOT. The cells can then be labelled with antibodies (e.g. phycoerythrin-conjugated monoclonal rat anti-mouse CD8 or CD4 antibody) or an immunoglobulin isotype control. Splenocytes can then be fixed and permeabilised using a fix/perm protocol (e.g. the Cytofix/Cytoperm kit by BD Pharmingen) and incubated with a detection antibody for intracellular antigen (e.g. fluorescein isothiocyanate-conjugated anti-IFN-γ antibody). Samples can then be assessed by flow cytometry, with fluorescence above that of the isotype control indicative of the antigen specific activation of the cells. The co-staining with CD8 or CD4 and the IFN-γ will attribute the antigen specific expression of IFN-γ to either $CD8^+$ or $CD4^+$ T cells.

Alternatively, or additionally, an immune response can be tested by detecting the expression of T cell-surface receptors or receptor ligands, typically after re-stimulation of T cells with APCs. For example, cell surface CD40 ligand expression can be assessed on $CD4^+$ T cells, as described in Hegazy et al (2017) Gastroenterology 153:1320-1337. The % of $CD4^+$ T-cells expressing CD40L (CD154) following defined antigen stimulation may be determined, and non-parametric analyses performed between experimental and control groups to identify any difference in the population average antigen-specific T-cell percentage. A positive result for the test condition would be indicated by a higher percentage antigen-specific (i.e., CD40L upregulated) CD4+ T-cells versus negative control group, for example at least 1% higher, at least 2% higher, at least 5% higher and/or up to 10% higher or more.

Cytotoxicity of CTL responses may be assessed using a chromium-51 ($^{51}$Cr) release assay (see B. Paige Lawrence, 2004, Current Protocols in Toxicology, 22 (1): 18.6.1-18.6.27). For example, target cells expressing an antigen of interest for CTLs (e.g. cancer cells expressing a tumour antigen) may be labelled with $^{51}$Cr, which is released from the target cells upon cytolysis. Accordingly, the cytotoxicity of CTLs derived from vaccinated subjects (which would be expected to be able to mount an antigen specific response) may be compared with CTLs derived from a control, naïve subject (which would not be expected to have antigen specific CTLs). An increase in $^{51}$Cr detection for CTLs derived from a vaccinated group would indicate a positive result for inducing an antigen specific response. Typically, a positive result for a test group is indicated where the mean is at least two standard deviations higher than the mean for a control group.

Another suitable assay for assessing cytotoxicity is the CyQUANT LDH Cytotoxicity Assay. Lactase dehydrogenase (LDH) is a cytosolic enzyme that is released upon damage to the plasma membrane. Accordingly, LDH levels can be tested in a coculture of CTLs and target cells, using the same conditions as described for the $^{51}$Cr release assay, to identify whether the vaccinated group has higher LDH indicative of increased cytotoxicity compared with the control group. Typically, a positive result for a test group is indicated where the mean is at least two standard deviations higher than the mean for a control group.

Alternatively, or additionally, T cell proliferation can be tested using $^{3}$H thymidine. $^{3}$H is incorporated into new strands of chromosomal DNA during mitotic cell division, and so accumulates intracellularly as cells divide. T cells (or subsets of T cells) isolated from vaccinated subjects may be compared with T cells (or subsets of T cells) isolated from control, naïve subjects. Isolated T cells can be cocultured with PBMCs or activated DCs loaded with antigen in a mixed lymphocyte reaction (MLR), and their proliferation assessed over time. If the vaccination regime results in antigen specific T cells, these would proliferate at a higher rate when cocultured with antigen presenting cells expressing said antigen. Accordingly, an increase in T cell proliferation based on a higher amount of $^{3}$H thymidine incorporation is indicative of a positive finding for vaccinated subjects. Typically, a positive result for a test group is indicated where the mean is at least two standard deviations higher than the mean for a control group.

Another suitable assay for assessing cellular proliferation is the carboxyfluorescein succinimidyl ester (CFSE) assay. CFSE is a fluorescent cell staining dye that reacts with intracellular free amines to generate covalent dye-protein conjugates. This results in live cells that can be detected based on the CFSE fluorescence by flow cytometry or fluorescent microscopy. As cells with CFSE divide, the level of CFSE fluorescence divides between the cells, allowing the visualisation of peaks corresponding to generations of cellular division. Accordingly, the same conditions as for $^{3}$H thymidine described above can be assessed in a CFSE assay. In this assay, an increase in T cell proliferation is based on the detection of additional emission peaks for fluorescein, which would indicate cell division as a positive finding for vaccinated subjects. Typically, a positive result for a test group is indicated where the mean is at least two standard deviations higher than the mean for a control group.

B cell responses may be assessed by quantifying the levels of antibodies in sera or other appropriate samples collected during the immunisation regimen or following termination. An antibody titre is a measurement of how much antibody an organism has produced that recognizes a particular epitope, expressed as the inverse of the greatest dilution (in a serial dilution) that still gives a positive result. Antibody titre may be tested using ELISA. Therefore, sera obtained from mice subjected to the above-described immunisation regimen can be assessed for antibody titre and compared with the same controls. A higher antibody titre, such as at least two standard deviations higher compared with the negative control would be indicative of B cell activation in an antigen specific manner. The IgA antibody titre is indicative of mucosal immunity, and so the levels of antigen-specific IgA may specifically be tested to assess the induction of mucosal immunity. Suitable samples for testing for IgA include sera, faeces, contents of the colon or gut, or ileal wall extract. Additionally, or alternatively, the antigen-specific IgG titre, which is indicative of systemic immunity and/or antigen-specific IgM may be tested. Typically, samples of sera will be tested.

The ratio of antigen-specific to total IgA may be measured, and may be indicative of a B cell response. For example, total IgA and antigen-specific IgA may be determined by ELISA. Non-parametric analyses may be performed between experimental and control groups to look for a difference in the population average antigen-specific IgA/IgA ratio. A positive result would be the identification of a statistically significant difference in the average antigen-specific IgA/IgA ratio between experimental and control groups.

Generally accepted animal models (such as those described in Ireson et al. (2019) British J Cancer 121:101-108) can be used for testing of immunisation against cancer using a tumour or cancer antigen. For example, cancer cells (human or murine) can be introduced into a mouse to create a tumour, and a bacterium comprising a tumour antigen as described herein may be delivered to a subject harbouring a tumour associated with said antigen. Cancer cells can be introduced by subcutaneous injection to form a xenograft or syngeneic tumour associated with an antigen of interest. The effect on the cancer cells (e.g., reduction of tumour size or reduction in tumour progression (i.e., the rate at which a tumour continues to grow), which can be measured using callipers) can be assessed as a measure of the effectiveness of the immunisation. More complex models include the use of patient-derived xenograft (PDX) models, in which an antigen associated with the cancer of said patient is implanted into mice (e.g. humanised mice) that have undergone an immunisation regimen as described herein. Alternatively, or additionally, the levels and activity of anti-tumour CTLs may be tested, for example taking a tumour biopsy and testing the levels of CTLs (including tumour antigen specific CTLs) in the tumour microenvironment. Antigen specific CTLs may be identified using MHC tetramers specific to the MHC-loaded tumour antigen, and CTLs in the tumour microenvironment can then be quantified, for example by flow cytometry. A biopsy may also be tested for cytokines, by measuring those associated with an inflammatory response and T cell activation (e.g. IL-2, IFN-γ, GM-CSF). The tests also can be performed in humans, where the end point is to test for the presence of enhanced levels of circulating cytotoxic T lymphocytes against cells bearing the antigen, to test for levels of circulating antibodies against the antigen, to test for the presence of cells expressing the antigen and so forth.

A suitable test is described in Cai et al., 2017, which demonstrated that immunisation with ROP-survivin or ROP-HPV-E7 generated specific cellular immune responses and protected mice from inoculation with melanoma B16 cells expressing survivin or HPV-E7 proteins. In these experiments, C57BL/10 mice were primed subcutaneously with ROP-antigen (ROP-survivin or ROP-HPV-E7), which was compared with the wildtype antigens as a positive control, both conditions having the antigen emulsified in monophosphoryl lipid A (MPL). Immunisation was boosted subcutaneously twice at 3-week intervals with the same vaccine emulsified with MPL. Three weeks following the final boost, mice were challenged with B16-E7 or B16-survivin and subsequently assessed in ELISPOT assays. ELISPOT assays were performed on PBMCs and splenocytes, as described above, with re-stimulation performed with ROP-HPV or ROP-survivin in anti-IFN-γ-Ab pre-coated plates.

The data in Cai et al., 2017 demonstrate a mouse system where ROP-antigen and wildtype antigen can be used to immunise mice for anti-tumour immune responses. Therefore, the immunisation strategy of Cai et al., 2017 can be deployed as a positive control, using ROP-antigen or wildtype antigen corresponding to a tumour antigen. A bacterium of the class Clostridia can then be genetically modified to express said tumour antigen and used in the parallel immunisation regimen. The negative control would be immunisation with the same bacterium but without antigen. This system can therefore be used to determine whether a bacterium comprising a tumour specific antigen can induce anti-tumour responses by re-stimulating PBMCs or splenocytes with tumour antigen, as described in Cai et al., 2017, and comparing the IFN-γ secretion with the positive and negative controls. An SFU (Spot Forming Unit) count for a test condition (e.g. a vaccinated group) that is at least two standard deviations higher than the average of a control group would indicate a positive result for the test condition.

Accordingly, the skilled person can readily assess whether a bacterium of the class Clostridia comprising an antigen, such as an infectious agent antigen and/or a tumour antigen induces an immune response to said antigen. These systems are not limited to the type of antigen nor the bacterium.

Therapeutic or Preventive Treatment of an Infectious Disease or Cancer in a Subject In this fifth aspect, the antigen is an infectious agent antigen and the disease is the disease caused by the infectious agent, or the antigen is a tumour antigen and the disease is cancer.

By "ameliorating" or "treating" a disease, particularly cancer, we mean slowing, arresting or reducing the development of the disease or at least one of the clinical symptoms thereof; alleviating or ameliorating at least one physical parameter including those which may not be discernible by the patient; modulating the disease, either physically (e.g., stabilization of a discernible symptom), physiologically (e.g., stabilization of a physical parameter), or both; or preventing or delaying the onset or development or progression of the disease or disorder or a clinical symptom thereof. In the case of an infectious disease "ameliorating" or "treating" may be interpreted accordingly and may also include reducing the burden of viable infectious agent in the subject, or preventing or reducing the recurrence of dormant infectious agents into actively growing forms. "Therapeutic treatment" is to be interpreted accordingly. By "preventing", we include that the agents described herein are prophylactic. A preventative or prophylactic use or treatment includes a use or treatment that reduces or removes the risk of a subject contracting a disease, for example by vaccination. "Preventive treatment" is to be interpreted accordingly.

A subject is in need of a treatment if the subject would benefit biologically, medically or in quality of life from such treatment. Treatment will typically be carried out by a physician or a veterinary surgeon who will administer a therapeutically effective amount of the bacterium or composition. A therapeutically effective amount of bacterium according to the first aspect or composition according to the second aspect refers to an amount that will be effective for the treatments described herein, for example slowing, arresting, reducing or preventing the disease or symptom thereof. The therapeutically effective amount may depend on the antigen (e.g. the capability of the antigen to provoke a particular type or strength of immune response thereto), the efficiency of production of the antigen by the clostridial cell, the subject being treated, the severity and type of the affliction etc. Typically, a subject in need of therapeutic treatment is presenting symptoms of the disease. Alternatively, a subject may be susceptible to the disease or has been tested positive for the disease but has not yet shown symptoms. Typically, a subject in need of preventive treatment does not have the disease but may be at risk of developing it. Preventive treatment is particularly appropriate for infectious disease.

The infectious disease to be treated is suitably one which may respond to an antigen specific immune response directed at the infectious agent. The infectious disease, disorder or condition can be selected from those associated with the infectious agent antigens listed herein. The cancer to be treated can be any cancer associated with a tumour antigen, such as those tumour antigens listed herein, particularly a cancer that has been shown to respond to immunotherapy utilising the tumour antigen.

Therapeutic treatment is particularly advantageous in relation to cancer, or chronic infectious diseases. Chronic infectious diseases include those that are perpetuated for months or years by the infectious agent, or which exhibit periods of active growth of the infectious agent and/or symptoms, and periods of dormancy. Chronic persistent infection may be caused by viruses including human papillomavirus (HPV); hepatitis C; hepatitis B; human immunodeficiency virus (HIV); herpesviruses including herpes simplex virus 1, herpes simplex virus 2 and varicella zoster virus; flavivirus associated with Yellow fever; West Nile virus; dengue virus; Zika virus; Japanese encephalitis virus; African swine fever virus; Porcine Reproductive and Respiratory Syndrome (PRRS) virus and foot-and-mouth disease virus (e.g. coxsackievirus A16). Chronic persistent infection may be also caused by bacteria, including *Mycobacterium tuberculosis, Mycobacterium bovis, Brucella, Borrelia* species such as *B. burgdorferi, Corynebacterium diphtheriae, Chlamydia, Vibrio cholerae, Salmonella enterica* serovar *Typhi; mycoplasma*; fungi including *Candida albicans*; and various parasites including helminths and protozoa. Suitable cancers to be treated include melanoma and renal cell carcinoma, which are considered to be two of the most immunogenic solid tumours and have been studied extensively in vaccine development or cancers of the colon, lung, cervix, pancreas, stomach, liver, intestine, bladder, ovary, prostate, bone, brain, or head and neck.

Preventive treatment typically requires the establishment of immunological memory, such that the immunised subject is protected or partially protected from subsequent challenge, typically with the infectious agent antigen. Immunological memory is an important consequence of adaptive immunity, as it enables a more rapid immune response to be mounted to pathogens that have been previously encountered to prevent them from contracting a disease. Immunological memory may also be important in therapeutic treatments.

Figure 5:
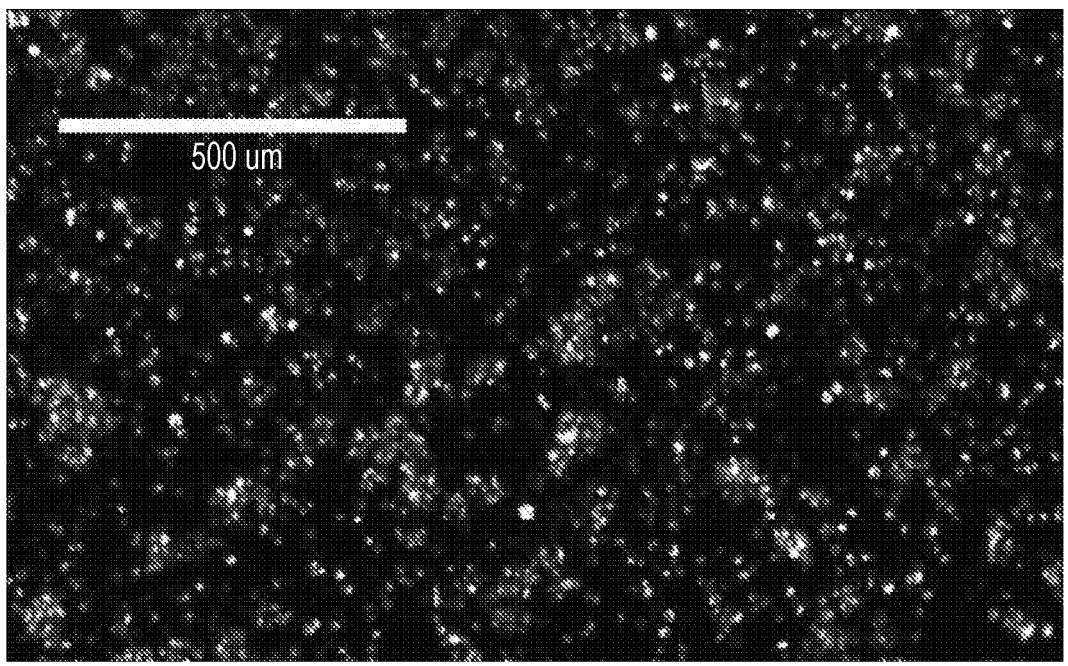
Figure 6:
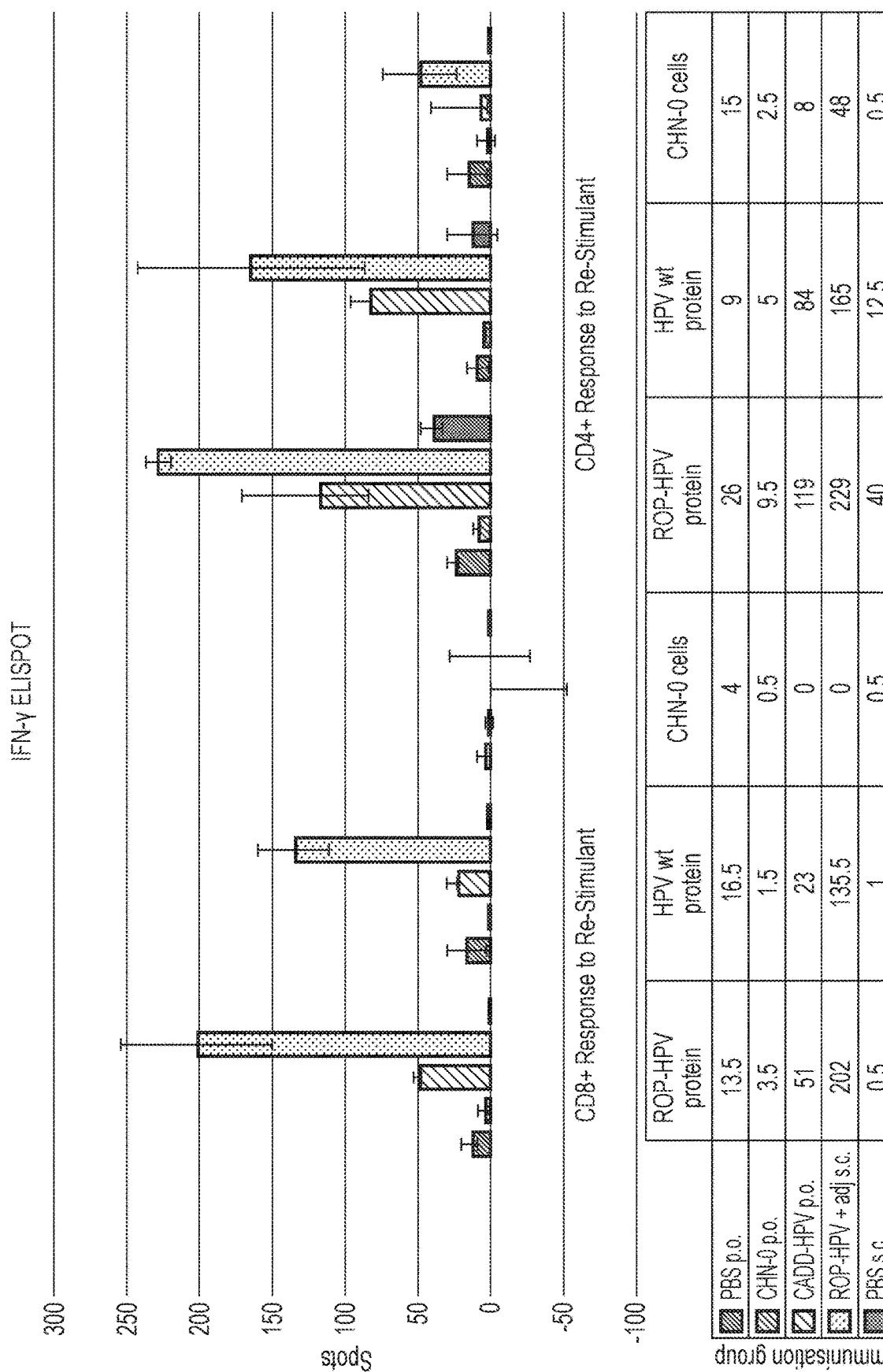

Immunological memory in T cells can be tested using MHC tetramers that identify whether memory T cells exist for a particular antigen. MHC tetramers have specificity to MHC-loaded antigen, and so an MHC tetramer can be used that is specific to an antigen of interest (e.g. HPV specific MHC tetramers). These can be used on samples isolated from a subject (e.g. a blood sample or splenocytes) to measure the frequency of antigen specific T cells. MHC tetramers are available for MHC class I and II, meaning that both $CD4^+$ and $CD8^+$ cells can be measured using MHC tetramers. Furthermore, the MHC tetramers can be used in conjunction with fluorescent antibodies for other T cell markers to assess the proportion of antigen specific T cell subsets (e.g. antigen specific Th1, Th2 and/or Th17 cells). The proportion of antigen specific T cells can be assessed by flow cytometry, comparing immunised and non-immunised subjects. For example, samples obtained from mice that have undergone the immunisation regimen described herein may have blood samples and/or splenocytes assessed for MHC tetramer binding and a panel of fluorescent markers for T cell subsets. Compared with non-immunised mice, the immunised mice should have a higher proportion of binding with an MHC tetramer, which can be further assessed by T cell subset to identify the type of T cell response induced. In the case of HPV infection, a higher proportion of antigen specific $CD8^+$ T cells would be indicative of protective T cell immunity being established by the immunisation with a bacterium of the class Clostridia comprising a HPV antigen.

Immunological memory in B cells can be tested in vitro by isolating B cells from immunised and non-immunised mice (e.g. as per the immunisation regimen described herein) and re-stimulating the B cells in the presence of helper T cells specific for the same antigen. B cells from immunised mice respond both quantitatively and qualitatively better, the former of which can be assessed by comparing the frequency of B cells (i.e. count the number of cells in a cell suspension) following re-stimulation. Due to affinity maturation of B cells, the memory B cell antibodies produced would also have a higher affinity compared with naïve B cells from non-immunised mice, which can be tested by purifying the produced antibodies (from immunised and non-immunised mice) and comparing their affinity for the antigen (or epitope thereof). If the antibodies produced from the immunised mice have a higher affinity, then a B cell memory response has been established that may indicate protective immunity. Corresponding in vivo studies would use such mice and challenge them with the pathogen from which the antigen is derived (e.g. infection with HPV if the antigen is an HPV antigen; for example, as described in Longet et al, 2011, Journal of Virology, 85:13253-13259) to assess infection burden compared with mice challenged for the first time with the pathogen.

The cellular systems described above may be supplemented with in vivo mouse systems, wherein the mice are challenged with the pathogen associated with the antigen. Due to the existence of T and/or B cell immunity, immunised mice should have reduced infection burden, such as increased rates of partial or complete protection from infection compared with naïve mice. Accordingly, a suitable in vivo system would include a challenge regimen following the immunisation regimen to assess infection burden. Suitable animal models are described in Bakaletz (2004) Developing animal models for polymicrobial diseases, Nature Reviews Microbiology, 2:552-568). Immunological memory may also be tested in in vivo tumour models, including tumour challenge models, such as described in Cai et al., 2017, supra and Ireson et al., 2019, supra as described in relation to the fourth aspect of the invention.

In this specification and the appended claims, the singular forms "a", "an" and "the" include plural reference unless the context clearly dictates otherwise. Unless defined otherwise, all technical and scientific terms used herein have the same meaning as commonly understood to one of ordinary skill in the art to which this invention belongs.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the ranges, and are also encompassed within the invention, subject to any specifically excluded limit in the stated range. Where the stated range includes one or both of the limits, ranges excluding either or both of those included limits are also included in the invention.

Preferences and options for a given aspect, feature or parameter of the invention should, unless the context indicates otherwise, be regarded as having been disclosed in combination with any and all preferences and options for all other aspects, features and parameters of the invention.

All publications mentioned herein are incorporated herein by reference to the fullest extent possible for the purpose of describing and disclosing those components that are described in the publications which might be used in connection with the presently described invention.

The present invention will be further illustrated in the following non-limiting Examples and Figures.

FIGURE LEGENDS

FIG. 1: Design of ROP proteins and presentation of cleaved ROP on antigen presenting cells (APC). A known T-cell epitope is divided into overlapping peptide fragments linked into a single chain protein by the minimal cleavage signal (LRMK (SEQ ID NO: 33)) for cathepsin S. The ROP is cleaved in endosomes inside the APC and individual peptide epitopes are presented via MHC molecules that can be recognised by receptors present on T-cells.

FIG. 2: Western blot detection of FLAG tag linked to ROP-HPV and ROP-OVA in *C. butyricum* engineered to express ROP proteins intracellularly. CHN-0 wildtype was used as the control. In A, arrows indicate ROP-HPV bands in CADD-HPV-ROP but not in CHN-0 wild-type cells. (A) Contrast enhanced over entire image-red arrows indicate ROP-HPV bands in CADD-HPV-ROP but not in CHN-0 wild-type. (B) 35 μl protein loaded (~175 mg), blocked 5% milk, anti-FLAG (A9469) 1:5000 in TBS-T 2 h, developed using SIGMAFAST BCIP/NBT 7 min.

FIG. 3: CADD-ROP-OVA1 construct for genetic engineering of *C. butyricum.*

FIG. 4: CADD-ROP-HPV construct for genetic engineering of *C. butyricum.*

FIG. 5: pHRodo fluorescence observed inside DC2.4 cell culture exposed to CHN-0 vegetative cells in a ratio of 1000:1 CHN-0 to DC2.4 cells. Scale bar is 500 µm FIG. 6: IFN-γ ELISPOT evaluation of $CD8^+$ and $CD4^+$ T-cells isolated from spleens of mice immunised by oral gavage of spores of CHN-0 wildtype (orange bar), engineered CADD-HPV (grey bar), or subcutaneous injection of purified ROP-HPV protein with adjuvant (yellow bar). PBS was given as negative control both orally and subcutaneously (light and dark blue bars). Isolated T-cells were seeded at a density of $2.5 \times 10^5$/well and re-stimulated with either purified ROP-HPV or wildtype HPV protein (both 5 µg/well) or vegetative cells of CHN-0 wildtype ($0.5 \times 10^5$/well).

Figure 7:
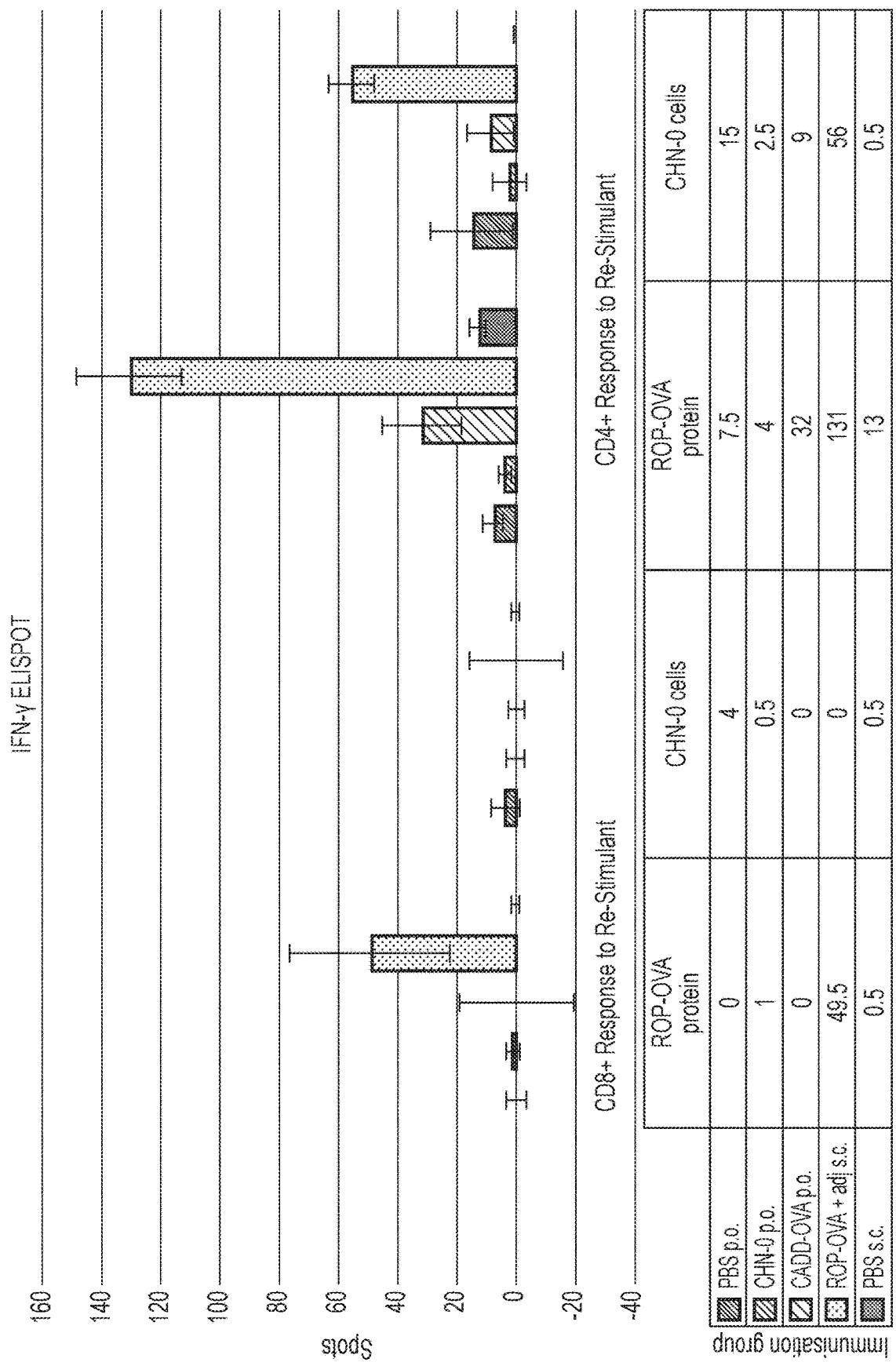

FIG. 7: IFN-γ ELISPOT evaluation of CD8+ and CD4+ T-cells isolated from spleens of mice immunised by oral gavage of spores of CHN-0 wildtype (orange bar), engineered CADD-OVA (grey bar), or subcutaneous injection of purified ROP-OVA protein with adjuvant (yellow bar). PBS was given as negative control both orally and subcutaneously (light and dark blue bars). Isolated T-cells were seeded at a density of $2.5 \times 10^5$/well and re-stimulated with either purified ROP-OVA (5 µg/well) or vegetative cells of CHN-0 wildtype ($0.5 \times 10^5$/well).

FIG. 8: A diagram to represent the immunisation strategy of Example 3.

FIG. 9: (A) Cholera toxin CtxB FLAG-tagged antigen nucleic acid sequence and translated protein sequence. The underlined sequences in the nucleic acid sequence are, in order, the NotI site, the NdeI site and NheI site. The promoter region is between NotI and NdeI and is not translated, whereas the antigen region that is translated is between the NdeI and the NheI sites. (B) Sequence alignment between the native CtxB protein sequence (P01556) and the CtxB FLAG-tagged antigen sequence (CHAIN_CtxB).

FIG. 10: Western blot detection of FLAG tag linked to CtxB in *C. butyricum* engineered to express CtxB intracellularly from the pMTL82151 plasmid (CtxB-full plasmid). CHN-0 wildtype was used as the control. The red arrow indicates significant bands in CtxB-expressing CHN-0 strains at expected MW (~13 kDa) but not in CHN-0 wild-type. (B) 20 µl protein loaded, blocked 5% milk, anti-FLAG (A9469) 1:5000 in TBS-T 2 h, developed using SIGMAFAST BCIP/NBT<3 min.

Example 1: Construction and Production of Engineered *Clostridium butyricum*

Strain DSM10702 of *Clostridium butyricum*, a spore forming anaerobic bacterium that can be found in soil and animal (including human) faeces, was engineered to express antigen in the bacterial cytoplasm. Selected antigens were engineered based on recombinant overlapping peptide (ROP) technology, as described in WO 2007/125371A2.

The ROP protein sequence is made up of overlapping peptides linked by the cathepsin cleavage site target sequence (LRMK (SEQ ID NO: 33)) (see FIG. 1). Cathepsin is found in endosomes of dendritic cells (DCs) and following endocytosis the ROP protein is cleaved into its constituent peptides. This approach allows for the delivery of a wide range of T-cell epitopes which can facilitate induction of cellular immunity across a range of HLA alleles maximising population coverage. Effective antigen presentation by DCs is required to prime naïve $CD8^+$ and $CD4^+$ T-cells. $CD8^+$ cytotoxic T-cells are involved in immune defence against intracellular pathogens and tumour surveillance. $CD4^+$ helper T-cells (e.g. Th1, Th2 and Th17) shape and control a wide range of immune functions and play a particularly important role in regulating adaptive immunity. The use of ROPs has been shown previously to be superior to using wildtype antigens in generating protective cellular immunity. In addition to stimulating CD4+ T-cells through the classical MHC class II presentation pathway, ROPs can lead to robust $CD8^+$ T-cell responses through cross-presentation, a process by which exogenous antigen is presented by MHC class I on APCs to activate $CD8^+$ T-cells (Cai et al., Oncotarget 2017, 8 (44) pp 76516-76524).

Previously, a strain of *C. butyricum* was created with a disrupted pyrE gene for use in genetic engineering by ACE technology. We have now stably integrated ROP protein coding sequences under control of a constitutive promoter into the pyrE gene locus in the chromosome of this strain.

Figure 2:
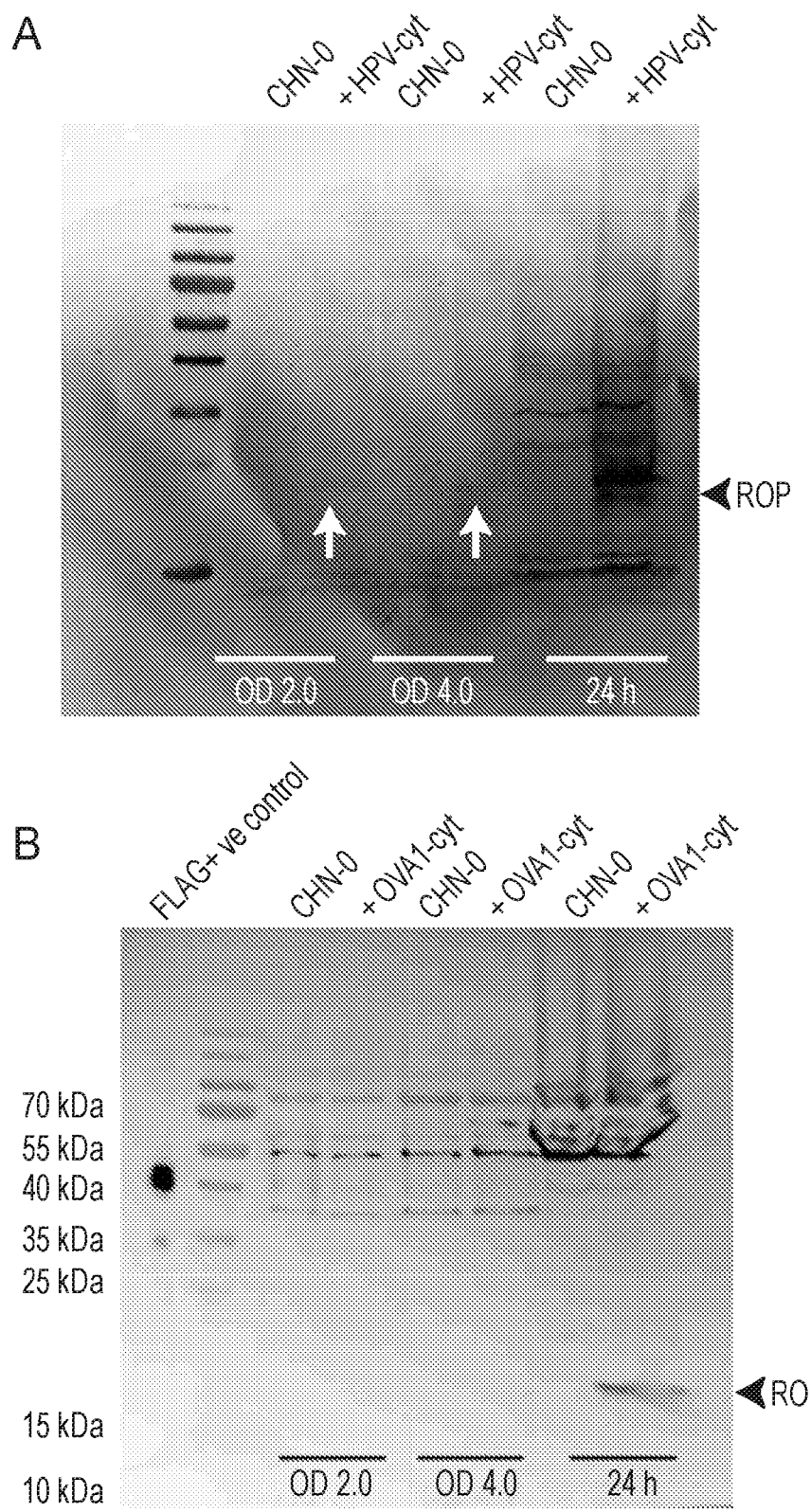

Two different ROP protein coding sequences have been developed, based on Human Papilloma Virus (HPV) type 16 E7 envelope protein and ovalbumin (OVA). These sequences were used to design cassettes for introduction into the pMTL80000 vector series for genetic engineering by introducing the required enzymatic cleavage sites and an additional cathepsin cleavage signal at the N-terminal site linking the FLAG tag to the ROP protein. The engineered pyrE deficient strain of *C. butyricum* expresses ROP derived from HPV or ovalbumin, intracellularly (see FIG. 2).

Following confirmation of expression and production of ROP proteins, spores of the engineered strains were produced using a previously developed spore fermentation protocol as well as vegetative cell pellets. The materials were then assessed for in vitro baseline studies in DCs and use for in vivo immunisation experiments in mice.

Materials and Methods

Culture of Bacterial Strains

*Escherichia coli* strains BL21, DH5α and CA434 were grown aerobically in Lysogeny broth (LB; Vegetable tryptone 10 g/L, Yeast extract 5 g/L, Sodium chloride 10 g/L) supplemented with 15% (w/V) agar and/or antibiotics where appropriate at 30° C. or 37° C. depending on metabolic burden associated with plasmid propagation. Liquid cultures were agitated at 200 rpm during incubation.

*Clostridium butyricum* Strain DSM10702 is deposited in the DSMZ depository (Leibniz Institute, DSMZ-German Collection of Microorganisms and Cell Cultures, Inhoffenstraße 7B, 38124 Braunschweig, GERMANY). *Clostridium butyricum* strains were routinely grown in anoxic workstations (Don Whitley, 10% Hydrogen, 10% Carbon dioxide, 80% Nitrogen, 37° C.) in Reinforced Clostridial growth medium (RCM; Yeast extract 13 g/L, Vegetable peptone 10 g/L, Soluble starch 1 g/L, Sodium chloride 5 g/L, Sodium acetate 3 g/L, Cysteine hydrochloride 0.5 g/L) supplemented with 10 g/L Calcium carbonate, 2% (w/V) Glucose, 15% (w/V) agar and/or antibiotics where appropriate. For maintenance and selection of genetically engineered strains, *C. butyricum* was grown in anoxic workstations in Clostridial Basal Medium (CBM, Iron sulphate heptahydrate 12.5 mg/L, Magnesium sulphate heptahydrate 250 mg/L, Manganese sulphate tetrahydrate 12.5 mg/L, Casamino acids 2 g/L, 4-aminobenzoic acid 1.25 mg/L, Thiamine hydrochloride 1.25 mg/L, Biotin 2.5 µg/L) supplemented with 10 g/L Calcium carbonate, 2% (w/V) Glucose, 15% (w/V) agar, uracil and/or antibiotics where appropriate, respectively. For detection of colony forming units in mice faeces, homogenised faecal samples were plated onto modified *C. butyricum* basal isolation medium (Sodium chloride 0.9 g/L, Calcium chloride 0.02 g/L, Magnesium chloride hexahydrate 0.02 g/L, Manganese chloride tetrahydrate 0.01 g/L, Cobalt chloride hexahydrate 0.001 g/L, Potassium phosphate monobasic 7 g/L, Potassium phosphate dibasic 7 g/L, Iron sulphate 0.01% (w/V), Biotin 0.00005% (w/V), Cysteine hydrochloride 0.5 g/L, Glucose 2% (w/V), Agar 15% (w/V), D-cycloserine 250 mg/L).

*C. butyricum* spores were produced in 2 L vessels of FerMac 320 Microbial culture batch bioreactor systems (ElectroLab Biotechnology Ltd) in RCM supplemented with 2% (w/V) Glucose. Vessels were sparged with nitrogen gas at a flow rate of 0.2 vvm, maintained at a pH of 6.5, temperature of 37° C. and agitated at 100 rpm. Cell and spore mass were harvested, and spores were separated from cell matter by repeated washing in ice-cold sterile water. Spores were stored at 4° C. until further use. Enumeration of spores was conducted by plating serial dilutions of spore stocks on pre-reduced RCM agar plates in triplicate. Plates were incubated for 24 hours in the anoxic workstation before colony forming units (CFU) were determined.

Gene Constructs and Plasmids

For the ovalbumin construct, the wildtype ovalbumin amino acid (aa) sequence ranging from aa241-aa340 (SMLVLLPDEVSGLEQLESIINFEKLTEWTSSNV MEERKIKVYLPRMKMEEKYNLTSVLMAMGIT DVFSSSANLSGISSAESLKISQAVHAAHAEINEAGR; SEQ ID NO: 5) was split into four overlapping sequences and linked by the minimal cathepsin cleavage site (LRMK (SEQ ID NO: 33)) to form a 142aa recombinant overlapping peptide denoted ROP-OVA (SMLVLLPDEVSGLEQLESI-INFEKLTEWTSSNVMELRMKTEWTSSNVMEERKI KVYLPRMKMEE KYNLTSVLMALRMKKYNLTSVL-MAMGITDVFSSSANLSGISSAESLKISLRMKIS-SAESLKISQA VHAAHAEINEAGR; SEQ ID NO: 6).

Figure 3:
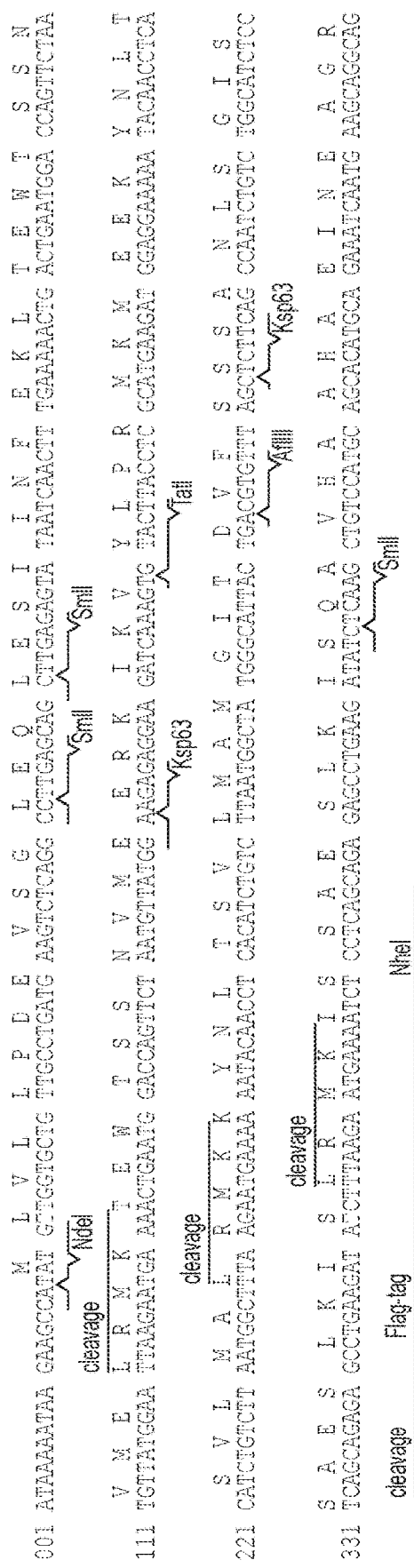

ROP-OVA was further modified for genetic engineering into *C. butyricum* to include a NdeI cleavage site (CATATG) incorporating the nucleotide signal for aa methionine (M, ATG) found in position 2 of the ROP-OVA, a further cathepsin cleavage site at the N-terminal site followed by the signal for the FLAG-tag (DYKDDDDK (SEQ ID NO: 18)) and the nucleotide sequence for a NheI cleavage site (GCTAGC) separated from the FLAG-tag by the stop codon TAA (FIG. 3).

For the Human Papillomavirus type 16 construct, the wildtype E7 protein aa sequence ranging from aa1-aa98 (MHGDTPTLHEYMLDLQPETTDLYCYEQLNDSSEEE-DEIDGPAGQAEPDRAHYNIVTFCCKCDS TLRLCVQSTHVDIRTLEDLLMGTLGIVCPICSQKP; SEQ ID NO: 7) was split into four overlapping sequences and linked by the minimal cathepsin cleavage site (LRMK (SEQ ID NO: 33)) to form a 140aa recombinant overlapping peptide denoted ROP-HPV (MHGDTPTLHEYMLDLQ-PETTDLYCYEQLNDSSEEELRMKEQLNDSSEEEDEI DGPAGQAEPDR AHYNIVTFCCKLRM-KHYNIVTFCCKCDSTLRLCVQSTHVDIRTLEDLL-MGLRMKIRTLEDLLMGT LGIVCPICSQKP; SEQ ID NO: 8).

Figure 4:
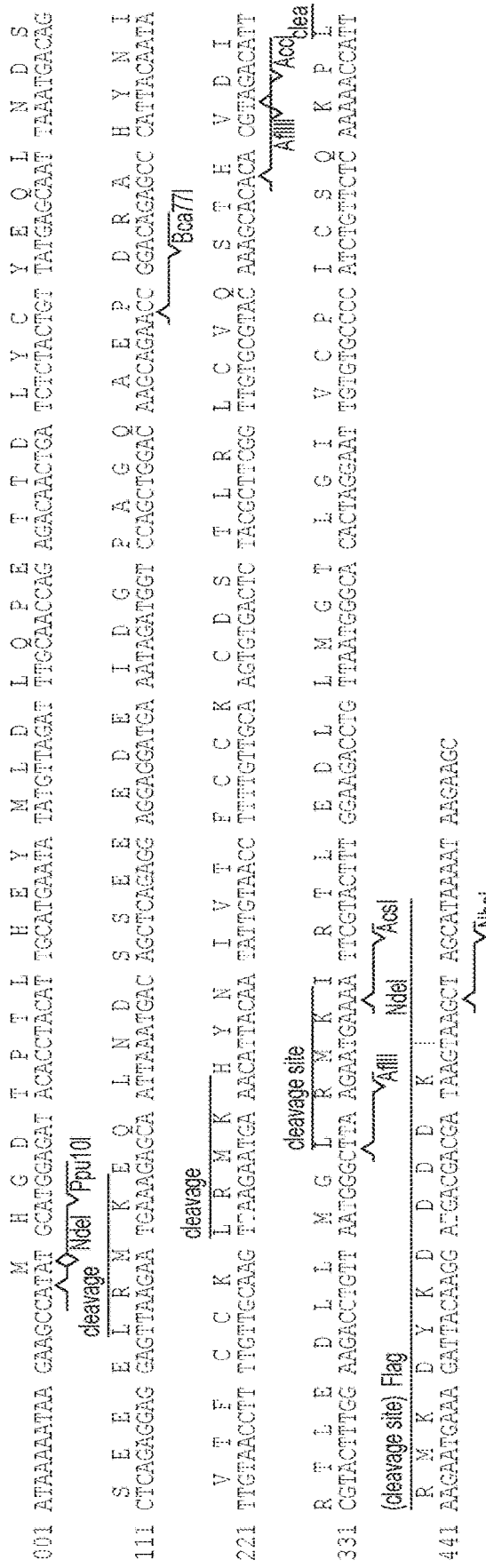

ROP-HPV was further modified for genetic engineering into *C. butyricum* to include a NdeI cleavage site (CATATG) incorporating the nucleotide signal for aa methionine (M, ATG) found in position 1 of the ROP-HPV, a further cathepsin cleavage side at the N-terminal site followed by the signal for the FLAG-tag (DYKDDDDK (SEQ ID NO: 18)) and the nucleotide sequence for a NheI cleavage site (GCTAGC) separated from the FLAG-tag by the stop codon TAA (FIG. 4).

ROP-OVA and ROP-HPV constructs were ordered as synthetic genes from GeneArt Thermo Fisher Scientific in pMK vectors.

CADD-ROP-OVA1 and CADD-ROP-HPV constructs were ordered as synthetic genes without further codon usage optimisation from Life Technologies Ltd in plasmid pMK-RQ. pMK-RQ plasmids containing the synthetic gene constructs were transformed into *E. coli* DH5a, grown over night in LB supplemented with 50 μg/mL kanamycin and stored at −80° C. as 15% (V/V) glycerol stocks.

Expression of ROP Protein Standards in *E. coli*

The synthetic ROP-OVA and ROP-HPV constructs were excised from storage plasmids and cloned into BsaI restriction endonuclease linearized plasmid pNIC28-Bsa4 (Structural Genomic Consortium, Oxford) using ligation independent cloning. The vector amplicon was transformed into *E. coli* BL21 (Thermo Fischer Scientific) following the manufacturer's instructions.

For ROP-HPV expression, BL21 harbouring pNIC28-Bsa4-ROP-HPV was cultured in LB broth supplemented with 50 μg/mL Kanamycin. Protein production was induced using 0.2 mM IPTG. Cell pellets were harvested by centrifugation and resuspended in lysis buffer (PB, 0.5% Triton X-100, 1 mM DTT, pH 8.0). Resuspended cells were subjected to 20 cycles of sonication at 600 W for 5 sec in 7 sec intervals. Inclusion bodies containing the recombinant protein were harvested by centrifugation at 20,000×g for 45 min. The inclusion body pellet was resuspended in denaturing buffer (8M urea) and incubated for 2 hr with vigorous shaking. The solution was centrifuged to separate the proteins from debris.

Supernatant containing the protein fraction was loaded onto a Nickel affinity column (GE Healthcare) and eluted using elution buffer (50 mM PB, 200 mM NaCl, 8M urea, 300 mM imidazole, pH 7.4). Refolding of the purified protein was achieved by gradual dialysis with PBS, pH 7.4.

For ROP-OVA expression, BL21 harbouring pNIC28-Bsa4-ROP-OVA was cultured in LB broth supplemented with 50 μg/mL Kanamycin. Protein production was induced using 0.1 mM IPTG at 18° C. Cell pellets were harvested by centrifugation and resuspended in lysis buffer (50 mM HEPES, 500 mM NaCl, 10% glycerol, 1:30,000 Benzonase, 0.5 mg/mL lysozyme, 0.1% DDM, 0.1% protease inhibitor cocktail, pH 8.0). Resuspended cells were subjected to sonication for 10 min at 35% amplitude for 5 sec in 15 sec intervals. Inclusion bodies containing the recombinant protein were harvested by centrifugation at 20,000×g for 45 min. The inclusion body pellet was solubilised in 50 mM HEPES buffer containing 6M guanidine hydrochloride and incubated on ice for 1 hr before filtration through 0.2 μm filter.

The filtrate containing the protein fraction was loaded onto a Ni-NTA affinity column and eluted using elution buffer (50 mM HEPES, 6M guanidine hydrochloride, 500 mM imidazole). Guanidine hydrochloride was removed by dilution in cold dilution buffer (50 mM HEPES, 500 mM NaCl, 10% glycerol, 0.5% sarkosyl) followed by concentration of protein using a 10 kDa molecular weight cut off Vivaspin column (Sigma Aldrich) and desalting through a PD-10 column using desalting buffer (50 mM HEPES, 500 mM NaCl, 10% glycerol).

Endotoxin was removed using the Pierce Endotoxin removal kit (Thermo Fisher Scientific) according to manufacturer's instructions. Samples were filtered using a 0.2 μM filter and stored at 4° C. until further use.

Genetic Engineering of *C. butyricum*

To prepare plasmids for engineering of *C. butyricum*, CADD-ROP-OVA1 and CADD-ROP-HPV constructs were first propagated in pMK-RQ in *E. coli* DH5a. The plasmid was extracted using the Wizard Plus SV Miniprep DNA Purification kit (Promega) following the manufacturer's instructions and constructs were cut from the plasmids using restriction endonucleases NdeI and NheI in CutSmart® buffer (all New England Biolabs Inc) according to the manufacturer's instructions. The isolated cassettes were introduced into pMTL83151 (pCB102 Gram+ replicon, catP antibiotic marker, ColE1 Gram− replicon, traJ conjugal transfer function, and multiple cloning site (MCS)) additionally containing a pyrE repair cassette and the constitutive promoter Pfax in front of the MCS. Plasmids were transformed into *E. coli* DH5α for propagation. Plasmids were isolated as before and sequenced using GeneWiz sequencing services to confirm the correct insertion of cassettes.

Sequence confirmed plasmids pMTL83151_pyrErepair_$P_{fdx}$_CADD-ROP-OVA1 and pMTL83151_pyrErepair_$P_{fdx}$_CADD-ROP-HPV were transformed into *E. coli* CA434 conjugation donors. Following sequence confirmation as above, *E. coli* CA434 were grown over night in LB supplemented with 50 μg/mL Kanamycin and 12.5 μg/ml Chloramphenicol and stored at −80° C. as 15% glycerol stocks.

Fresh colonies of revived *E. coli* CA434 harbouring the respective plasmids were used to inoculate LB broth supplemented with 50 μg/mL Kanamycin and 12.5 μg/mL Chloramphenicol. After overnight incubation, cultures were used to inoculate fresh supplemented medium 1:10 and incubated until an $OD_{600}$ of 0.5-0.7 was reached. A volume of 1 mL of culture was removed and centrifuged at 5,000×g for 3 minutes. The supernatant was discarded, and the pellet re-suspended in 500 μL phosphate buffered saline (PBS) solution. The culture was centrifuged as above, and the supernatant discarded.

Fresh colonies of revived *C. butyricum* CHN-0.1 (ΔpyrE derivative of wt CHN-0) were used to inoculate a serial dilution series in fresh pre-reduced RCM broth supplemented with 2% glucose and 1% $CaCO_3$. After overnight incubation in anoxic conditions, the most dilute culture showing growth was used to inoculate fresh supplemented medium 1:10 and incubated until an $OD_{600}$ of 0.5-0.7 was reached. A volume of 1 mL of culture was removed and heat treated for 10 min at 50° C.

Both *E. coli* CA434 and *C. butyricum* such treated were transferred into the anoxic workstation and mixed at a ratio of 5:1 ($OD_{600}$:$OD_{600}$). The conjugation mixture was spotted onto pre-reduced non-selective RCM agar plates and incubated upright overnight. Following incubation, the mixture was harvested into 500 μL fresh pre-reduced RCM broth and spread in 100 μL volume onto fresh pre-reduced RCM agar plates supplemented with 250 μg/mL D-cycloserine and 15 μg/mL thiamphenicol. To select for mutants with restored uracil prototrophy, thiamphenicol resistant colonies were patch plated reiteratively onto CBM agar plates and cross-checked for plasmid loss on thiamphenicol containing selective RCM agar plates. Genomic DNA of prototroph colonies that had lost the plasmid was isolated using the GenElute™ Bacterial Genomic DNA kit (SIGMA-Aldrich) as per the manufacturer's instructions and used for sequencing to confirm presence of the CADD-ROP cassettes in the chromosome of *C. butyricum* using primers spanning the integration region, the promoter and respective ROP sequence (Table 3).

TABLE 3

Primers used for sequence confirmation of CADD-ROP cassettes.

| | | | |
|---|---|---|---|
| CH142 | F | GTGTAGTAGCCTGTGAAATAAG (SEQ ID NO: 9) | Forward of Pfdx |
| CH324 | R | CCCATGTTGGATCTCCTGAG (SEQ ID NO: 10) | Genomic DNA downstream of pyrE |
| CH332 | F | GCAAGTGCGGTGCAGATTGG (SEQ ID NO: 11) | Genomic DNA upstream of pyrE |
| CH620 | R | TTACTTATCGTCGTCATCCTTG TAATCTTTCATTCTTAA (SEQ ID NO: 12) | FLAG tag |
| CH647 | R | AAATATTAACAAGTAATGATTA TCCAAAAC (SEQ ID NO: 13) | pyrE repair long homology arm |
| CH654 | R | GCAATGTAGGTGTATCTCCATG CATATGTAACACACCTCCTTAA AAA (SEQ ID NO: 14) | Pfdx - overhang into HPV-ROP |
| CH655 | F | TTTAAGGAGGTGTGTTACATAT GCATGGAGATACACCTAC (SEQ ID NO: 15) | HPV-ROP - overhang of Pfdx |
| CH656 | R | CATCAGGCAACAGCACCAACAT ATGTAACACACCTCCTTAAAAA (SEQ ID NO: 16) | Pfdx - overhang of OVA1 |
| CH657 | F | TTTAAGGAGGTGTGTTCATATG TTGGTGCTGTTGCCTGATG (SEQ ID NO: 17) | OVA1 - overhang of Pfdx |

The integration of the ROP cassette into the chromosome introduced a single copy under the control of a constitutive promoter. This leads to a low expression and production of protein inside the cell, which can be adjusted by use of stronger promoters and/or insertion of multiple copies of the gene.

Confirmation of Expression of ROPs in *C. butyricum*

Fresh colonies of revived *C. butyricum* CHN-2 (CADD-ROP-HPV) and CHN-3 (CADD-ROP-OVA1) were used to inoculate fresh pre-reduced supplemented RCM broth in serial dilution and grown overnight. The most diluted culture showing growth was used to inoculate fresh pre-reduced supplemented RCM broth at a starting $OD_{600}$ of 0.05. When cultures were grown to an $OD_{600}$ of 1, 2, and 4, and after 24 hr incubation, the equivalent of $OD_{600}$ of 1/mL was centrifuged at 13,000×g for 2 min. The pellet was re-suspended in 45 μL 5×SDS Loading dye (20% (V/V) 0.5 Tris hydrochloride pH 6.8, 23% (V/V) Glycerol, 40% (V/V) of a 10% (w/V) Sodium dodecylsulphate (SDS) solution, 10% (V/V) 2-Mercaptoethanol, 10 mL $dH_2O$, Bromophenol blue) and heat treated at 98° C. for 15 minutes.

A maximum of 40 μL/well of the re-suspended pellets was loaded onto a Novex™ WedgeWell™ 12% Tris Glycine mini gel (Thermo Fischer Scientific) and run in 1×SDS buffer (25 mM Tris, 192 mM Glycine, 0.1% SDS) using 200V at room temperature. PageRuler™ pre-stained protein ladder (Thermo Fischer Scientific) was loaded at 5 μL/well as marker and the *E. coli* Positive Control Whole cell lysate ab5395 (abcam) was used as FLAG tag positive control in a 1:5 dilution.

Separated protein were blotted onto PVDF membranes using the Tran-Blot® Turbo™ blotting system (BioRad) with the Trans-Blot® Turbo™ packs as per the manufacturer's instructions. To detect FLAG tagged proteins, PVDF membranes were first incubated in TBS-T blocking buffer (50 mM Tris hydrochloride, 150 mM Sodium chloride, 0.1% Tween20, pH7.4, 5% (w/V) milk powder) for 1 h at room temperature on a shaking platform. The blocking buffer was then replaced by TBS-T buffer (50 mM Tris hydrochloride, 150 mM Sodium chloride, 0.1% Tween20, pH7.4) containing Anti-FLAG Tag® antibody Alkaline phosphatase conjugate (1:5,000; Sigma) for incubation at room temperature for 2 h on a shaking platform. The membrane was washed twice for 5 min at room temperature in TBS-T buffer and once for 5 min at room temperature in TBS buffer (50 mM Tris hydrochloride, 150 mM Sodium chloride, pH7.4). Alkaline phosphatase detection was performed using SIGMA-FAST BCIP®/NBT substrate (SIGMA Aldrich) as per the manufacturer's instructions.

Example 2: Phagocytosis of *C. butyricum* by a Dendritic Cell Line and Induction of Cytokine Responses Baseline studies in murine DC2.4 cell culture showed that these cells can phagocytose vegetative cells and spores of *C. butyricum*, a prerequisite for successful delivery of the ROP proteins expressed within these bacterial cells.

Cell cultures of DC2.4 cells were exposed to vegetative cells and spores of the wildtype strain CHN-0. CHN-0, in either vegetative or spore form, was taken up by phagocytosis into the DC2.4 cells (see FIG. 5).

The cytokine profile of these exposed DC2.4 cell cultures was subsequently assessed using R&D systems Proteome Profiler® Mouse cytokine Array Panel (Table 1 and 2). There was a differential response to CHN-0 and the medium control.

TABLE 1

Spot density in Proteome Profiler ® Mouse cytokine panel

| Cytokine | CHN0 | Media |
| --- | --- | --- |
| BLC | 279 | 1 |
| C5/C5a | 37 | 19 |
| G-CSF | 1342 | 1 |
| GM-CSF | 181 | 1 |
| I-309 | 778 | 17 |
| Eotaxin | 86 | 51 |
| sICAM-1 | 13831 | 4050 |
| IFN-γ | 355 | 41 |
| IL-1α | 150 | 3 |
| IL-1β | 99 | 311 |
| IL-1ra | 941 | 425 |
| IL-2 | 109 | 1 |
| IL-3 | 1 | 1 |
| IL-4 | 153 | 8 |
| IL-5 | 165 | 132 |
| IL-6 | 1 | 192 |
| IL-7 | 94 | 1 |
| IL-10 | 1 | 1 |
| IL-13 | 448 | 318 |
| IL-12 p70 | 164 | 467 |
| IL-16 | 304 | 370 |
| IL-17 | 21 | 178 |
| IL-23 | 53 | 346 |
| IL-27 | 1 | 1 |
| IP-10 | 13025 | 1126 |
| I-TAC | 40 | 1 |
| KC | 1 | 66 |
| M-CSF | 1360 | 33 |
| JE | 17948 | 11165 |
| MCP-5 | 6375 | 328 |
| MIG | 3907 | 1 |

TABLE 1-continued

Spot density in Proteome Profiler ® Mouse cytokine panel

| Cytokine | CHN0 | Media |
| --- | --- | --- |
| MIP-1α | 24962 | 14433 |
| MIP-1β | 26644 | 13591 |
| MIP-2 | 13606 | 700 |
| RANTES | 7295 | 143 |
| SDF-1 | 4546 | 317 |
| TARC | 125 | 1 |
| TIMP-1 | 203 | 147 |
| TNFα | 9000 | 9 |
| TREM-1 | 52 | 1 |

TABLE 2

Selected cytokines and their function.

| Cytokine | Function |
| --- | --- |
| G-CSF | Differentiation and activation of granulocytes |
| C5/C5a | Part of complement system-involved in Chemotaxis and formation of complement membrane attack complex |
| Eotaxin | Chemoattractant for eosinophils, basophils and Th2 lymphocytes; Th2 allergic response-Chemotaxis of eosinophils |
| IFN-γ | Th1-Activator of macrophages and induced of MHC-II expression |
| IL-1B | Key mediator of inflammation, leucocyte activation factor |
| IL-3 | Differentiation of HSCs into myeloid progenitor and lymphoid progenitor cells |
| IL-4 | Regulates maturation of naïve T helper cells into Th2; Differentiation of naïve T-cells to Th2 cells |
| IL-6 | Important mediator of acute phase response, antagonistic to Treg |
| IL-10 | Anti-inflammatory cytokine, down-regulated Th1 and MHC Class II expression |
| IL-12 | Naturally produced by DC in response to antigen, differentiation of naïve T cells to Th1 |
| IL-17 | Mediates pro-inflammatory responses |
| IL-23 | Proinflammatory cytokine, involved in Th17 maintenance and expansion |
| IL-27 | Member of IL-12 family-differentiation of Th1 and inhibition of Th2 cells. Can also promote anti-inflammatory IL-10 production |
| I-TAC | Chemotactic for T lymphocytes; Interferon-inducible T-cell alpha chemoattractant |
| KC | Chemotactic for T neutrophils |
| MIG | Migration, differentiation and activation of CTLs (CD8+), NK cells and macrophages |
| TARC | Inducer of chemotaxis in T cells |

From these preliminary experiments, it was concluded that the CHN-0 wildtype strain can trigger the release of cytokines from cultured DC2.4 cells when these are exposed to either vegetative cells or spores. These cytokines seem to be associated with leukocyte recruitment (NK cells), activation of innate and adaptive immunity.

Materials and Methods

Cell Line

DC2.4 cells (ATCC® Number: CRL-11904™) were maintained in RPMI1640 medium supplemented with 10% (V/V) foetal calf serum, 1×MEM non-essential amino acid and 1×1M HEPES buffer solution (all Sigma Aldrich) at 37° C. under 5% CO2.

Phagocytosis Assay

DC2.4 were seeded at a density of $2 \times 10^4$ cells/well into 96 well cell culture plate. CHN-0 vegetative cells were stained with pHrodo Red (Life Technologies) according to manufacturer's instructions and added at a concentration of $2\times10^7$ cells/well. DC2.4 cells were incubated with CHN-0 cells for 3 hr before being imaged using a Celigo Image Cytometer.

DC2.4 Cell Baseline Studies

Cytokine profiles were evaluated using the Proteome Profiler Mouse Cytokine Array Kit (R&D systems) according to manufacturer's instructions. DC2.4 cells were seeded in 12 well cell culture plates at a density of $5\times10^5$ cells/well. DC2.4 cells were incubated with $1\times10^7$ CHN-0 cells/well overnight. The cell culture supernatant was used for subsequent analysis. Cells were detached from the cell culture plate and centrifuged. A volume of 700 µL of the supernatant was then incubated with the Detection Antibody Cocktail provided with the Proteome Profiler kit for 1 hr at RT. This mixture was added to the pre-treated membranes and incubated on a shaking platform at gentle rocking overnight at 4° C. Membranes were then rinsed with Wash buffer, followed by Streptavidin-HRP conjugation and colour development by Chemi Reagent mixture. The membranes were exposed to X-ray film for 10 min and spot intensities were quantified by ImageJ software.

Example 3: Oral Immunisation of Mice with Engineered *C. butyricum*

In vivo immunisation experiments were performed to assess whether spores of engineered *C. butyricum* expressing the ROP protein variants can be used to deliver the ROP antigen and induce an immune response, with a focus on exploring T-cell responses. Mice were dosed by oral gavage with spores or injected subcutaneously with purified ROP protein fortnightly over a 28-day period and sacrificed after 42 days.

IFN-γ ELISPOT assays using splenocytes isolated after sacrifice demonstrated that mice immunised with the antigen-expressing *C. butyricum* strains by oral gavage develop antigen-specific T-cell responses. Specifically, mice immunised with the strain expressing ROP-HPV develop both CD4+ and CD8+ T-cell response (see FIG. 6), while mice immunised with the strain expressing ROP-OVA develop CD4+ T-cell response specific to the respective antigen (see FIG. 7). Importantly, mice do not develop a T-cell immune response aimed at the *C. butyricum* strain itself.

In-house assessment of faecal samples derived from mice immunised with spores of wildtype and genetically engineered *C. butyricum* has demonstrated that strains can be detected in faeces from 7 hours after the first immunisation event.

Materials and Methods

In Vivo Experimentation

Animals were housed in individually ventilated cages with nesting material. Food (provided as pellets) and water were available to mice ad libitum. All procedures were carried out according to protocols under Home Office license 30/3197 in accordance with the Animal Scientific Procedures Act 1986 and the University of Oxford Committee guidelines.

For immunisation experiments, six-week old female mice were randomly divided into groups of five animals. Immunisation through the alimentary canal was performed by oral gavage of $1\times10^8$ CFU of spores of CADD-ROP-HPV or CADD-ROP-OVA in 100 µL PBS, i.e. the engineered CHN strains, which may also be referred to as CHN-ROP-HPV or CHN-ROP-OVA. CHN-0 wildtype spores and PBS were given as controls at the same conditions. Parenteral immunisation was performed by subcutaneous injection of 100 µg ROP-HPV or ROP-OVA protein in 100 µL Freund's adjuvant (prime immunisation, day 0) or Incomplete Freund's adjuvant (boost immunisation, days 14 and 28). Mice of each group were immunised 3 times at days 0, 14 and 28 and sacrificed after 42 days. Faecal samples were collected 3 h and 7 h after each dosing event. Whole blood and serum samples were collected at each dosing event and at sacrifice. Spleens were isolated at sacrifice.

TABLE 3

| Group | Immunized Antigen | Tissue Collect |
| --- | --- | --- |
| G1. PBS | Oral gavage | 1. Bleeding (14 days after prime and boost) |
| G2. CHN0 spores | | 2. Spleens (terminal) |
| G3. CADD-ROP-HPV spores | | 3. Sera (terminal) |
| G4. CADD-OVA spores | | 4. Faeces (3 h and 7 h after oral gavage) |
| G5. ROP-HPV + adjuvant | Subcutaneous injection | |
| G6. ROP-OVA + adjuvant | | |
| G7. PBS | | |

Notes:
1. CADD-based vaccines: Clostridium spores, $10^8$ cells/mouse;
2. ROP peptides: recombinant overlapping peptides, 100 µg/mouse;
3. Adjuvant: prime (complete Freund's Adjuvant); boost (incomplete Freund's Adjuvant)
4. Bleeding: 100 µl/mouse, detection of antibody titer.
5. Sera: 0.8 ml/mouse, detection of cytokines;
6. Faeces: quantification of clostridium spores retained;
7. Spleens: IFN-γ ELISPOT assays.

Isolation of Mononuclear Cells

Splenocytes and PBMCs were isolated from homogenised spleens and terminal whole blood samples, respectively, using Ficoll-Paque 1.084 density gradient (GE healthcare) according to manufacturer's instructions. Cell suspension or whole blood were layered on Ficoll-Paque media and centrifuged at 400×g for 20-30 min at RT. The mononuclear cells isolates were washed in balanced salt solution to remove residual contaminants.

For T-cell purification, mononuclear cell isolates from one immunisation group were pooled and purified using CD8a (Ly-a) MicroBeads (Miltenyi Biotec) according to manufacturer's instructions. A volume of 90 µL of MACS buffer (PBS, 0.5% bovine serum albumin, 2 mM EDTA, pH 7.2) was used to resuspend $1\times10^7$ cells before addition of MicroBeads and incubation at 4° C. for 10 min. Cell suspensions were applied to MACS LS columns in a magnetic field for retention of CD8+ T-cells. The flow through was collected twice and used for CD4+ T-cell specific experiments. CD8+ T-cells were eluted subsequently by application of buffer without magnetic field. Both CD4+ and CD8+ T-cells were resuspended in RPMI medium before use in ELISPOT experiments.

IFN-γ T-Cell ELISPOT

The Mouse IFN-γ T-cell ELISPOT kit (U-CyTech Bioscience) was used for detection of IFN-γ release according to manufacturer's instructions. A total of $2.5 \times 10^5$ T-cells in 100 μL RPMI/well were added to plates precoated with Anti-IFN-γ antibodies and re-stimulated with either wild-type HPV protein, ROP-HPV protein, ROP-OVA protein (each at 5 μg/well) or CHN-0 vegetative cells at $0.5 \times 10^5$ CFU/well. Concanavalin A (Sigma Aldrich) was added as positive control at a concentration of 5 mg/mL. Plates were incubated overnight at 37° C. and 5% $CO_2$ before addition of biotinylated detection antibody followed by incubation with GABA conjugate and incubation with Activator I/II solution to allow for spot formation. Spots were scanned using a Celigo Image Cytometer and quantified using ImageJ software.

Example 4: Immunisation of Mice Using an Intracellular Ctxb Antigen in *Clostridium*

The Cholera enterotoxin subunit B (CtxB) is a 13 kDa subunit protein that makes up the pentameric ring of the Cholera enterotoxin of *Vibrio cholerae*. Together with the A subunit, it forms the holotoxin (choleragen). The holotoxin consists of a pentameric ring of B subunits whose central pore is occupied by the A subunit. The A subunit contains two chains, A1 and A2, linked by a disulfide bridge. The B subunit pentameric ring directs the A subunit to its target by binding to the GM1 gangliosides present on the surface of the intestinal epithelial cells. It can bind five GM1 gangliosides. It has no toxic activity by itself.

Gene Constructs and Plasmids

For the CADD-CtxB oral vaccine development, the CtxB-encoding protein sequence (SEQ ID NO: 24) was determined from the UniProtKB submission P01556 with removal of the signal sequence (MIKLKFGVFFTVLLS-SAYAHG (SEQ ID NO: 19)) and the addition of a C-terminal FLAG tag (DYKDDDDK (SEQ ID NO: 18)). Further modifications included for genetic engineering include a NdeI cleavage site (CATATG) incorporating the nucleotide signal for aa methionine (M, ATG) and the nucleotide sequence for a NheI cleavage site (GCTAGC) separated from the FLAG-tag by the stop codon TAA (FIG. 9). The CtxB_FLAG construct was codon optimised for genetic engineering into *C. butyricum* and synthesised behind the p0957 promoter by GeneWiz and cloned into a pMTL83151-pyrErepair vector submitted to GeneWiz for subcloning.

Genetic Engineering of *C. butyricum*

The pMTL83151-pyrErepair_p0957_CtxB-FLAG plasmid was transformed into *E. coli* DH5α, grown overnight in LB supplemented with 12.5 μg/mL chloramphenicol and stored at −80° C. as 15% (V/V) glycerol stocks.

For cloning into the correct plasmid for plasmid-based intracellular expression in *C. butyricum*, the pMTL83151-pyrErepair_p0957_CtxB-FLAG plasmid was extracted from the DH5α using the Wizard Plus SV Miniprep DNA Purification kit (Promega) following the manufacturer's instructions and the p0957-CtxB-FLAG construct was cut from the plasmids using restriction endonucleases NotI and NheI in CutSmart® buffer (all New England Biolabs Inc) according to the manufacturer's instructions. The isolated cassette (including p0957 promoter) was introduced into pMTL82151 (pBP1 Gram+ replicon, catP antibiotic marker, ColE1 Gram-replicon, traJ conjugal transfer function, and multiple cloning site (MCS). The plasmid was transformed into *E. coli* DH5α for propagation. Plasmids were isolated as before and sequenced using GeneWiz sequencing services to confirm the correct insertion of cassettes.

Sequence confirmed plasmid pMTL82151_p0957-CtxB-FLAG was then transformed into *E. coli* CA434 conjugation donors. Following sequence confirmation as above, *E. coli* CA434 were grown overnight in LB supplemented with 50 μg/mL Kanamycin and 12.5 μg/mL Chloramphenicol and stored at −80° C. as 15% glycerol stocks.

Fresh colonies of revived *E. coli* CA434 harbouring the CtxB-FLAG plasmid were used to inoculate LB broth supplemented with 50 μg/mL Kanamycin and 12.5 μg/ml Chloramphenicol. After overnight incubation, cultures were used to inoculate fresh supplemented medium 1:10 and incubated until an $OD_{600}$ of 0.5-0.7 was reached. A volume of 1 mL of culture was removed and centrifuged at 5,000×g for 3 minutes. The supernatant was discarded, and the pellet re-suspended in 500 μL phosphate buffered saline (PBS) solution. The culture was centrifuged as above, and the supernatant discarded.

Fresh colonies of revived *C. butyricum* CHN-0 were used to inoculate a serial dilution series in fresh pre-reduced RCM broth supplemented with 2% glucose and 1% CaCO3. After overnight incubation in anoxic conditions, the most dilute culture showing growth was used to inoculate fresh supplemented medium 1:10 and incubated until an $OD_{600}$ of 0.5-0.7 was reached. A volume of 1 mL of culture was removed and heat treated for 10 min at 50° C.

Both *E. coli* CA434 and *C. butyricum* CHN-0 such treated were transferred into the anoxic workstation and mixed at a ratio of 5:1 ($OD_{600}$:$OD_{600}$), usually 1 mL *E. coli* to 0.2 mL *C. butyricum*. The conjugation mixture was spotted onto pre-reduced non-selective RCM agar plates and incubated upright overnight. Following incubation, the mixture was harvested into 500 μL fresh pre-reduced RCM broth and spread in 100 μL volume onto fresh pre-reduced RCM agar plates supplemented with 250 μg/mL D-cycloserine and 15 μg/mL thiamphenicol. To select for *C. butyricum* CHN-0 carrying the plasmid, colonies that were thiamphenicol resistant were patch plated reiteratively onto RCM+15 μg/mL thiamphenicol agar plates. Genomic DNA of thiamphenicol resistant colonies was isolated using the GenElute™ Bacterial Genomic DNA kit (SIGMA-Aldrich) as per the manufacturer's instructions and used for sequencing to confirm presence of the pMTL82151_p0957-CtxB-FLAG plasmid using primers spanning the MCS (Table 4).

TABLE 4

Primers used for sequence confirmation of pMTL82151_p0957-CtxB-FLAG plasmid-containing *C. butyricum* CHN-0 colonies.

| | | | |
|---|---|---|---|
| CH22 (SEQ ID NO: 22) | F | GTACATCACCGACGAG CAAG | Forward plasmid backbone primer, 5' of p0957 |
| CH54 (SEQ ID NO: 23) | R | GACTTATCCAGGGTGCT ATCTTCG | Reverse plasmid backbone primer, 3' of FLAG-TAA |

The introduction of the pMTL82151-p0957-CtxB-FLAG plasmid into *C. butyricum* CHN-0 leads to a high expression of the CtxB full protein in the *C. butyricum* cytoplasm from a multicopy plasmid.

Confirmation of Expression of CtxB in *C. butyricum*

Fresh colonies of revived *C. butyricum* CHN-0+ pMTL82151-p0957-CtxB-FLAG were used to inoculate fresh pre-reduced supplemented RCM broth+15 µg/ml thiamphenicol in serial dilution and grown overnight. The most diluted culture showing growth was used to inoculate fresh pre-reduced supplemented RCM broth+15 µg/ml thiamphenicol at a starting $OD_{600}$ of 0.05. When cultures were grown to an $OD_{600}$ of 1, 2, and 4, the equivalent of $OD_{600}$ of 2/mL was centrifuged at 13,000×g for 2 min. The pellet was re-suspended in 40 µL 5×SDS Loading dye (20% (V/V) 0.5 Tris hydrochloride pH 6.8, 23% (V/V) Glycerol, 40% (V/V) of a 10% (w/V) Sodium dodecylsulphate (SDS) solution, 10% (V/V) 2-Mercaptoethanol, 10 mL $dH_2O$, Bromophenol blue) and heat treated at 98° C. for 15 minutes.

A maximum of 20 µL/well of the re-suspended pellets was loaded onto a Novex™ 16% Tricine mini gel (ThermoFisher Scientific) and run in 1×Novex™ Tricine SDS Running Buffer (ThermoFisher Scientific) using 140V at room temperature. Spectra™ Multicolor Low Range Protein Ladder (ThermoFisher Scientific) was loaded at 10 µL/well as marker and the *E. coli* Positive Control Whole cell lysate ab5395 (abcam) was used as FLAG tag positive control in a 1:5 dilution.

Separated protein were blotted onto PVDF membranes using the Tran-Blot® Turbo™ blotting system (BioRad) with the Trans-Blot® Turbo™ packs as per the manufacturer's instructions. To detect FLAG tagged proteins, PVDF membranes were first incubated in TBS-T blocking buffer (50 mM Tris hydrochloride, 150 mM Sodium chloride, 0.1% Tween20, pH7.4, 5% (w/V) milk powder) for 1 h at room temperature on a shaking platform. The blocking buffer was then replaced by TBS-T buffer (50 mM Tris hydrochloride, 150 mM Sodium chloride, 0.1% Tween20, pH7.4) containing Anti-FLAG Tag® antibody Alkaline phosphatase conjugate (1:5,000; Sigma) for incubation at room temperature for 2 h on a shaking platform. The membrane was washed twice for 5 min at room temperature in TBS-T buffer and once for 5 min at room temperature in TBS buffer (50 mM Tris hydrochloride, 150 mM Sodium chloride, pH7.4). Alkaline phosphatase detection was performed using SIGMA-FAST BCIP®/NBT substrate (SIGMA Aldrich) as per the manufacturer's instructions. Expression can be seen in FIG. 10. The CtxB-FLAG protein was detectable to high levels on a Western blot, corresponding to 900 ng in a specific volume of cells cultured to OD1.0. Assuming the cell density in OD1.0 is 0.3 g/L, it is estimated that the protein is therefore 3 µg/mg dry cell weight.

Immunogenicity Testing

In vivo immunisation experiments will be performed to assess whether spores of engineered *C. butyricum* expressing the CtxB antigen can deliver the antigen and induce an immune response, with a focus on cellular and humoral responses. *C. butyricum* spores will be generated as set out above. C57BL/6 mice will be administered $1\times10^8$ CFU/dose orally in 3 doses, 1 week apart from either a wild-type CADD strain (negative control) or the CADD vaccine strain expressing CtxB from the pMTL82151-p0957-CtxB-FLAG plasmid. A third group will be administered a current marketed oral cholera vaccine as a positive control. Clinical observations will be taken throughout to determine tolerability of the test articles (weight changes and physical appearances such as hunching or coat piloerection).

TABLE 5

| Group | Immunized Antigen | Tissue Collect |
|---|---|---|
| G1. CHN-0 spores | Oral gavage | 1. Spleens (terminal) |
| G2. CADD + CtxB spores | | 2. GIT tissue (terminal) |
| G3. OCV | | 3. Gut wash (terminal) |

Notes:
1. CADD-based vaccines: Clostridium spores, $10^8$ cells/mouse/dose;
2. Spleens: IFN-γ ELISPOT assays.
3. GIT tissue: CD40 ligand upregulation in Flow Cytometry
4. Gut wash: sIgA/IgA ELISA At sacrifice, spleens will be harvested and processed to a single cell suspension and $CD4^+$ and $CD8^+$ cells purified individually to determine $CD4^+/CD8^+$-specific T cell response via IFN-γ release in ELISPOT assays (described in materials and methods, pages above). $CD4^+$ T cell response will also be analysed in gut-specific tissues (small intestine and colon), where the tissue will be extracted, treated with mucolytic enzymes+EDTA and digested to a single cell suspension, as described in Di Luccia et al (2020) Cell Host & Microbe 27:899-908. Isolated $CD4^+$ T cells from this suspension will be re-stimulated with antigen presenting cells (APCs, previously exposed to a commercially obtained CtxB antigen) and the change in CD40 ligand expression on the cell surface will be assessed via Flow Cytometry as described in Hegazy et al (2017) Gastroenterology 153: 1320-1337.

Gut contents will be extracted at termination and the antigen-specific humoral response will be assessed via ELISA assays to determine CtxB-specific secretory IgA (sIgA) production as a percentage of the total IgA, as described in Di Luccia et al (2020) Cell Host & Microbe 27:899-908.

Expected Results

As shown with intracellular ROPs expressed by the CADD platform, we expect the ELISPOT assays of $CD4^+$/ $CD8^+$ T-cells to show mice immunised with the CADD strain expressing the intracellular CtxB antigen to develop an antigen-specific T-cell response, with a stronger emphasis on the $CD4^+$ response. Importantly, we do not expect to see mice immunised with the CHN-0 wild type strain developing a T cell response.

In the gut-specific tissue assessment, the CD40 ligand is used as it is rapidly upregulated by $CD4^+$ T cells after stimulation, so it is expected that upon re-stimulation of the $CD4^+$ cells via APCs there will be an increase in the CD40 ligand expression in the groups administered with CADD expressing CtxB compared to the wild-type CADD group, indicating a CtxB-specific $CD4^+$ T-cell response.

A strong $CD4^+$ T-cell response is generally accepted as a good correlate of protection in a cholera vaccine, as classically, $CD4^+$ T-cell stimulation is necessary for B-cell stimulation and production of antibodies. The sIgA antibody response is also known to be important in protective immunity against *V. cholera*, and therefore we also seek to determine the humoral response for mucosal immunity via assessment of the production of CtxB-specific secretory IgA (sIgA). Through ELISAs, we expect to see an increase in antigen-specific sIgA in response to administration of the CADD-CtxB oral vaccine, compared to the wild-type CADD platform alone.

SEQUENCE LISTING

```
Sequence total quantity: 33
SEQ ID NO: 1                  moltype = DNA  length = 502
FEATURE                       Location/Qualifiers
misc_feature                  1..502
                              note = Fig 3 - OVA-ROP-FLAG nucleotide sequence
source                        1..502
                              mol_type = other DNA
                              organism = synthetic construct
SEQUENCE: 1
atataaaaat aagaagccat atgttggtgc tgttgcctga tgaagtctca ggccttgagc    60
agcttgagag tataatcaac tttgaaaaac tgactgaatg gaccagttct aatgttatgg   120
aattaagaat gaaaactgaa tggaccagtt ctaatgttat ggaagagagg aagatcaaag   180
tgtacttacc tcgcatgaag atggaggaaa aatacaacct cacatctgtc ttaatggctt   240
taagaatgaa aaatacaac ctcacatctg tcttaatggc tatgggcatt actgacgtgt    300
ttagctcttc agccaatctg tctggcatct cctcagcaga gagcctgaag atatctttaa   360
gaatgaaaat ctcctcagca gagagcctga agatatctca agctgtccat gcagcacatg   420
cagaaatcaa tgaagcaggc agattaagaa tgaaagatta caaggatgac gacgataagt   480
aagctagcat aaaataagaa gc                                             502

SEQ ID NO: 2                  moltype = AA  length = 153
FEATURE                       Location/Qualifiers
REGION                        1..153
                              note = Fig 3 - OVA-ROP-FLAG amino acid sequence
source                        1..153
                              mol_type = protein
                              organism = synthetic construct
SEQUENCE: 2
MLVLLPDEVS GLEQLESIIN FEKLTEWTSS NVMELRMKTE WTSSNVMEER KIKVYLPRMK    60
MEEKYNLTSV LMALRMKKYN LTSVLMAMGI TDVFSSSANL SGISSAESLK ISLRMKISSA   120
ESLKISQAVH AAHAEINEAG RLRMKDYKDD DDK                                 153

SEQ ID NO: 3                  moltype = DNA  length = 497
FEATURE                       Location/Qualifiers
misc_feature                  1..497
                              note = Fig 4 - HPV-ROP-FLAG nucleotide sequence
source                        1..497
                              mol_type = other DNA
                              organism = synthetic construct
SEQUENCE: 3
ataaaaataa gaagccatat gcatggagat acacctacat tgcatgaata tatgttagat    60
ttgcaaccag agacaactga tctctactgt tatgagcaat aaatgacag ctcagaggag    120
gagttaagaa tgaaagagca attaaatgac agctcagagg aggaggatga aatagatggt   180
ccagctggac aagcagaacc ggacagagcc cattacaata ttgtaacctt tgttgcaag    240
ttaagaatga acattacaa tattgtaacc ttttgttgca agtgtgactc tacgcttgta    300
ttgtgcgtac aaagcacaca cgtagacatt cgtactttgg aagacctgtt aatgggctta   360
agaatgaaaa ttcgtacttt ggaagacctg ttaatgggca cactaggaat tgtgtgcccc   420
atctgttctc aaaaaccatt aagaatgaaa gattacaagg atgacgacga taagtaagct   480
agcataaaat aagaagc                                                   497

SEQ ID NO: 4                  moltype = AA  length = 152
FEATURE                       Location/Qualifiers
REGION                        1..152
                              note = Fig 4 - HPV-ROP-FLAG amino acid sequence
source                        1..152
                              mol_type = protein
                              organism = synthetic construct
SEQUENCE: 4
MHGDTPTLHE YMLDLQPETT DLYCYEQLND SSEEELRMKE QLNDSSEEED EIDGPAGQAE    60
PDRAHYNIVT FCCKLRMKHY NIVTFCCKCD STLRLCVQST HVDIRTLEDL LMGLRMKIRT   120
LEDLLMGTLG IVCPICSQKP LRMKDYKDDD DK                                  152

SEQ ID NO: 5                  moltype = AA  length = 100
FEATURE                       Location/Qualifiers
REGION                        1..100
                              note = wildtype ovalbumin amino acid (aa) sequence ranging
                                from aa241-aa340
source                        1..100
                              mol_type = protein
                              organism = synthetic construct
SEQUENCE: 5
SMLVLLPDEV SGLEQLESII NFEKLTEWTS SNVMEERKIK VYLPRMKMEE KYNLTSVLMA    60
MGITDVFSSS ANLSGISSAE SLKISQAVHA AHAEINEAGR                         100

SEQ ID NO: 6                  moltype = AA  length = 142
FEATURE                       Location/Qualifiers
REGION                        1..142
                              note = 142aa recombinant overlapping peptide denoted ROP-OVA
source                        1..142
```

```
                         mol_type = protein
                         organism = synthetic construct
SEQUENCE: 6
SMLVLLPDEV SGLEQLESII NFEKLTEWTS SNVMELRMKT EWTSSNVMEE RKIKVYLPRM    60
KMEEKYNLTS VLMALRMKKY NLTSVLMAMG ITDVFSSSAN LSGISSAESL KISLRMKISS   120
AESLKISQAV HAAHAEINEA GR                                           142

SEQ ID NO: 7             moltype = AA   length = 98
FEATURE                  Location/Qualifiers
REGION                   1..98
                         note = wildtype E7 protein aa sequence ranging from aa1-aa98
source                   1..98
                         mol_type = protein
                         organism = synthetic construct
SEQUENCE: 7
MHGDTPTLHE YMLDLQPETT DLYCYEQLND SSEEEDEIDG PAGQAEPDRA HYNIVTFCCK    60
CDSTLRLCVQ STHVDIRTLE DLLMGTLGIV CPICSQKP                            98

SEQ ID NO: 8             moltype = AA   length = 140
FEATURE                  Location/Qualifiers
REGION                   1..140
                         note = 140aa recombinant overlapping peptide denoted ROP-HPV
source                   1..140
                         mol_type = protein
                         organism = synthetic construct
SEQUENCE: 8
MHGDTPTLHE YMLDLQPETT DLYCYEQLND SSEELRMKE QLNDSSEEED EIDGPAGQAE     60
PDRAHYNIVT FCCKLRMKHY NIVTFCCKCD STLRLCVQST HVDIRTLEDL LMGLRMKIRT   120
LEDLLMGTLG IVCPICSQKP                                               140

SEQ ID NO: 9             moltype = DNA   length = 22
FEATURE                  Location/Qualifiers
misc_feature             1..22
                         note = Forward primer of Pfdx
source                   1..22
                         mol_type = other DNA
                         organism = synthetic construct
SEQUENCE: 9
gtgtagtagc ctgtgaaata ag                                             22

SEQ ID NO: 10            moltype = DNA   length = 20
FEATURE                  Location/Qualifiers
misc_feature             1..20
                         note = Reverse primer; Genomic DNA downstream of pyrE
source                   1..20
                         mol_type = other DNA
                         organism = synthetic construct
SEQUENCE: 10
cccatgttgg atctcctgag                                                20

SEQ ID NO: 11            moltype = DNA   length = 20
FEATURE                  Location/Qualifiers
misc_feature             1..20
                         note = Forward primer; Genomic DNA upstream of pyrE
source                   1..20
                         mol_type = other DNA
                         organism = synthetic construct
SEQUENCE: 11
gcaagtgcgg tgcagattgg                                                20

SEQ ID NO: 12            moltype = DNA   length = 39
FEATURE                  Location/Qualifiers
misc_feature             1..39
                         note = FLAG tag
source                   1..39
                         mol_type = other DNA
                         organism = synthetic construct
SEQUENCE: 12
ttacttatcg tcgtcatcct tgtaatcttt cattcttaa                           39

SEQ ID NO: 13            moltype = DNA   length = 30
FEATURE                  Location/Qualifiers
misc_feature             1..30
                         note = Reverse primer; pyrE repair long homology arm
source                   1..30
                         mol_type = other DNA
                         organism = synthetic construct
SEQUENCE: 13
aaatattaac aagtaatgat tatccaaaac                                     30
```

```
SEQ ID NO: 14              moltype = DNA   length = 47
FEATURE                    Location/Qualifiers
misc_feature               1..47
                           note = Reverse primer; Pfdx - overhang into HPV-ROP
source                     1..47
                           mol_type = other DNA
                           organism = synthetic construct
SEQUENCE: 14
gcaatgtagg tgtatctcca tgcatatgta acacacctcc ttaaaaa                     47

SEQ ID NO: 15              moltype = DNA   length = 40
FEATURE                    Location/Qualifiers
misc_feature               1..40
                           note = Forward primer; HPV-ROP - overhang of Pfdx
source                     1..40
                           mol_type = other DNA
                           organism = synthetic construct
SEQUENCE: 15
tttaaggagg tgtgttacat atgcatggag atacacctac                             40

SEQ ID NO: 16              moltype = DNA   length = 44
FEATURE                    Location/Qualifiers
misc_feature               1..44
                           note = Reverse primer; Pfdx - overhang of OVA1
source                     1..44
                           mol_type = other DNA
                           organism = synthetic construct
SEQUENCE: 16
catcaggcaa cagcaccaac atatgtaaca cacctcctta aaaa                        44

SEQ ID NO: 17              moltype = DNA   length = 41
FEATURE                    Location/Qualifiers
misc_feature               1..41
                           note = Forward primer; OVA1 - overhang of Pfdx
source                     1..41
                           mol_type = other DNA
                           organism = synthetic construct
SEQUENCE: 17
tttaaggagg tgtgttcata tgttggtgct gttgcctgat g                           41

SEQ ID NO: 18              moltype = AA    length = 8
FEATURE                    Location/Qualifiers
REGION                     1..8
                           note = FLAG tag
source                     1..8
                           mol_type = protein
                           organism = synthetic construct
SEQUENCE: 18
DYKDDDDK                                                                 8

SEQ ID NO: 19              moltype = AA    length = 21
FEATURE                    Location/Qualifiers
REGION                     1..21
                           note = CtxB signal sequence
source                     1..21
                           mol_type = protein
                           organism = Vibrio cholerae
SEQUENCE: 19
MIKLKFGVFF TVLLSSAYAH G                                                 21

SEQ ID NO: 20              moltype = DNA   length = 614
FEATURE                    Location/Qualifiers
misc_feature               1..614
                           note = p0957_CtxB genomic sequence
source                     1..614
                           mol_type = other DNA
                           organism = synthetic construct
SEQUENCE: 20
gcggccgcgg gatactgcag aagatataat agattcaatg aaaatgtgga gtaaataaaa       60
aaatcggata gaaatatccg atttttatt taaaaagact taaaaaaagt gcttgactct       120
tggaatttta agaaaaaata tggtataatc atattacgta ataaaatac atttatatag       180
taataccata taaatgccaa taattgataa aaaaattaaa ttcaattaaa tcacatgagc      240
gagtaagaat tcaaggaggt gtgttacata tgacaccaca aaacataaca gatttatgtg      300
ctgagtatca taacacaa atatatacac ttaatgataa aatatttca tatacagaat         360
cattagctgg aaaagagaa atggcaataa taacatttaa aatggagca atatttcaag        420
ttgaagttcc tggaagtcaa cacattgatt cacaaaaaaa agcaatagaa agaatgaaag      480
atacattaag aatagcatac ttaacagaag caaaagttga aaaattatgt gtttggaata      540
ataaaacacc acatgcaata gcagcaatat caatggcaaa tgattataaa gatgacgatg      600
```

```
ataaataagc tagc                                                       614

SEQ ID NO: 21           moltype = AA  length = 112
FEATURE                 Location/Qualifiers
REGION                  1..112
                        note = p0957_CtxB translated protein sequence
source                  1..112
                        mol_type = protein
                        organism = synthetic construct
SEQUENCE: 21
MTPQNITDLC AEYHNTQIYT LNDKIFSYTE SLAGKREMAI ITFKNGAIFQ VEVPGSQHID   60
SQKKAIERMK DTLRIAYLTE AKVEKLCVWN NKTPHAIAAI SMANDYKDDD DK          112

SEQ ID NO: 22           moltype = DNA  length = 20
FEATURE                 Location/Qualifiers
misc_feature            1..20
                        note = CH22 F Forward plasmid backbone primer, 5 of p0957
source                  1..20
                        mol_type = other DNA
                        organism = synthetic construct
SEQUENCE: 22
gtacatcacc gacgagcaag                                                 20

SEQ ID NO: 23           moltype = DNA  length = 24
FEATURE                 Location/Qualifiers
misc_feature            1..24
                        note = CH54 R Reverse plasmid backbone primer, 3 of
                        FLAG-TAA
source                  1..24
                        mol_type = other DNA
                        organism = synthetic construct
SEQUENCE: 23
gacttatcca gggtgctatc ttcg                                            24

SEQ ID NO: 24           moltype = AA  length = 124
FEATURE                 Location/Qualifiers
REGION                  1..124
                        note = PD01556 - Fig. 9 Part 2 of 2
source                  1..124
                        mol_type = protein
                        organism = synthetic construct
SEQUENCE: 24
MIKLKFGVFF TVLLSSAYAH GTPQNITDLC AEYHNTQIYT LNDKIFSYTE SLAGKREMAI   60
ITFKNGAIFQ VEVPGSQHID SQKKAIERMK DTLRIAYLTE AKVEKLCVWN NKTPHAIAAI  120
SMAN                                                                124

SEQ ID NO: 25           moltype = AA  length = 104
FEATURE                 Location/Qualifiers
REGION                  1..104
                        note = Consensus - Fig. 9 Part 2 of 2
source                  1..104
                        mol_type = protein
                        organism = synthetic construct
SEQUENCE: 25
GTPQNITDLC AEYHNTQIYT LNDKIFSYTE SLAGKREMAI ITFKNGAIFQ VEVPGSQHID   60
SQKKAIERMK DTLRIAYLTE AKVEKLCVWN NKTPHAIAAI SMAN                   104

SEQ ID NO: 26           moltype = AA  length = 4
FEATURE                 Location/Qualifiers
REGION                  1..4
                        note = Cathepsin S cleavage site - pg 12
source                  1..4
                        mol_type = protein
                        organism = synthetic construct
SEQUENCE: 26
LRMK                                                                   4

SEQ ID NO: 27           moltype = AA  length = 4
FEATURE                 Location/Qualifiers
REGION                  1..4
                        note = Cathepsin B cleavage site - pg 12
source                  1..4
                        mol_type = protein
                        organism = synthetic construct
SEQUENCE: 27
MKRL                                                                   4

SEQ ID NO: 28           moltype = AA  length = 4
FEATURE                 Location/Qualifiers
```

```
REGION                  1..4
                        note = Cathepsin K cleavage site - pg 12
source                  1..4
                        mol_type = protein
                        organism = synthetic construct
SEQUENCE: 28
HPGG                                                                          4

SEQ ID NO: 29           moltype =    length =
SEQUENCE: 29
000

SEQ ID NO: 30           moltype =    length =
SEQUENCE: 30
000

SEQ ID NO: 31           moltype =    length =
SEQUENCE: 31
000

SEQ ID NO: 32           moltype =    length =
SEQUENCE: 32
000

SEQ ID NO: 33           moltype = AA  length = 4
FEATURE                 Location/Qualifiers
REGION                  1..4
                        note = Cathepsin cleavage site - pg 13
source                  1..4
                        mol_type = protein
                        organism = synthetic construct
SEQUENCE: 33
LRMK                                                                          4
```

The invention claimed is:

1. A bacterium of the class Clostridia comprising a heterologous nucleic acid molecule encoding at least one antigen, wherein the bacterium is capable of expressing the antigen in an intracellular compartment of the bacterium during anaerobic cell growth, wherein the at least one antigen is an infectious agent antigen or a tumour antigen, and wherein the bacterium is of a species which is not a pathogenic *Clostridium* species.

2. The bacterium of claim 1, wherein:
   a) the at least one antigen comprises one or more T-cell antigen segments and/or one or more B cell antigen segments; or
   b) the at least one antigen comprises one or more T-cell antigen segments and/or one or more B cell antigen segments, wherein the one or more T-cell antigen segments are CD4+ T-cell antigen segments and/or CD8+ T-cell antigen segments.

3. The bacterium of claim 1, wherein:
   a) the at least one antigen is a multi-antigen fusion polypeptide comprising two or more antigen segments; or
   b) the at least one antigen is a multi-antigen fusion polypeptide comprising two or more antigen segments and the multi-antigen fusion polypeptide comprises at least one CD4$^+$ T-cell antigen segment and at least one CD8$^+$ T-cell antigen segment.

4. The bacterium of claim 3, wherein:
   a) the antigen segments are partially overlapping, and in combination encompass ≥40%, ≥50, ≥60%, ≥70%, ≥80%, or ≥90% of the amino acid sequence of the antigen from which they are derived;
   b) each antigen segment is 8-50 amino acids in length; or
   c) each antigen segment is 8-50 amino acids in length and a sequence of a cleavage site is located between each antigen segment.

5. The bacterium of claim 1, wherein the amount of antigen expressed per cell weight of clostridial cells undergoing anaerobic cell growth is:
   a) greater than 10 ng/mg, 20 ng/mg or 40 ng/mg and up to 50, 100, 150, 200, 250, 300, 350, 400, 500, 600, 700, 800, 900 ng/mg, 1 μg/mg, 1.5, 2.0, 2.5, 5.0, 10 or 20 μg/mg dry cell weight; or
   b) from 10 to 400 ng/mg dry cell weight; 20 to 200 ng/mg dry cell weight; 40 to 100 ng/mg dry cell weight; 100 ng to 5 μg/mg dry cell weight; 200 ng to 2.5 μg/mg dry cell weight; 400-1500 ng/mg dry cell weight; or about 800 ng/mg dry cell weight.

6. The bacterium of claim 1, wherein the heterologous nucleic acid molecule is integrated into the genome as a single copy or on a low copy plasmid or on a high copy plasmid.

7. The bacterium of claim 1, wherein the bacterium comprises a further heterologous nucleic acid molecule encoding an immunostimulatory agent or adjuvant, which is capable of being co-expressed with the antigen; and/or wherein the bacterium is capable of producing short-chain fatty acids (SCFAs).

8. The bacterium of claim 1, wherein the infectious agent antigen is a viral antigen, a bacterial antigen, a parasite antigen, a prion antigen, a helminth antigen, a nematode antigen, a protozoan antigen, fungal antigen, or any combination thereof.

9. The bacterium of claim 1, wherein the infectious agent antigen is
   a) an HPV antigen;
   b) an HPV antigen wherein the HPV antigen comprises the amino acid sequence of SEQ ID NO: 4, amino acids 1 to 140 of SEQ ID NO: 4, or wherein the HPV antigen is encoded by nucleotides 19 to 477 of the nucleic acid sequence of SEQ ID NO: 3;

c) a *Vibrio cholerae* antigen; or d) a *Vibrio cholerae* antigen, optionally CtxB, optionally wherein the *V. cholerae* antigen comprises the amino acid sequence of SEQ ID NO: 21, or amino acids 1 to 104 of SEQ ID NO: 21, or is encoded by nucleotides 270 to 581 of the nucleic acid sequence of SEQ ID NO: 20.

10. The bacterium of claim 1, wherein:

a) the bacterium is from cluster I, IV and/or XIVa of Clostridia; or b) the bacterium is from the genus *Clostridium*; or c) the bacterium is *Clostridium butyricum*.

11. The bacterium of claim 1, wherein:

a) the bacterium is capable of expressing the antigen as a soluble polypeptide or inclusion body in the bacterial cytoplasm;

b) the heterologous nucleic acid molecule encoding the at least one antigen is operably linked to a promoter that enables expression during anaerobic growth;

c) the heterologous nucleic acid molecule encoding the at least one antigen is operably linked to a promoter that enables expression following spore germination in anoxic conditions and/or during anaerobic vegetative cell metabolism; or d) the heterologous nucleic acid molecule encoding the at least one antigen is operably linked to a promoter selected from the p0957 promoter and the fdx promoter from *C. sporogeneses*.

12. The bacterium of claim 1, wherein the bacterium is:

a) in the form of a spore or a vegetative cell; or b) detectable in the lower gastrointestinal tract but does not permanently colonize or form part of the resident microbiota in the lower GI tract.

13. A pharmaceutical composition comprising the bacterium of claim 1 and a pharmaceutically acceptable carrier, excipient, diluent, or adjuvant.

14. The pharmaceutical composition of claim 13, further comprising capsules comprising spores or vegetative cells of the bacteria, wherein the capsules comprise a delayed-release layer or coating which allows for the release of the spores or vegetative cells in an anaerobic section of the lower gastrointestinal tract following oral administration.

15. A method for generating an antigen-specific immune response in a subject comprising administering to the subject an effective amount of a bacterium comprising a heterologous nucleic acid molecule encoding an antigen, and wherein the bacterium is capable of expressing the antigen in an intracellular compartment of the bacterium during anaerobic cell growth, and wherein the bacterium is of a species which is not a pathogenic *Clostridium* species.

16. The method of claim 15, wherein the antigen-specific immune response is:

a) a cell-mediated immune response;

b) a $CD4^+$, $CD8^+$ T-cell response; and/or c) a B cell response.

17. A method for treating or preventing an infectious disease or cancer in a subject comprising administering an effective amount of the bacterium of claim 1 to the subject.

18. The method of claim 15, wherein the bacterium is administered to the subject orally.

19. The method of claim 18, wherein the bacterium is in the form of a spore or in the form of a pharmaceutical composition.

20. A method for preparing the bacterium of claim 1 comprising introducing the heterologous nucleic acid molecule into the bacterium.

* * * * *